United States Patent
Wang et al.

(10) Patent No.: US 9,217,857 B2
(45) Date of Patent: Dec. 22, 2015

(54) MULTI-STATE SHUTTER ASSEMBLIES HAVING SEGMENTED DRIVE ELECTRODE SETS

(71) Applicant: Pixtronix, Inc., San Diego, CA (US)

(72) Inventors: Ye Wang, Cupertino, CA (US); Timothy J. Brosnihan, Natick, MA (US)

(73) Assignee: Pixtronix, Inc., San Diego, CA (US)

( * ) Notice: Subject to any disclaimer, the term of this patent is extended or adjusted under 35 U.S.C. 154(b) by 33 days.

(21) Appl. No.: 13/796,952

(22) Filed: Mar. 12, 2013

(65) Prior Publication Data
US 2014/0268292 A1 Sep. 18, 2014

(51) Int. Cl.
*G02B 26/00* (2006.01)
*G02F 1/29* (2006.01)
*G02B 26/12* (2006.01)
*G02B 26/02* (2006.01)
(Continued)

(52) U.S. Cl.
CPC .............. *G02B 26/00* (2013.01); *G02B 26/023* (2013.01); *G02B 26/007* (2013.01); *G02B 26/02* (2013.01); *G02B 26/0816* (2013.01); *G02B 26/0833* (2013.01); *G02B 26/0841* (2013.01); *G02B 27/0068* (2013.01); *G02B 2027/0118* (2013.01); *G02F 1/155* (2013.01); *G02F 1/19* (2013.01); *G02F 1/29* (2013.01); *G02F 1/292* (2013.01); *G02F 2203/24* (2013.01)

(58) Field of Classification Search
CPC .......... G02B 26/0833; G02B 26/0816; G02B 2027/0118; G02B 26/007; G02B 26/02; G02B 26/0841; G02B 26/023; G02B 26/00; G02B 27/0068; G02F 1/29; G02F 1/292; G02F 1/19; G02F 2203/24; G02F 1/155

USPC ................. 359/290–292, 295, 298, 316, 318, 359/224.1, 224.2, 226.1
See application file for complete search history.

(56) References Cited

U.S. PATENT DOCUMENTS 7,746,529 B2    6/2010   Hagood et al.
8,147,150 B2    4/2012   Kim et al.
(Continued)

FOREIGN PATENT DOCUMENTS

EP          2369398 A1      9/2011
WO       2012109160 A2      8/2012

OTHER PUBLICATIONS

International Search Report and Written Opinion—PCT/US2014/019415—ISA/EPO—May 15, 2014.
Lee K.H. et al., "High performance microshutter device with space-division modulation," Journal of Micromechanics and Microengineering, IOP Publishing, 2010, vol. 20, pp. 1-7.
Taiwan Search Report—TW103107286—TIPO—Dec. 5, 2014.

*Primary Examiner* — Evelyn A Lester
(74) *Attorney, Agent, or Firm* — Edward A. Gordon; Foley & Lardner LLP

(57) ABSTRACT

This disclosure provides systems, methods and apparatus incorporating display elements having light modulators that can operate in more than two states. In some implementations, the light modulator assembly includes an electrostatic actuator that includes a load electrode coupled to a shutter and a drive electrode set positioned proximate to the load electrode. The drive electrode set includes a plurality of discrete portions that are configured to drive the light modulator assembly to a plurality of different light modulator states. In some such implementations, the portions of the drive electrode set are positioned opposite to corresponding regions of the load electrode. In some implementations, the portions are arranged such that the portions are configured to electrostatically engage with adjacent regions of the load electrode.

28 Claims, 32 Drawing Sheets

(51) Int. Cl.
  *G02B 26/08* (2006.01)
  *G02B 27/01* (2006.01)
  *G02B 27/00* (2006.01)
  *G02F 1/19* (2006.01)
  *G02F 1/155* (2006.01)

(56) References Cited

U.S. PATENT DOCUMENTS

2005/0146241 A1 7/2005 Wan
2008/0278798 A1 11/2008 Hagood et al.
2011/0043882 A1 2/2011 Yoon et al.

MULTI-STATE SHUTTER ASSEMBLIES HAVING SEGMENTED DRIVE ELECTRODE SETS

TECHNICAL FIELD

This disclosure relates to the field of displays, and in particular, to microelectromechanical systems (MEMS) shutter assemblies having electrostatic actuators that include drive electrode sets having a plurality of discrete portions.

DESCRIPTION OF THE RELATED TECHNOLOGY

To create an image, display apparatus can utilize certain image formation processes that generate a sequence of separate subfield images, also referred to as "subframes," which the human visualization system (HVS) blends together to form a single image frame. In some implementations, the subframes are associated with different weights to provide a coded gray scale process. This allows for an increase in the number of colors that may be generated with a reduced number of additional subframes. The weights correspond to an amount of light transmitted from the display.

Certain existing displays include display elements that have mechanical light modulators, such as shutters, that operate in only two states, namely, an open state in which the light modulator allows light to transmit through the display element and a closed state in which the light modulator blocks light from transmitting through the display element. In such displays, subframe weights are implemented by relying primarily on temporal modulation, for example, by adjusting the duration for which a light modulator remains open. Such gray scale schemes require extra power as the duty cycle of the light sources illuminating the image is reduced to accommodate switching between subframes. Thus, the light sources need to be driven at high power, where they are less efficient. Power is also consumed each time a shutter is switched. Frequent switching also can lead to image artifacts.

SUMMARY

The systems, methods and devices of the disclosure each have several innovative aspects, no single one of which is solely responsible for the desirable attributes disclosed herein.

An innovative aspect of the subject matter described in this disclosure can be implemented in an apparatus that includes a light modulator and an electrostatic actuator. The electrostatic actuator includes a load electrode coupled to the light modulator and a drive electrode set positioned proximate to the load electrode. The drive electrode set includes a plurality of discrete portions configured to move the light modulator to a plurality of corresponding distinct light modulator states that are defined by a degree of actuation of the electrostatic actuator. A first portion is positioned opposing a first region of the load electrode and a second portion is positioned opposing a second region of the load electrode.

In some implementations, the load electrode is compliant and configured to deform towards the drive electrode set. In some implementations, each of the plurality of discrete portions is configured to receive a separate actuation voltage. In some implementations, the electrostatic actuator is configured such that a degree of deformation of the load electrode corresponds to a magnitude of an actuation voltage applied to the drive electrode set.

In some implementations, each of the discrete portions of the drive electrode set has an actuation surface configured to electrostatically engage with a corresponding region of the load electrode. In some implementations, each of the plurality of discrete portions is coupled to a single actuation voltage interconnect. In some such implementations, the first portion is configured to electrostatically engage the first region of the load electrode at a first actuation voltage and the second portion is configured to electrostatically engage the second region of the load electrode at a second actuation voltage that is greater than the first actuation voltage.

In some implementations, the electrostatic actuator is configured such that a first distance between a first end point of the first discrete portion and the first region of the load electrode when the first discrete portion is not electrostatically engaged with the first region is smaller than a second distance between a second end point of the second discrete portion and the second region of the load electrode when the first discrete portion is electrostatically engaged with the first region of the load electrode. In some implementations, each of the discrete portions of the drive electrode set has an actuation surface configured to electrostatically engage with a corresponding region of the load electrode.

In some implementations, each of the plurality of discrete portions is coupled to a single actuation voltage interconnect. In some implementations, the portions have different corresponding curvatures. In some implementations, the load electrode is compliant and configured to deform towards the drive electrode set. In some implementations, the electrostatic actuator is configured such that a degree of deformation of the load electrode corresponds to a number of portions to which an actuation voltage is applied.

In some implementations, the first region of the load electrode is electrically coupled to a second region of the load electrode via a serpentine member. In some implementations, a portion of the light modulator forms the second portion of the load electrode. In some implementations, the electrostatic actuator is a first electrostatic actuator configured to move the shutter in a first direction and the apparatus includes a second electrostatic actuator configured to move the shutter in a second direction opposite the first direction. The second electrostatic actuator includes a second drive electrode set includes a plurality of discrete portions. The first region of the load electrode is positioned between a first portion of the first drive electrode set and a first portion of the second drive electrode set and the second region of the load electrode is positioned between a second portion of the first drive electrode set and a second portion of the second drive electrode set.

In some implementations, the portions are arranged such that a distance separating the first portion and the load electrode is smaller than a distance separating the second portion and the load electrode. In some implementations, the portions are arranged in a step-wise manner.

In some implementations, the portions are positioned such that the load electrode is positioned between the first portion and the second portion. In some implementations, the electrostatic actuator is configured such that when the first discrete portion is not electrostatically engaged with the first region, a first end point of the first discrete portion is separated from the first region of the load electrode by a first distance. When the first discrete portion is electrostatically engaged with the first region of the load electrode, a second end point of the second discrete portion is separated from the second region of the load electrode by a second distance, and the first distance is smaller than the second distance.

In some implementations, the electrostatic actuator is a first electrostatic actuator and configured to move the light modulator in a first direction. In some such implementations, the apparatus further includes a second electrostatic actuator configured to move the light modulator in a second direction opposite the first direction.

In some implementations, the apparatus includes a substrate having an aperture formed in the substrate and the light modulator is supported over the aperture. In some such implementations, the light modulator is configured to move to a partially light transmissive state when the first discrete portion is electrostatically engaged with the first region of the load electrode and configured to move to a completely light transmissive state when the second discrete portion is electrostatically engaged with the second region of the load electrode.

In some implementations, the shutter, the first actuator, and the second actuator form a display element. In some such implementations, the apparatus further includes a display including an array of display elements and a processor that is configured to communicate with the display. The processor being configured to process image data. In some implementations, the apparatus also includes a memory device that is configured to communicate with the processor. In some implementations, a driver circuit is configured to send at least one signal to the display and the controller is configured to send at least a region of the image data to the driver circuit.

In some implementations, an image source module is configured to send the image data to the processor. The image source module includes at least one of a receiver, transceiver and transmitter. In some implementations, an input device is configured to receive input data and to communicate the input data to the processor.

Another innovative aspect of the subject matter described in this disclosure can be implemented in an apparatus having a light modulator and an electrostatic actuator that includes a compliant load electrode coupled to the light modulator and a drive electrode set positioned opposing the load electrode. The drive electrode set includes a plurality of discrete portions configured to drive the light modulator to a plurality of corresponding distinct light modulator states. A degree of deformation of the load electrode corresponds to a number of portions to which an actuation voltage is applied.

In some implementations, each of the plurality of discrete portions is coupled to a separate actuation voltage interconnect. In some implementations, the first portion is configured to electrostatically engage a first region of the load electrode and the second portion is configured to electrostatically engage a second region of the load electrode.

In some implementations, a first region of the load electrode is electrically coupled to a second region of the load electrode via a serpentine member. In some implementations, a portion of the light modulator includes the second portion of the load electrode. In some implementations, the electrostatic actuator is a first electrostatic actuator and configured to drive the light modulator in a first direction. In some implementations, the apparatus further includes a second electrostatic actuator configured to drive the light modulator in a second direction opposite the first direction. In some implementations, the second electrostatic actuator includes a second drive electrode set that includes a plurality of discrete portions. The first region of the load electrode is positioned between a first portion of the first drive electrode set and a first portion of the second drive electrode set and the second region of the load electrode is positioned between a second portion of the first drive electrode set and a second portion of the second drive electrode set.

In some implementations, the electrostatic actuator is configured such that when the first discrete portion is not electrostatically engaged with the first region, a first end point of the first discrete portion is separated from the first region of the load electrode by a first distance. When the first discrete portion is electrostatically engaged with the first region of the load electrode, a second end point of the second discrete portion is separated from the second region of the load electrode by a second distance, and the first distance is smaller than the second distance.

In some implementations, the apparatus includes a substrate having an aperture formed in the substrate. In some such implementations, the light modulator is supported over the aperture and the light modulator is configured to move to a partially light transmissive state when the first discrete portion is electrostatically engaged with the first region of the load electrode and configured to move to a completely light transmissive state when the second discrete portion is electrostatically engaged with the second region of the load electrode.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCDs), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
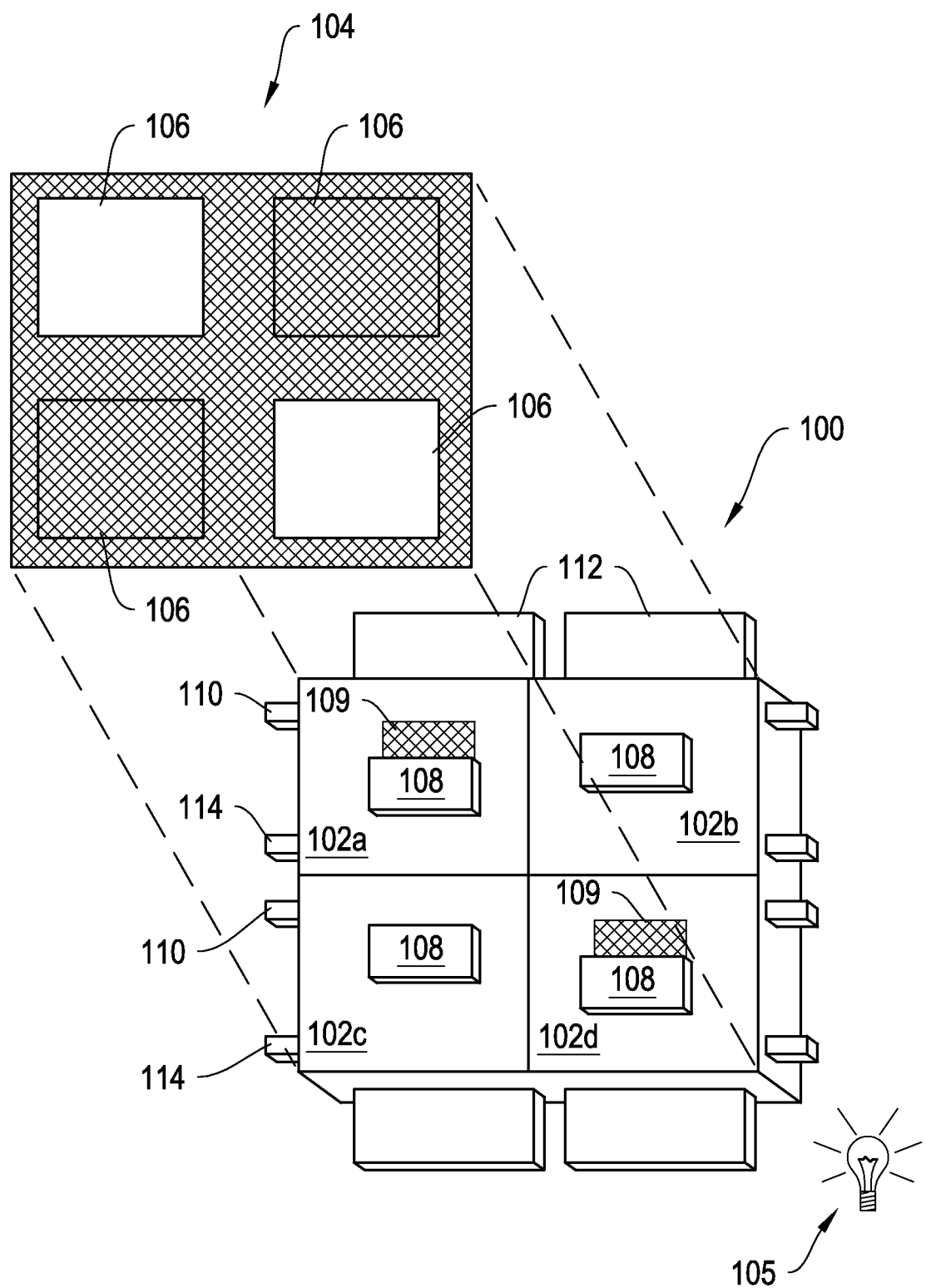
FIG. 1A shows a schematic diagram of an example direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (for example, e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

As described above, certain displays that have shutters that operate in only two states tend to implement subframe weights by relying primarily on temporal modulation, for example, by adjusting the duration for which a light modulator remains open. Displays that incorporate display elements having shutters that can operate in more than two states can employ spatial modulation to allow pixels to take on several possible values in a single subframe. This allows such displays to implement subframe weights using area division gray scale in addition to time division gray scale. In such schemes, subframe weights are implemented by controlling the size of the area from which light passes through a light modulator. In some implementations, the light modulator, such as a shutter assembly, can be driven to multiple light modulator states corresponding to different amounts of light passing through the shutter assembly.

In some implementations, the shutter assembly includes an electrostatic actuator that includes a load electrode coupled to a shutter and a drive electrode set positioned proximate to the load electrode. The drive electrode set includes a plurality of discrete portions that are configured to drive the shutter assembly to a plurality of different light modulator states. In some such implementations, the portions of the drive electrode set are positioned proximate to corresponding regions of the load electrode. In some implementations, the portions are arranged such that the portions are configured to electrostatically engage with adjacent regions of the load electrode.

In some such implementations, the portions of the drive electrode set are arranged in a step-wise manner such that the distance between a first portion of the drive electrode set and a corresponding first region of the load electrode is smaller than the distance between a second portion of the drive electrode set and a corresponding second region of the load electrode when the shutter assembly is in a relaxed state. Moreover, when the first drive electrode is in contact with the first region, the distance between the second portion and the second region of the load electrode is smaller than the distance between a third portion of the drive electrode set and a corresponding third region of the load electrode.

In some other implementations, the portions are arranged such that the portions are configured to electrostatically engage with regions of the load electrode that are not adjacent to one another. In some such implementations, the load electrode has a serpentine shape. That is, the load electrode includes one or more folds, curves or bends.

In some of the implementations described above, each of the portions can receive a separate actuation voltage. In some such implementations, the shutter assembly is driven to a light modulator state that corresponds to a number of portions to which a corresponding actuation voltage is applied. However, in some other implementations, each of the portions is electrically coupled.

In some such implementations, the portions of the drive electrode set are strategically shaped such that the second portion has a steeper curvature than the first portion and the third portion has a steeper curvature than the second portion. In such implementations, the shutter assembly is driven to a light modulator state that corresponds to the magnitude of the actuation voltage applied to the drive electrode set.

In some other implementations, the shutter of a multi-state shutter assembly can form part of the load electrode of an electrostatic shutter. As such, a portion of a corresponding drive set electrode can electrostatically attract the shutter such that the shutter comes in contact with the portion.

Particular implementations of the subject matter described in this disclosure can be implemented to realize one or more of the following potential advantages. By incorporating electrostatic actuators having a drive set electrode that includes a plurality of discrete portions, a shutter assembly can be configured to enter into at least three light modulator states, an open, light-transmissive state, a closed, light obstructing state, and a partially open, partially transmissive state. By including shutter assemblies that can achieve additional states, a display apparatus can utilize area division gray scale techniques to form an image using fewer subframes. In some implementations, shutter assemblies having a drive electrode set that includes mechanically and electrically connected drive electrode segments can be driven using a single actuation voltage interconnect, thereby reducing the amount of real estate occupied by the backplane circuitry and allowing for larger apertures or increased pixel density. In some implementations, a single load electrode is used to drive the shutter towards a fully light transmissive state and a non-light transmissive state. This also reduces the number of components in each pixel, thereby simplifying the manufacturing process, while occupying less real estate. In some implementations in which the drive electrodes are positioned opposing non-adjacent regions of the corresponding load electrode, the shutter can travel larger distances between light modulator states. Such an arrangement can allow for larger apertures, thereby increasing the aperture ratio of the display.

In some implementations in which the shutter forms a portion of the load electrode, having drive electrode sets that include a primary drive electrode that electrostatically engages with an opposing load electrode and a secondary drive electrode that electrostatically engages with the shutter can cause the shutter to move between a light transmissive state and a non-light transmissive state faster than implementations that only include primary drive electrodes. Moreover, by positioning the secondary drive electrodes such that they electrostatically engage the shutter, the secondary drive electrodes can be used to control the movement of the shutter with even greater precision. In addition, the use of the secondary drive electrodes can reduce the amount of voltage the primary drive electrodes require to move the shutter between a light transmissive state and a non-light transmissive state.

FIG. 1A shows a schematic diagram of an example direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (for example, interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, for example, transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
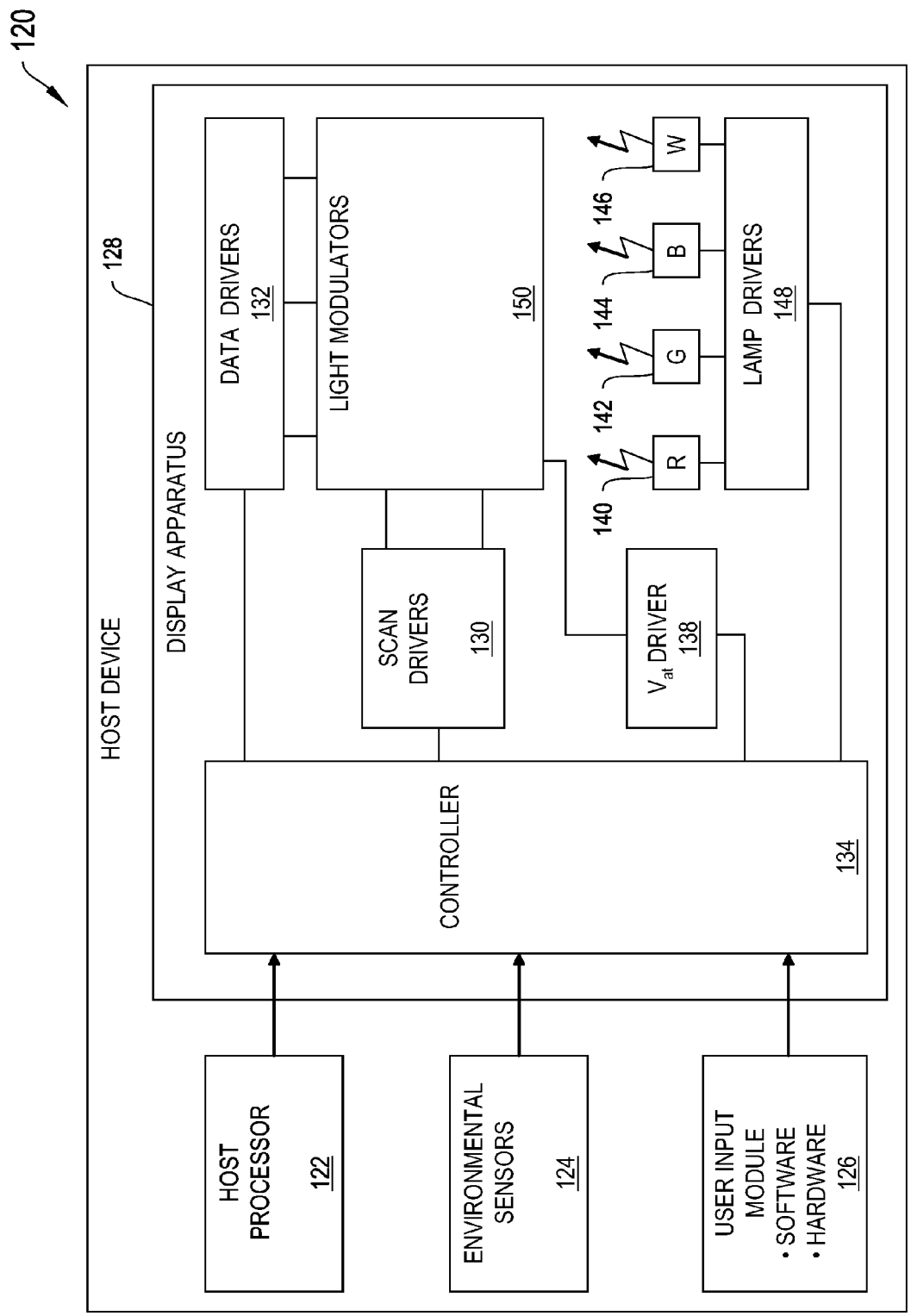
FIG. 1B shows a block diagram of an example host device.

FIG. 1B shows a block diagram of an example host device 120 (i.e., cell phone, smart phone, PDA, MP3 player, tablet, e-reader, netbook, notebook, etc.). The host device 120 includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and an array 150 of display elements, such as the light modulators 102 shown in FIG. 1A. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in sequences, which in some implementations may be predetermined, grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (for example, scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array 150 of display elements, the output of voltages from the data drivers 132, and the output of voltages that provide for display element actuation. In some implementations, the lamps are light emitting diodes (LEDs).

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array 150, for instance by addressing only every $5^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120. The environmental sensor module 124 receives data about the ambient environment, such as temperature and or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2:
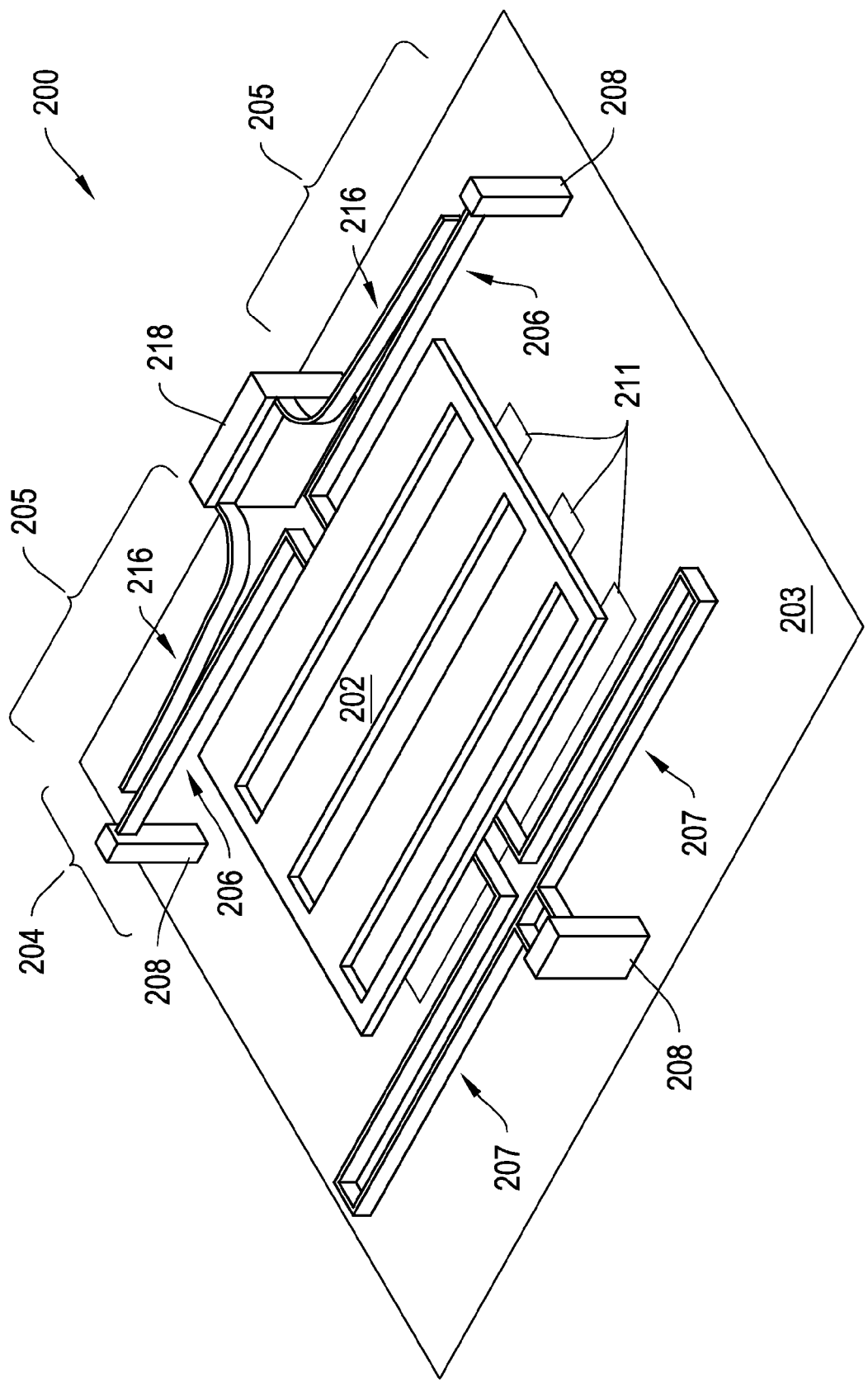
FIG. 2 shows a perspective view of an example shutter-based light modulator.

FIG. 2 shows a perspective view of an example shutter-based light modulator 200. The shutter-based light modulator 200 is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a substrate 203 in a plane of motion which is substantially parallel to the substrate 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the substrate 203. The substrate 203 includes one or more aperture holes 211 for admitting the passage of light. The load anchors 208 physically connect the compliant load beams 206 and the shutter 202 to the substrate 203 and electrically connect the load beams 206 to a bias voltage, in some instances, ground.

If the substrate is opaque, such as silicon, then aperture holes 211 are formed in the substrate by etching an array of holes through the substrate 203. If the substrate 203 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 204 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely toward the drive beam anchor 218. The compliant load beams 206 act as springs, such that when the voltage across the beams 206 and 216 potential is removed, the load beams 206 push the shutter 202 back into its initial position, releasing the stress stored in the load beams 206.

A light modulator, such as the light modulator 200, incorporates a passive restoring force, such as a spring, for returning a shutter to its rest position after voltages have been removed. Other shutter assemblies can incorporate a dual set of "open" and "closed" actuators and a separate set of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

Figure 3A:
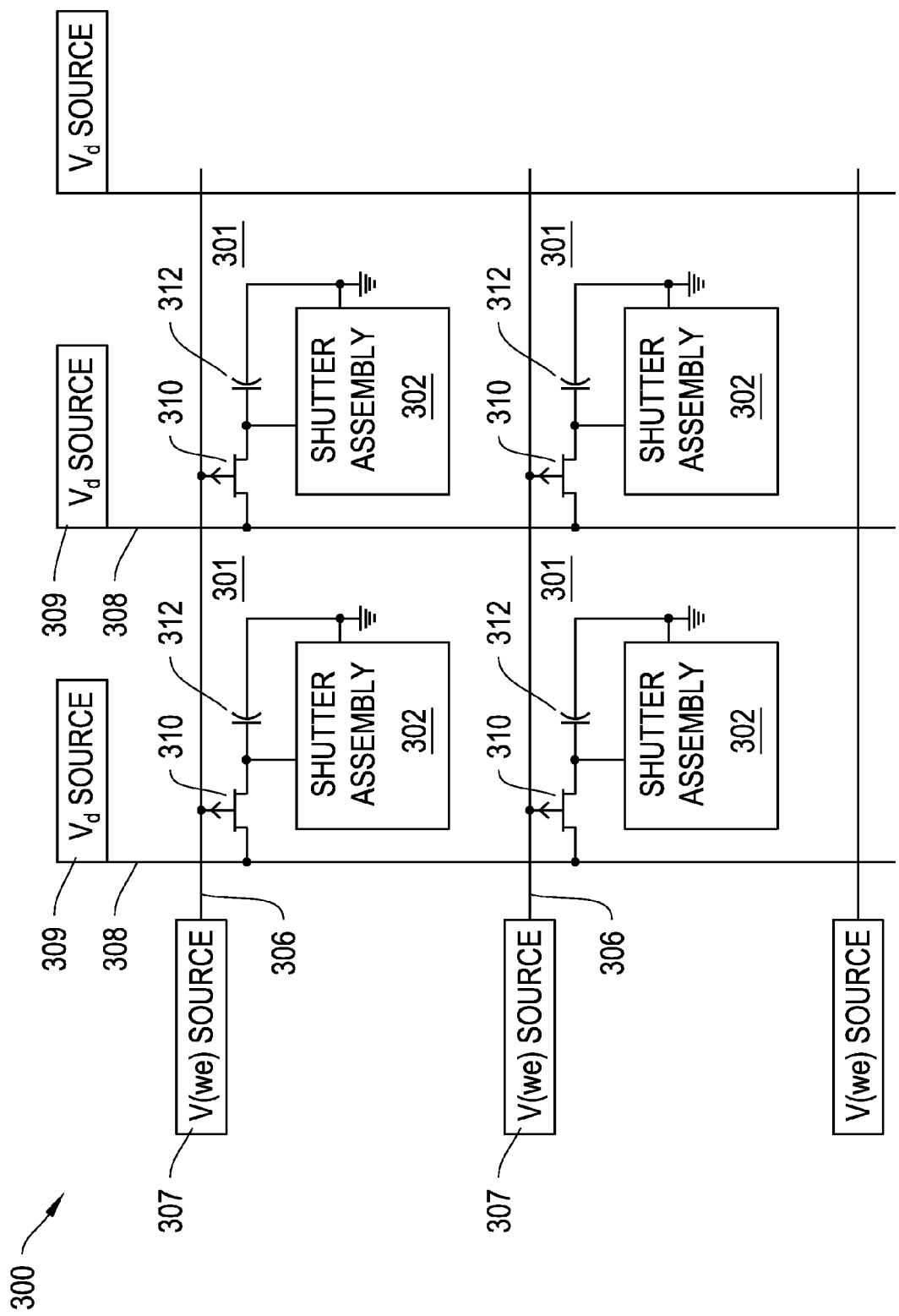
FIG. 3A shows a schematic diagram of an example control matrix.
Figure 3B:
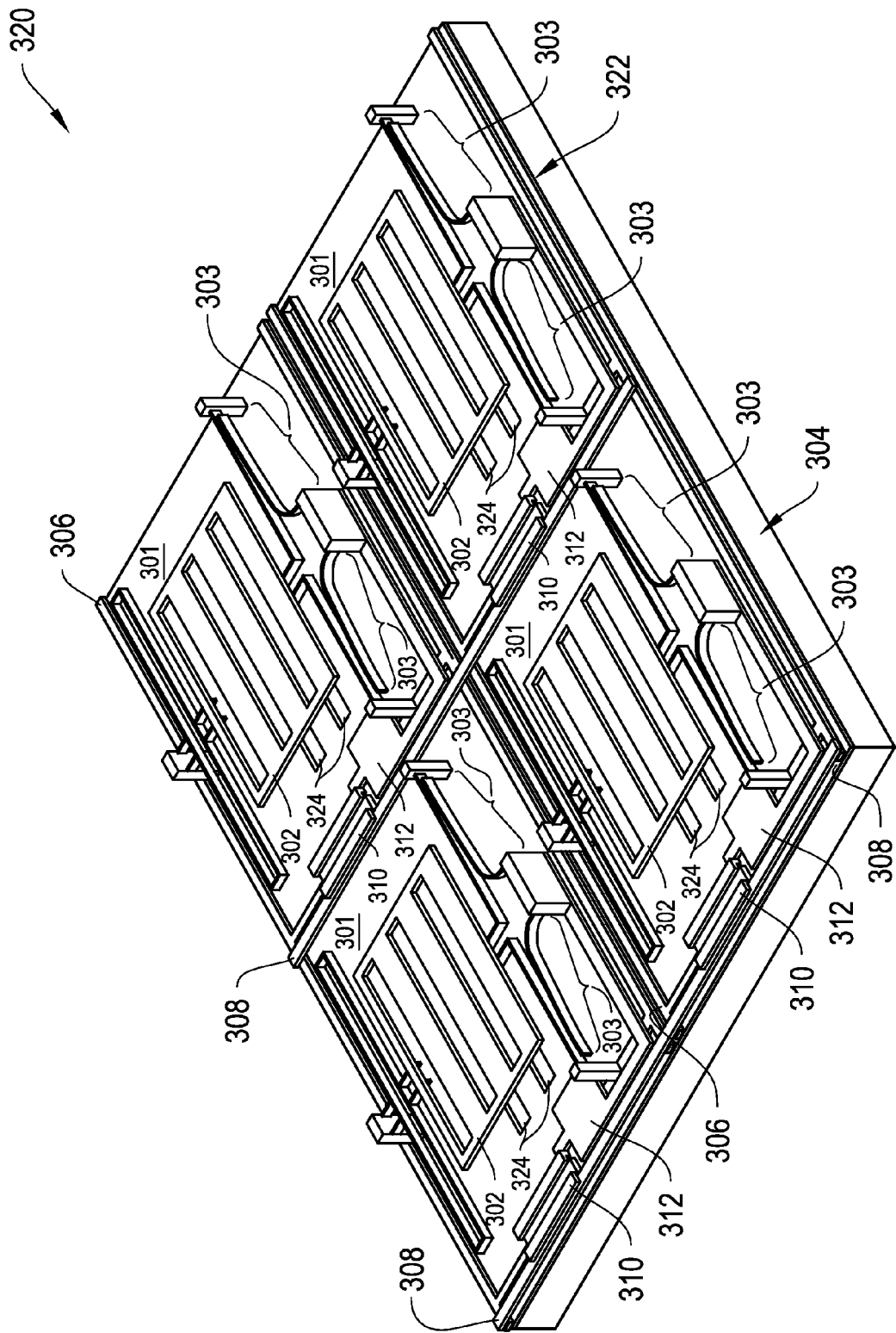
FIG. 3B shows a perspective view of an example array of shutter-based light modulators connected to the control matrix of FIG. 3A.

FIG. 3A shows a schematic diagram of an example control matrix 300. The control matrix 300 is suitable for controlling the light modulators incorporated into the MEMS-based display apparatus 100 of FIG. 1A. FIG. 3B shows a perspective view of an example array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array 320 includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (for example, open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as the spring 207 in the shutter-based light modulator 200 depicted in FIG. 2, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

Figure 4A:
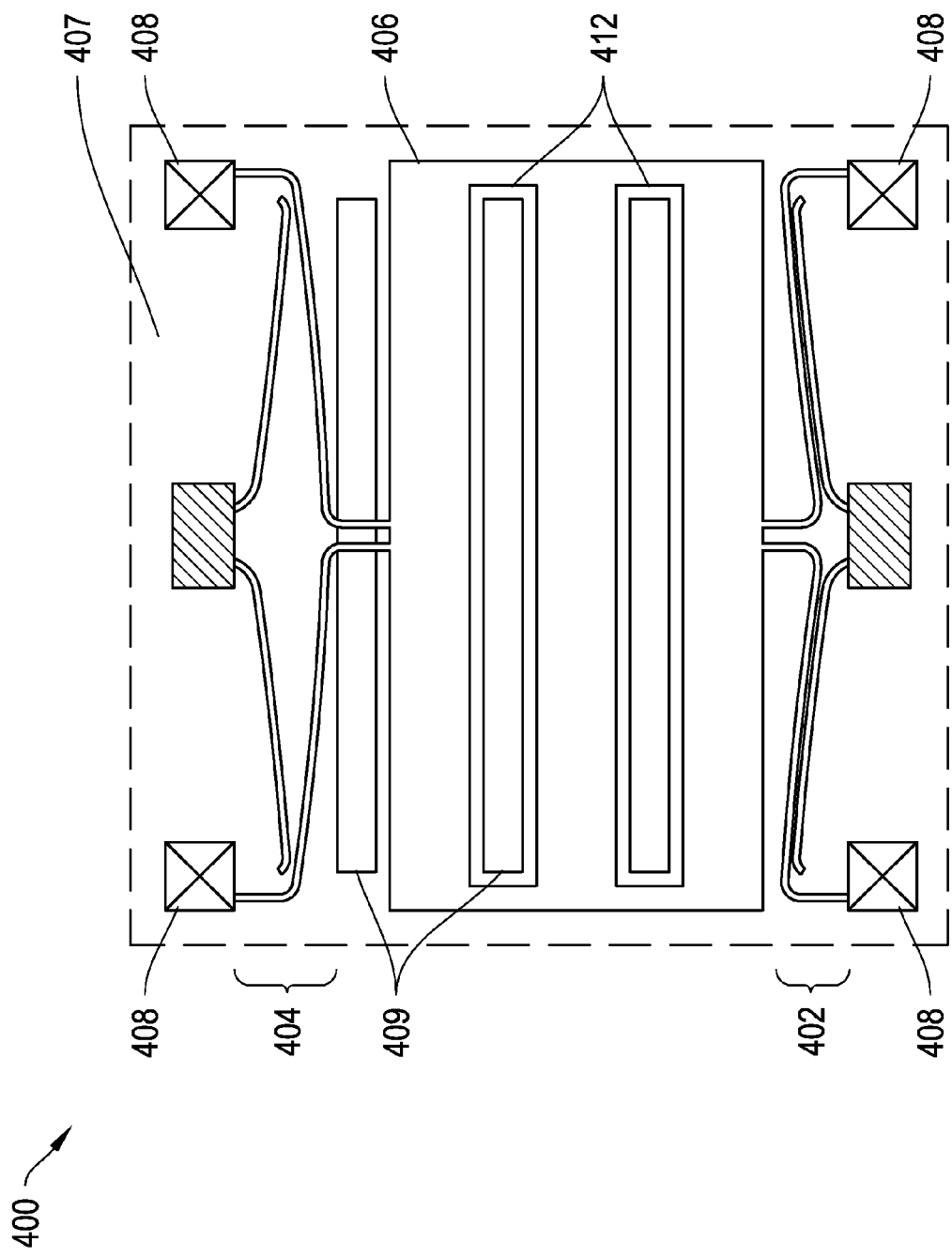
FIGS. 4A and 4B show views of an example dual actuator shutter assembly.
Figure 4B:
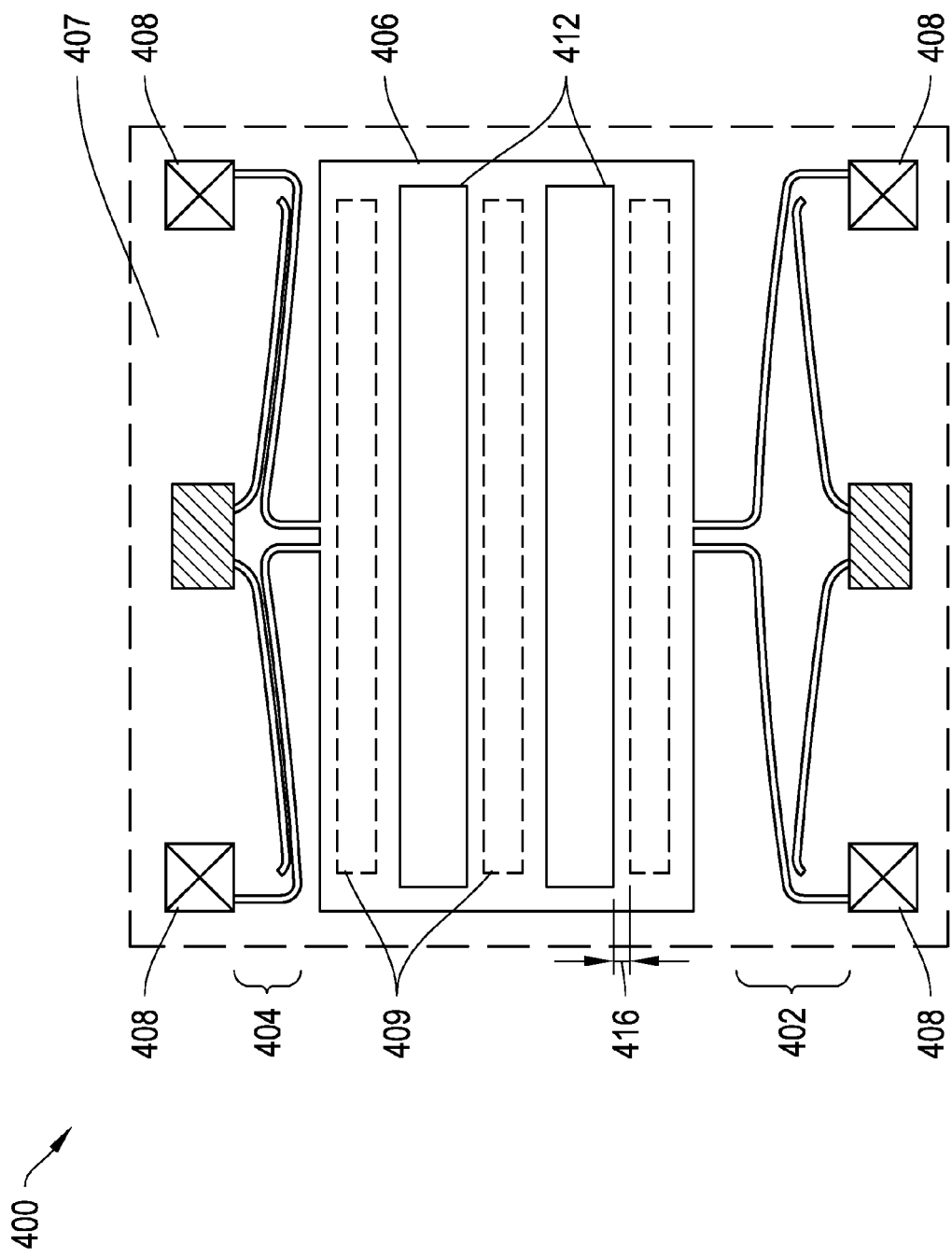

FIGS. 4A and 4B show views of an example dual actuator shutter assembly 400. The dual actuator shutter assembly 400, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with the shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B the shutter assembly 400 has been moved to the closed state and, as such, the shutter-open actuator 402 is in its relaxed position, the shutter-close actuator 404 has been actuated, and the light blocking drive electrodes of the shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while drive electrodes or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking drive electrodes of the shutter 406 overlap the apertures 409. FIG. 4B shows a overlap 416, which can be predefined, between the edge of light blocking drive electrodes in the shutter 406 and one edge of the aperture 409 formed in the aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 5:
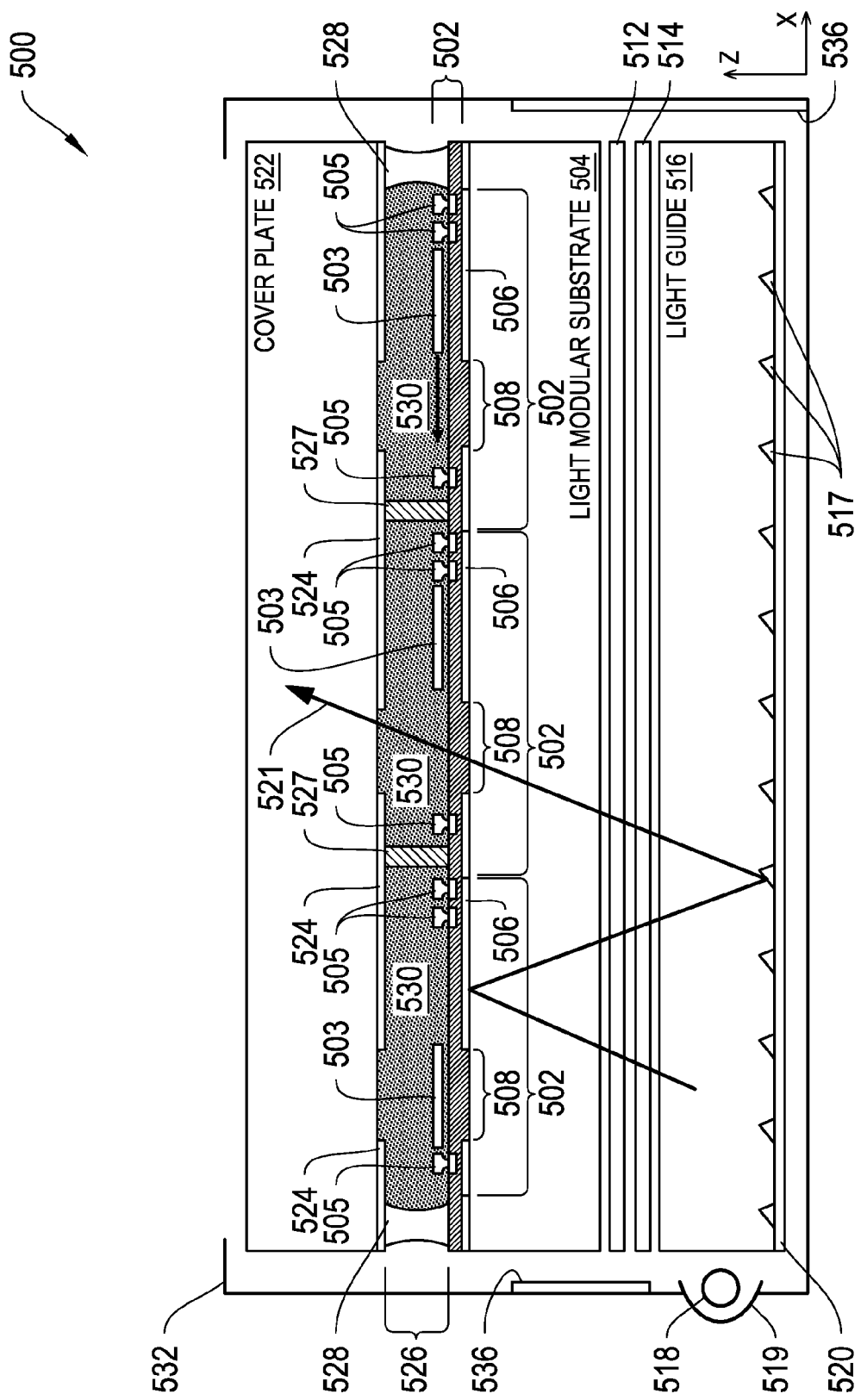
FIG. 5 shows a cross sectional view of an example display apparatus incorporating shutter-based light modulators.

FIG. 5 shows a cross sectional view of an example display apparatus 500 incorporating shutter-based light modulators (shutter assemblies) 502. Each shutter assembly 502 incorporates a shutter 503 and an anchor 505. Not shown are the compliant beam actuators which, when connected between the anchors 505 and the shutters 503, help to suspend the shutters 503 a short distance above the surface. The shutter assemblies 502 are disposed on a transparent substrate 504, such a substrate made of plastic or glass. A rear-facing reflective layer or reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective film 506 can be a fine-grained metal film without inclusions formed in thin film fashion by a number of vapor deposition techniques including sputtering, evaporation, ion plating, laser ablation, or chemical vapor deposition (CVD). In some other implementations, the reflective film 506 can be formed from a mirror, such as a dielectric mirror. A dielectric mirror can be fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 depicted in FIG. 4B.

The display apparatus 500 includes an optional diffuser 512 and/or an optional brightness enhancing film 514 which separate the substrate 504 from a planar light guide 516. The light guide 516 includes a transparent, i.e., glass or plastic material. The light guide 516 is illuminated by one or more light sources 518, forming a backlight. The light sources 518 can be, for example, and without limitation, incandescent lamps, fluorescent lamps, lasers or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion light that fails to leave the display apparatus 500 to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light redirectors 517 can be molded into the plastic body of light guide 516 with shapes that can be alternately triangular, trapezoidal, or curved in cross section. The density of the prisms 517 generally increases with distance from the lamp 518.

In some implementations, the reflective film 506 can be made of a light absorbing material, and in alternate implementations the surfaces of shutter 503 can be coated with either a light absorbing or a light reflecting material. In some other implementations, the reflective film 506 can be deposited directly on the surface of the light guide 516. In some implementations, the reflective film 506 need not be disposed on the same substrate as the shutters 503 and anchors 505 (such as in the MEMS-down configuration described below).

In some implementations, the light sources 518 can include lamps of different colors, for instance, the colors red, green and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps, or red, green, blue and yellow lamps. In some other implementations, the light source 518 may include cyan, magenta, yellow and white lamps, red, green, blue and white lamps. In some other implementations, additional lamps may be included in the light source 518. For example, if using five colors, the light source 518 may include red, green, blue, cyan and yellow lamps. In some other implementations, the light source 518 may include white, orange, blue, purple and green lamps or white, blue, yellow, red and cyan lamps. If using six colors, the light source 518 may include red, green, blue, cyan, magenta and yellow lamps or white, cyan, magenta, yellow, orange and green lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a distance away, which in some implementations may be predetermined, from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a fluid 530. The fluid 530 is engineered with viscosities preferably below about 10 centipoise and with relative dielectric constant preferably above about 2.0, and dielectric breakdown strengths above about $10^4$ V/cm. The fluid 530 also can serve as a lubricant. In some implementations, the fluid 530 is a hydrophobic liquid with a high surface wetting capability. In alternate implementations, the fluid 530 has a refractive index that is either greater than or less than that of the substrate 504.

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a fluid (also referred to as fluid 530) and sealing the fluid (for example, with an adhesive) within a fluid space or gap in a MEMS display cell. The fluid 530 is usually one with a low coefficient of friction, low viscosity, and minimal degradation effects over the long term. When the MEMS-based display assembly includes a liquid for the fluid 530, the liquid at least partially surrounds some of the moving parts of the MEMS-based light modulator. In some implementations, in order to reduce the actuation voltages, the liquid has a viscosity below 70 centipoise. In some other implementations, the liquid has a viscosity below 10 centipoise. Liquids with viscosities below 70 centipoise can include materials with low molecular weights: below 4000 grams/mole, or in some cases below 400 grams/mole. Fluids 530 that also may be suitable for such implementations include, without limitation, de-ionized water, methanol, ethanol and other alcohols, paraffins, olefins, ethers, silicone oils, fluorinated silicone oils, or other natural or synthetic solvents or lubricants. Useful fluids can be polydimethylsiloxanes (PDMS), such as hexamethyldisiloxane and octamethyltrisiloxane, or alkyl methyl siloxanes such as hexylpentamethyldisiloxane. Useful fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. Other fluids considered for these display assemblies include butyl acetate and dimethylformamide. Still other useful fluids for these displays include hydro fluoro ethers, perfluoropolyethers, hydro fluoro poly ethers, pentanol, and butanol. Example suitable hydro fluoro ethers include ethyl nonafluorobutyl ether and 2-trifluoromethyl-3-ethoxydodecafluorohexane.

A sheet metal or molded plastic assembly bracket 532 holds the cover plate 522, the substrate 504, the backlight and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of the light guide 516 back into the light guide 516. Not depicted in FIG. 5 are electrical interconnects which provide control signals as well as power to the shutter assemblies 502 and the lamps 518.

The display apparatus 500 is referred to as the MEMS-up configuration, where the MEMS based light modulators are formed on a front surface of the substrate 504, i.e., the surface that faces toward the viewer. The shutter assemblies 502 are built directly on top of the reflective film 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in the display apparatus 500 and is oriented such that the MEMS-based light modulators are positioned on the rear surface of the top substrate, i.e., the surface that faces away from the viewer and toward the light guide 516. The MEMS-based light modulators are thereby positioned directly opposite to and across a gap from the reflective film 506. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures is preferably less than 10 microns, or a distance that is less than the overlap between shutters and apertures, such as overlap 416.

Figure 6:
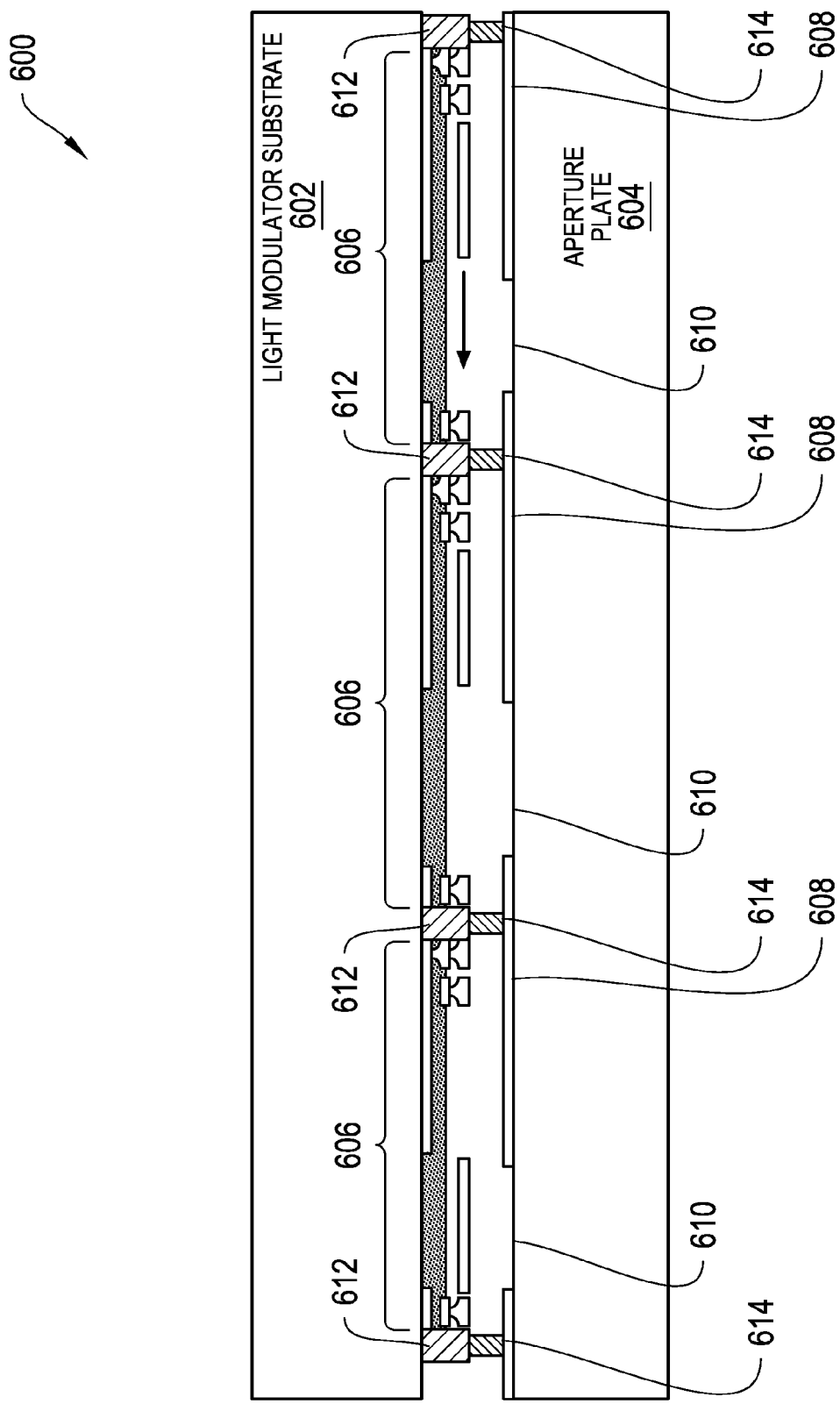
FIG. 6 shows a cross sectional view of an example light modulator substrate and an example aperture plate for use in a MEMS-down configuration of a display.

FIG. 6 shows a cross sectional view of an example light modulator substrate and an example aperture plate for use in a MEMS-down configuration of a display. The display assembly 600 includes a modulator substrate 602 and an aperture plate 604. The display assembly 600 also includes a set of shutter assemblies 606 and a reflective aperture layer 608. The reflective aperture layer 608 includes apertures 610. A gap or separation, which in some implementations may be predetermined, between the modulator substrates 602 and the aperture plate 604 is maintained by the opposing set of spacers 612 and 614. The spacers 612 are formed on or as part of the modulator substrate 602. The spacers 614 are formed on or as part of the aperture plate 604. During assembly, the two substrates 602 and 604 are aligned so that spacers 612 on the modulator substrate 602 make contact with their respective spacers 614.

The separation or distance of this illustrative example is 8 microns. To establish this separation, the spacers 612 are 2 microns tall and the spacers 614 are 6 microns tall. Alternately, both spacers 612 and 614 can be 4 microns tall, or the spacers 612 can be 6 microns tall while the spacers 614 are 2 microns tall. In fact, any combination of spacer heights can be employed as long as their total height establishes the desired separation H12.

Providing spacers on both of the substrates 602 and 604, which are then aligned or mated during assembly, has advantages with respect to materials and processing costs. The provision of a very tall, such as larger than 8 micron spacers, can be costly as it can require relatively long times for the cure, exposure, and development of a photo-imageable polymer. The use of mating spacers as in display assembly 600 allows for the use of thinner coatings of the polymer on each of the substrates.

In another implementation, the spacers 612 which are formed on the modulator substrate 602 can be formed from the same materials and patterning blocks that were used to form the shutter assemblies 606. For instance, the anchors employed for shutter assemblies 606 also can perform a function similar to spacer 612. In this implementation, a separate application of a polymer material to form a spacer would not be required and a separate exposure mask for the spacers would not be required.

Displays that incorporate shutter assemblies that can operate in more than two states can employ spatial modulation to allow pixels to take on several possible values in a single subframe. In particular, a shutter assembly that can assume multiple light modulation states can be implemented to allow different amounts of light to pass through the shutter assembly. Using shutter assemblies with such functionality reduces the number of subframes per color needed to display an image. As described herein, shutter assemblies, such as the shutter assemblies described in FIGS. 7A-11B can be described as light modulator assemblies, which include shutters.

FIGS. 7A-7E show plan views of an example multi-state shutter assembly 700. The shutter assembly 700 can achieve multiple light modulator states to implement an area division gray scale scheme. In an area division gray scale scheme, subframe weights are implemented by controlling the size of the area from which light passes through the shutter assembly 700. As such, to implement an area division gray scale scheme, the shutter assembly 700 can be driven to multiple light modulator states that control the amount of light passing through the shutter assembly 700.

Figure 7A:
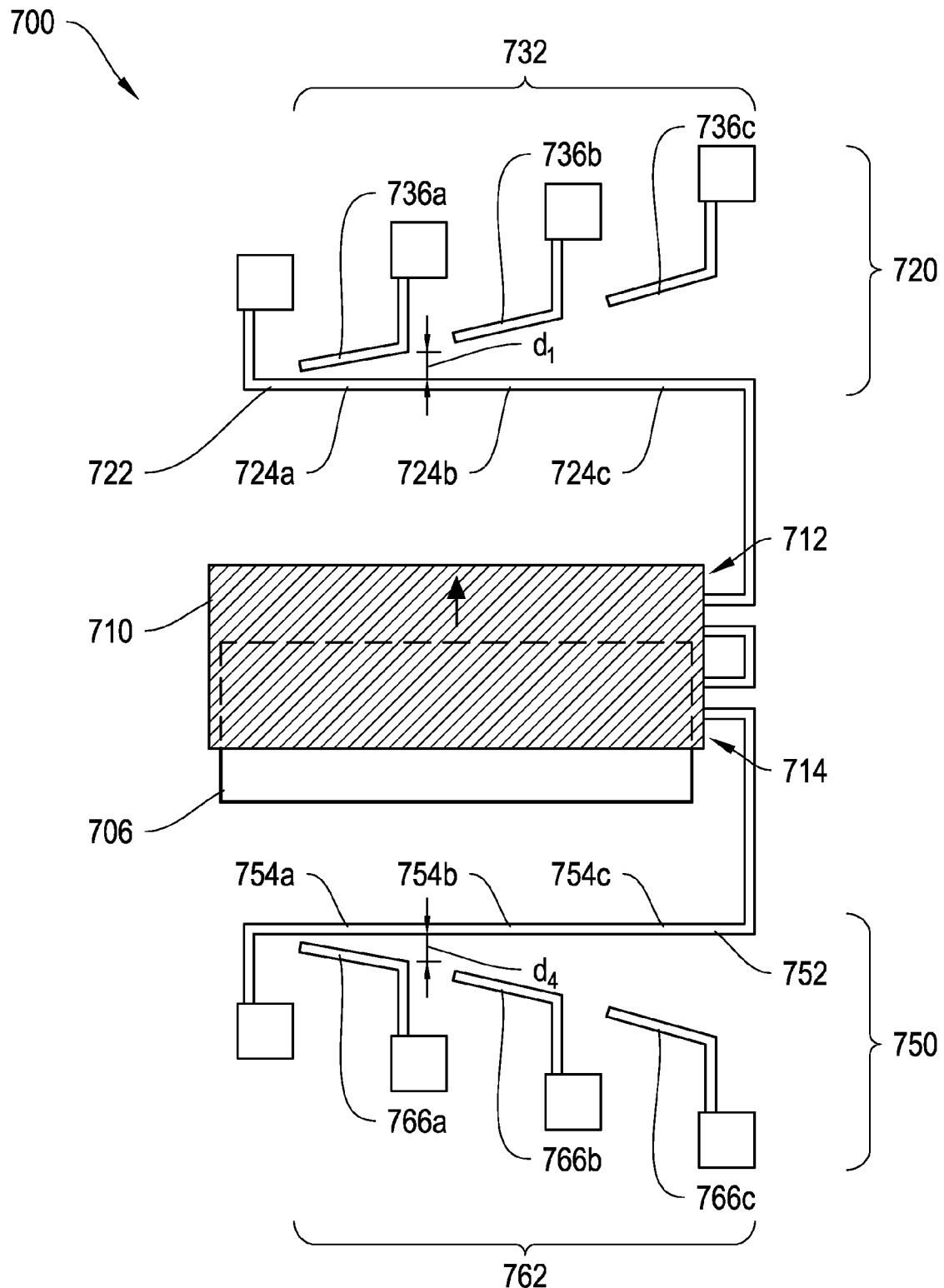
FIGS. 7A-7E show plan views of an example multi-state shutter assembly.
Figure 7B:
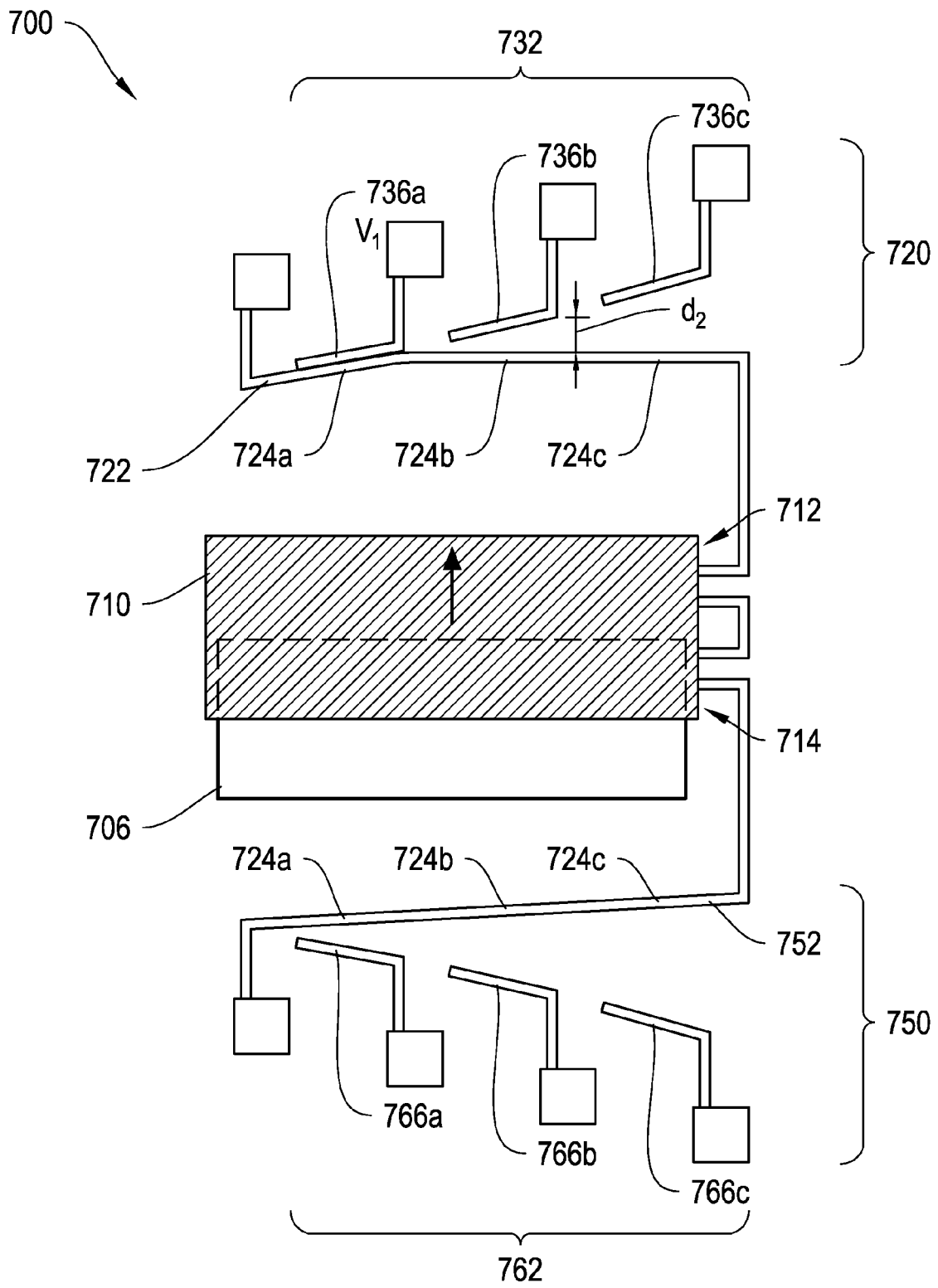
Figure 7C:
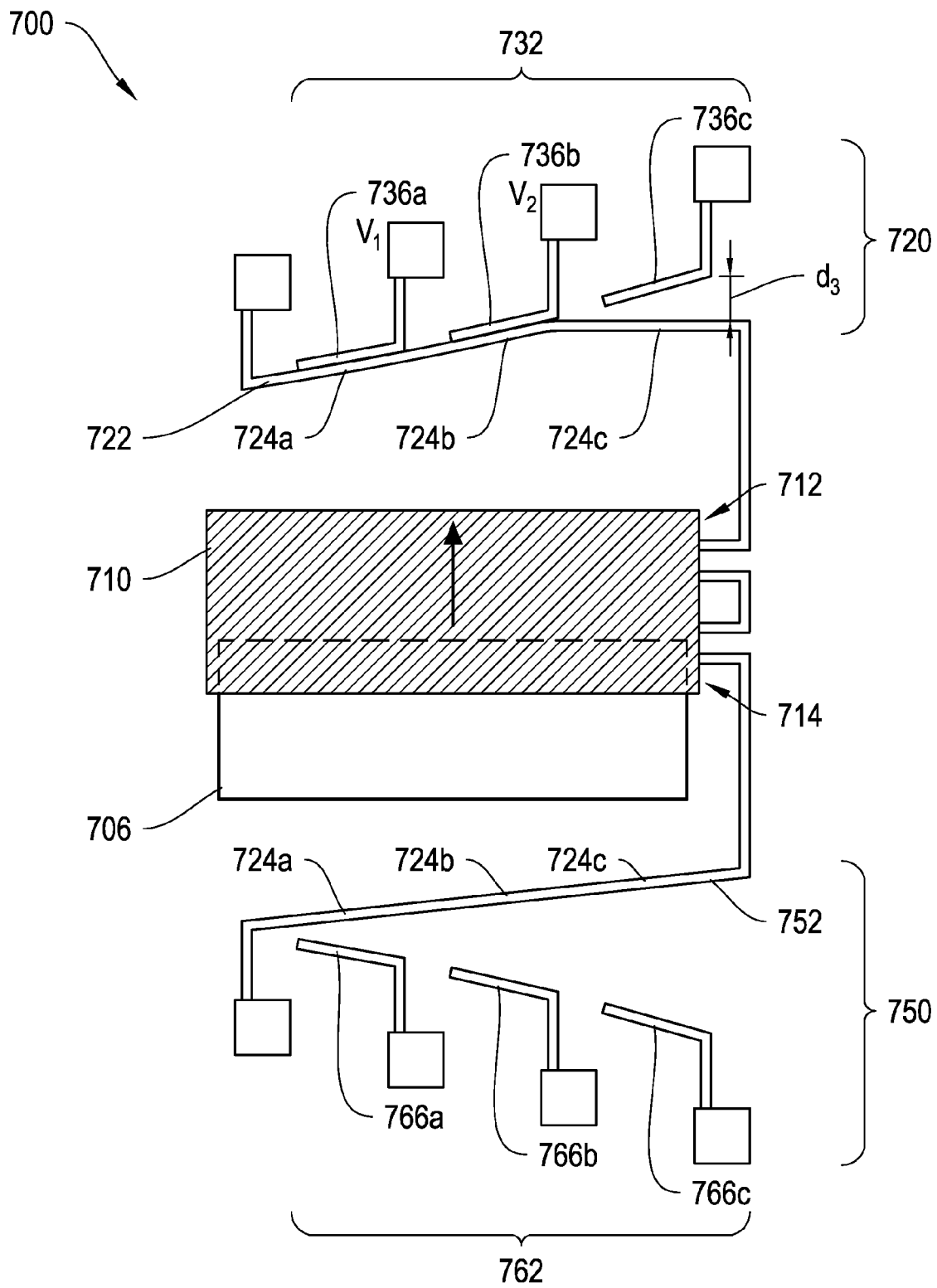
Figure 7D:
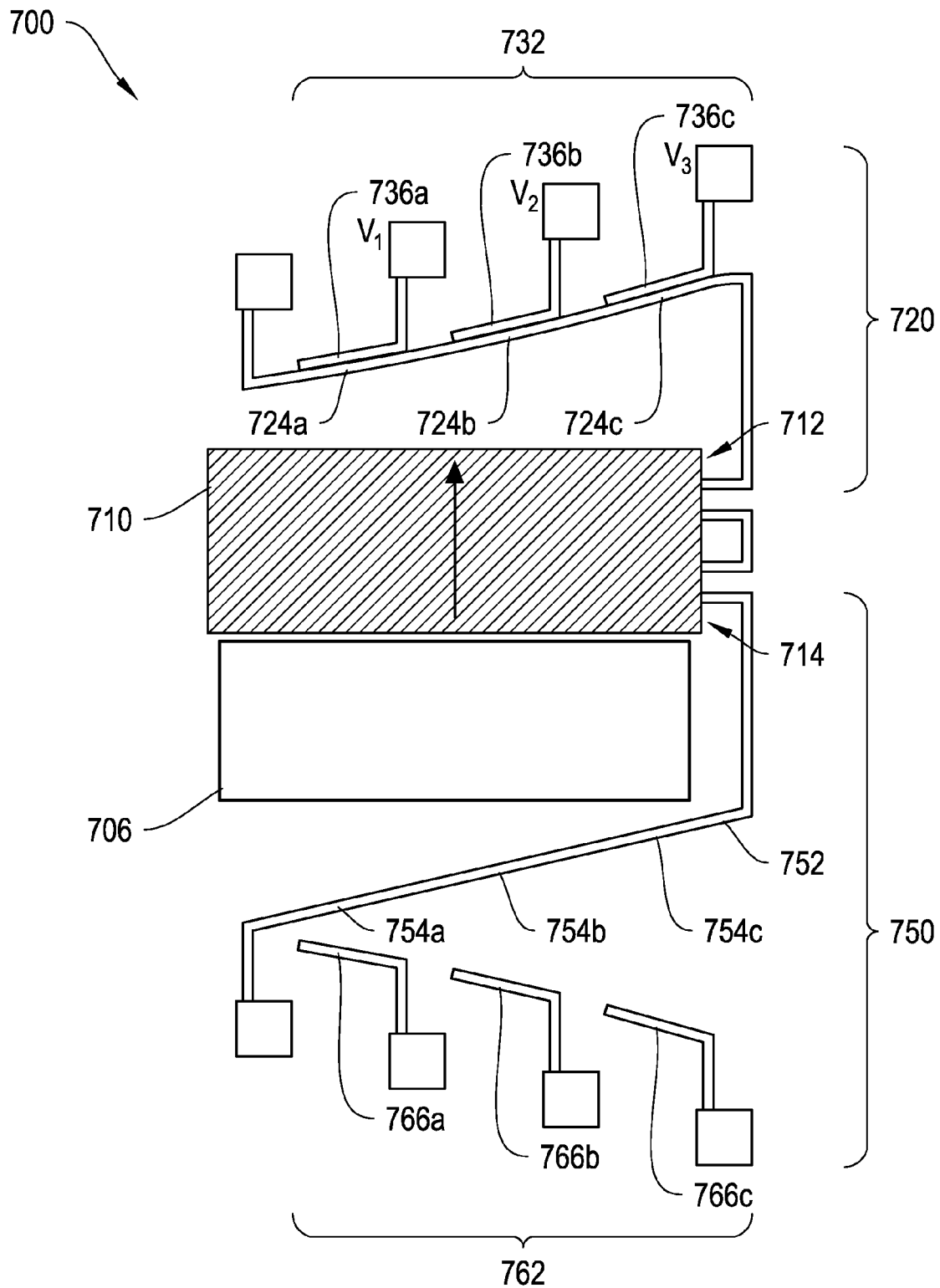
Figure 7E:
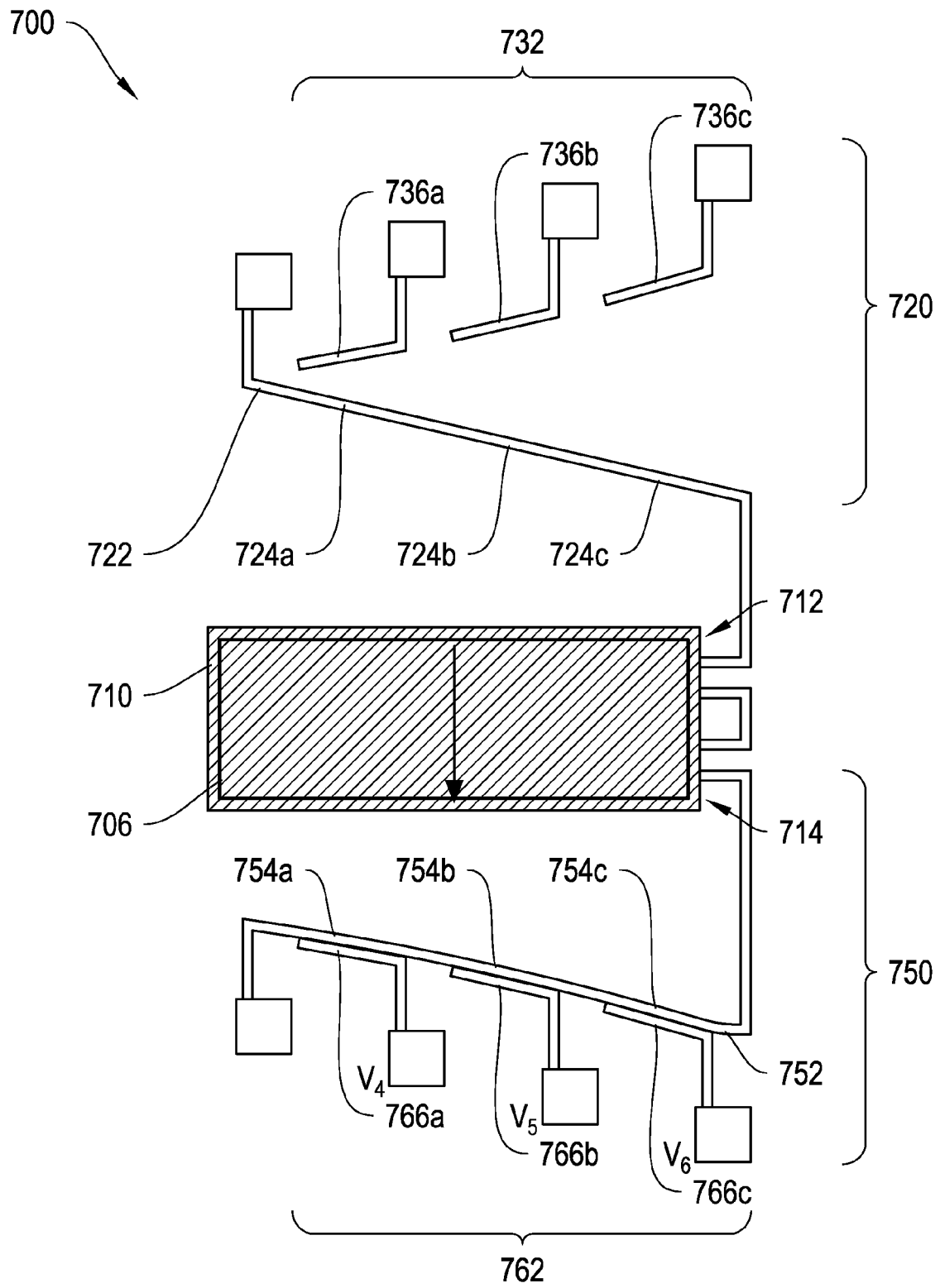

FIG. 7A shows the shutter assembly 700 in a relaxed state. FIG. 7B shows the shutter assembly 700 in a first partially light transmissive state. FIG. 7C shows the shutter assembly 700 in a second partially light transmissive state. FIG. 7D shows the shutter assembly 700 in a fully light transmissive state. FIG. 7E shows the shutter assembly 700 in a non-light transmissive state.

Referring to FIGS. 7A-7E, the shutter assembly 700 includes a shutter 710 that is driven along an axis by two electrostatic actuators, a shutter open actuator 720 and a shutter close actuator 750. The shutter 710 is supported over an aperture 706 by a pair of load electrodes 722 and 752 that form components of the respective shutter open and shutter close actuators 720 and 750.

The shutter open actuator 720 is configured to move the shutter 710 towards the fully light transmissive state in which the shutter 710 does not overlap any portion of the corresponding aperture 706. The shutter open actuator 720 includes the first load electrode 722 that is coupled to one end 712 of the shutter 710. The shutter open actuator 720 also includes a first drive electrode set 732 positioned proximate the first load electrode 722. The first drive electrode set 732 includes a plurality of electrically isolated discrete drive electrodes 736a-736c (generally "drive electrodes 736"), each of which forms a discrete portion of the drive electrode set 732.

The drive electrodes 736 are configured to move the shutter 710 to a plurality of corresponding distinct light modulator states that are defined by a degree of actuation of the shutter open actuator 720. In some implementations, the degree of actuation is based on the number of drive electrodes 736 of the drive electrode set 732 that are actuated. The load electrode 722 is compliant and configured to deform towards the drive electrode set 732 when a sufficiently large actuation voltage is applied to one or more of the drive electrodes 736. As the load electrode 722 deforms towards the drive electrode set 732, the load electrode 722 causes the shutter 710 to move towards the drive electrode set 732 and away from the corresponding aperture 706 through which light can be transmitted. When the load electrode 722 is fully deformed, which occurs when all of the drive electrodes 736a-736c are actuated, no portion of the shutter 710 overlaps the corresponding aperture 706. As a result, none of the light passing through the aperture 706 is blocked by the shutter 710.

In some implementations, the drive electrodes 736 are arranged in a step-wise manner. A first drive electrode 736a is closer to the first load electrode 722 than a second drive electrode 736b or a third drive electrode 736c. The second drive electrode 736b is positioned adjacent the first drive electrode 736a and closer to the first load electrode 722 than the third drive electrode 736c. Each of the drive electrodes 736 corresponds to a different region of the first load electrode 722. That is, the first, second and third drive electrodes 736a-736c are positioned opposing corresponding first, second and third regions 724a-724c, respectively.

The shutter close actuator 750 is substantially similar to the shutter open actuator 720. However, in contrast to the shutter open actuator 720, the shutter close actuator 750 is configured to move the shutter 710 towards a non-light transmissive state in which the shutter 710 completely overlaps the corresponding aperture 706.

The shutter close actuator 750 includes the second load electrode 752 that is coupled to another end 714 of the shutter 710. The shutter close actuator 750 includes a second drive electrode set 762 positioned proximate the second load electrode 752. The second drive electrode set 762 includes a plurality of discrete drive electrodes 766a-766c (generally "drive electrodes 766"), each of which forms a discrete portion of the second drive electrode set 762. The drive electrodes 766 are configured to move the shutter 710 to a plurality of corresponding distinct light modulator states that are defined by a degree of actuation of the shutter close actuator 750.

In some implementations, the shutter 710 can be driven towards the shutter close electrostatic actuator 750 when an actuation voltage is applied to one or more of the drive electrodes of the second drive electrode set 762 of the shutter close actuator 750. In some implementations, the degree of actuation is based on the number of drive electrodes 766 of the second drive electrode set 762 that are actuated. The second load electrode 752 is compliant and configured to deform towards the second drive electrode set 762 when a sufficiently large actuation voltage is applied to one or more of the drive electrodes 766. As the second load electrode 752 deforms towards the second drive electrode set 762, the second load electrode 752 causes the shutter 710 to move towards the second drive electrode set 762 and towards the corresponding aperture 706 through which light can be transmitted. When the second load electrode 752 is fully deformed, which occurs when all of the drive electrodes 766a-766c are actuated, the shutter 710 completely overlaps the corresponding aperture 706 such that all of the light passing through the aperture 706 is blocked by the shutter 710.

The drive electrodes 766a-766c are also arranged in a step-wise manner similar to the drive electrodes 736a-736c. Moreover, the drive electrodes 766a-766c are positioned opposed to corresponding first, second and third regions 754a, 754b and 754c of the second load electrode 752, respectively.

Each of the light modulator states corresponds to a position of the shutter 710 relative to the corresponding aperture 706 through which light is transmitted. The number of light modulator states the shutter assembly 700 can achieve depends on the number of drive electrodes 736 and 766 included in the shutter open and shutter close actuators 720 and 750. In some implementations, the total number of light modulator states that the shutter assembly 700 can reliably achieve can be equal to the total number of drive electrodes 736 and 766. For example, the shutter assembly 700 can readily achieve six distinct light modulator states. In addition, the shutter assembly 700 also can achieve a seventh state, which is the relaxed state.

As shown in FIGS. 7A-7E, the shutter assembly 700 includes the first drive electrode set 732 having three drive electrodes 736 and the second drive electrode set 762 having three drive electrodes 766. In some implementations, the first drive electrode set 732 may include two, four or more than four drive electrodes 736. In some implementations, the second drive electrode set 762 may include two, four or more than four drive electrodes 766. In some implementations, the number of drive electrodes 736 included in the first drive electrode set 732 may be different from the number of drive electrodes 766 included in the second drive electrode set 762. In some implementations, the number of drive electrodes 736 and 766 may depend on various design criteria. In some such implementations, the total number of light modulator states that the shutter assembly can reliably achieve can be equal to the total number of drive electrodes used to form the shutter assembly. As such, by having a greater number of drive electrodes, the shutter assembly can be driven into a greater number of light modulator states.

FIG. 7A shows the shutter assembly 700 in the relaxed state. In this state, neither the shutter open actuator 720 nor the shutter close actuator 750 is actuated. As such, there is no electrostatic force between the drive electrodes 736 and the first load electrode 722 or the drive electrodes 766 and the second load electrode 752. The shutter assembly 700 can be designed such that when it is in the relaxed state, the shutter 710 partially overlaps the corresponding aperture 706. In some such implementations, the shutter 710 can overlap about half of the corresponding aperture 706. It should be appreciated that a person having ordinary skill in the art would readily understand that the shutter assembly 700 can be designed so that when the shutter assembly 700 is in the relaxed state, the shutter does not overlap the aperture 706 at all or completely overlaps the aperture 706. Similarly, in some implementations, the shutter may partially overlap the aperture 706 by an amount other than about half of the aperture. For example, in some such implementations, the shutter 710 may overlap about 12.5%, about 25%, about 33%, about 37.5%, about 50%, about 62.5%, about 66%, about 75% about 87.5%, or any other percentage of the aperture 706.

When the shutter 710 is in the relaxed state, the first region 724a of the first load electrode 722 is separated from the first drive electrode 736a by a distance $d_1$. The distance $d_1$ is sized such that when the shutter assembly 700 is in the relaxed state and a first actuation voltage $V_1$ is applied to the first drive electrode 736a, the first drive electrode 736a electrostatically engages with first region 724a, causing the shutter assembly 700 to be driven to the first partially light transmissive state, as shown in FIG. 7B. Similarly, the first region 754a of the second load electrode 752 is also separated from the first drive electrode 766a of the second drive electrode set 762 by a distance $d_4$. In some implementations, the distance $d_4$ can be substantially equal to the distance $d_1$. In some other implementations, the distance $d_4$ can be greater than or shorter than the distance $d_1$. The distance $d_4$ can be sized such that when the shutter assembly 700 is in the relaxed state and the first actuation voltage $V_1$ is applied to the first drive electrode 766a of the second drive electrode set 762, the first drive electrode 766a electrostatically engages with first region 754a, causing the shutter assembly 700 to be driven to a fourth partially light transmissive state.

FIG. 7B shows the shutter assembly in the first partially light transmissive state. In this state, the first drive electrode 736a of the first drive electrode set 732 is electrostatically engaged with the first region 724a of the first load electrode 722. By applying the first actuation voltage $V_1$ to the first drive electrode 736a, a sufficiently large electrostatic force between the first drive electrode 736a and the first region 724a is created. The electrostatic force attracts the first region 724a towards the first drive electrode 736a causing the first load electrode 722 to deform towards the first drive electrode set 732. The deformation of the first load electrode 722 causes the shutter 710 to move towards the first drive electrode set 732 such that the shutter 710 overlaps a smaller portion of the corresponding aperture 706 relative to when the shutter 710 is in the relaxed state. As such, the shutter assembly 700 allows more light to pass through in the first partially light transmissive state relative to the relaxed state. The first drive electrode 736a serves as a mechanical stop for the load electrode 722 thereby limiting the motion of the shutter 710 to a position corresponding to the first partially light-transmissive state.

As described above, the second drive electrode 736b is positioned opposing the second region 724b of the first load electrode 722. The second drive electrode 736b is positioned at a distance $d_2$ away from the second region 724b of the first load electrode 722 when the first load electrode 722 is electrostatically engaged with the first drive electrode 736a. In some implementations, this distance $d_2$ is sized such that when the first load electrode 722 is electrostatically engaged with the first drive electrode 736a and a second actuation voltage $V_2$ is applied to the second drive electrode 736b, the second drive electrode 736b electrostatically engages with the second region 724b, causing the shutter assembly 700 to assume the first partially light transmissive state, as shown in FIG. 7C.

FIG. 7C shows the shutter assembly in the second partially light transmissive state. In this state, the first drive electrode 736a is electrostatically engaged with the first region 724a and the second drive electrode 736b is electrostatically engaged with the second region 724b. By applying the $V_2$ to the second drive electrode 736b, an electrostatic force between the second drive electrode 736b and the second region 724b is created. The electrostatic force attracts the second region 724b towards the second drive electrode 736b causing the first load electrode 722 to further deform towards the first drive electrode set 732. The deformation of the load electrode 722 causes the shutter 710, which is coupled to the first load electrode 722 to move closer to the first drive electrode set 732 such that the shutter 710 is further offset from the corresponding aperture 706 and overlaps an even smaller portion of the corresponding aperture 706 relative to when the shutter 710 is in the first partially light transmissive state. As such, the shutter assembly 700 allows more light to pass through in the second partially light transmissive state relative to the first partially light transmissive state. Similar to the first drive electrode 736a, the second drive electrode 736b also serves as a mechanical stop for the load electrode 722 thereby limiting the motion of the shutter 710 to a position corresponding to the second partially light-transmissive state.

As described above, the third drive electrode 736c is positioned opposing the third region 724c of the first load electrode 722. In some implementations, the third drive electrode 736c is positioned a distance $d_3$ away from the third region 724c of the load electrode 722 when the first load electrode 722 is electrostatically engaged with the second drive electrode 736b. In some implementations, this distance $d_3$ is sized such that when the first load electrode 722 is electrostatically engaged with the first drive electrode 736a and the second drive electrode 736b and when a third actuation voltage $V_3$ is applied to the third drive electrode 736c, the third drive electrode 736c electrostatically engages with the third region 724c, causing the shutter assembly 700 to assume the fully light transmissive state, as shown in FIG. 7D.

FIG. 7D shows the shutter assembly 700 in the fully light transmissive state. In this state, the first drive electrode 736a is electrostatically engaged with the first region 724a, the second drive electrode 736b is electrostatically engaged with the second region 724b and the third drive electrode 736c is electrostatically engaged with the third region 724c. By applying $V_3$ to the third drive electrode 736c, an electrostatic force between the third drive electrode 736c and the third region 724c is created. The electrostatic force attracts the third region 724c towards the third drive electrode 736c causing the first load electrode 722 to further deform towards the first drive electrode set 732. The deformation of the load electrode 722 causes the shutter 710, which is coupled to the first load electrode 722 to move closer to the first drive electrode set 732 such that the shutter 710 is further offset from the corresponding aperture 706 and no longer overlaps any part of the corresponding aperture 706. As such, the shutter assembly 700 allows all the light passing through the corresponding aperture 706 to pass through. Similar to the first and second drive electrodes 736a and 736b, the third drive electrode 736c also serves as a mechanical stop for the load electrode 722, thereby defining one end of the range of travel of the shutter 710.

The actuation voltages $V_1$, $V_2$ and $V_3$ all may be the same or may be different. Each of the actuation voltages $V_1$, $V_2$ and $V_3$ is a function of at least one of the configuration and dimensions of the load electrode 722 and the drive electrodes 736 of the first drive electrode set 732. Appropriate actuation voltages can be determined based on the structural configuration of the shutter assembly 700. This relationship is based on an idealized load electrode. In practicality, however, the load electrode 722 may experience a linear spring force that opposes the deformation resulting from the deformation of the load electrode 722 and the second load electrode 752. In addition to the spring force experienced by the compliant first load electrode, the second load electrode also can generate similar opposing spring forces as the shutter moves towards the first drive electrode set. As a result, the corresponding actuation voltages $V_2$ and $V_3$ applied at the second drive electrode 736b and the third drive electrode 736c may increase linearly to overcome the increasing opposing spring forces experienced by the compliant load electrode. Alternatively, the distances $d_2$ and $d_3$ could be progressively smaller to compensate for the linearly increasing opposing spring forces experienced by the load electrode.

In some implementations, the shutter assembly 700 is configured such that the actuation voltages $V_1$, $V_2$ and $V_3$ are all substantially equal. In this way, a single electrical interconnect can supply the actuation voltage to each of the drive electrodes 736 and 766 of the corresponding drive electrode sets 732 and 762. Switches can be used to control the application of the actuation voltage to each of the drive electrodes 736 and 766. In some implementations, multiple data lines per pixel carry data voltages to switches controlling the application of the actuation voltages to each respective drive electrode. By doing this, only a single electrical interconnects is needed to provide an actuation voltage to each shutter assembly 700.

Upon removing the actuation voltages $V_1$, $V_2$ and $V_3$, the potential across the load electrode 722 and the first drive electrode set 732 is removed. The opposing spring forces acting on the first load electrode 722 and the second load electrode 752 cause the first load electrode 722 and the second load electrode 752 to return to their original state, thereby bringing the shutter assembly 700 back to the relaxed state, as shown in FIG. 7A. Accordingly, the shutter 710 returns to about the same original position it was in prior to actuating the shutter open actuator 720.

By actuating the shutter open actuator 720, the shutter assembly 700 can be driven to the fully light transmissive state as described above with respect to FIGS. 7B-7D. Conversely, by actuating the shutter close actuator 750, the shutter assembly 700 can be driven to the non-light transmissive state.

FIG. 7E shows the shutter assembly 700 in the non-light transmissive state. For the shutter assembly 700 to achieve this state, actuation voltages $V_4$, $V_5$ and $V_6$ are applied to the respective first, second and third drive electrodes 766a-766c of the second drive electrode set 762. In this state, the second load electrode 752 is deformed towards the second drive electrode set 762. Specifically, the first drive electrode 766a is electrostatically engaged with the first region 754a, the second drive electrode 766b is electrostatically engaged with the second region 754b and the third drive electrode 766c is electrostatically engaged with the third region 754c causing the second load electrode 752 to deform towards the second drive electrode set 762. The deformation of the second load electrode 752 causes the shutter 710 to be drawn closer to the second drive electrode set 762 such that the shutter 710 is no longer offset from the corresponding aperture 706 and completely overlaps the corresponding aperture 706. In this way, the shutter assembly 700 blocks all the light passing through the corresponding aperture 706.

As described above, each of the first and second drive electrodes 736a and 736b of the first drive electrode set 732 and the first and second drive electrodes 766a and 766b of the second drive electrode set 762 can serve as mechanical stops. In various implementations, the drive electrodes 736a, 736b, 766a and 766b can be positioned such that the shutter 710 can be drawn to various intermediary positions relative to the corresponding aperture 706 such that it covers, for example, about 12.5%, about 25%, about 33%, about 37.5%, about 50%, about 62.5%, about 66%, about 75%, about 87.5% or any other percentage of the aperture 706, allowing a corresponding amount of light, for example, about 87.5%, about 75%, about 67%, about 62.5%, about 50%, about 37.5%, about 33%, about 25%, about 12.5%, or any other percentage to pass through the aperture 706.

As described above, the shutter assembly 700 depicted in FIGS. 7A-7E includes the drive electrode set 732 that has three distinct portions in the form of drive electrodes 736. In some such implementations, the degree of actuation of the shutter assembly depends on the number of drive electrodes to which an actuation voltage is applied. In some other implementations, a multi-state shutter assembly can include an electrostatic actuator having a drive electrode set that includes a plurality of discrete portions that are all mechanically and electrically coupled. In such implementations, the drive electrode set includes a single drive electrode and each segment forms a discrete portion of the drive electrode set. In some such implementations, the degree of actuation of the shutter assembly depends on the magnitude of the actuation voltage applied to the electrostatic actuator.

Figure 8A:
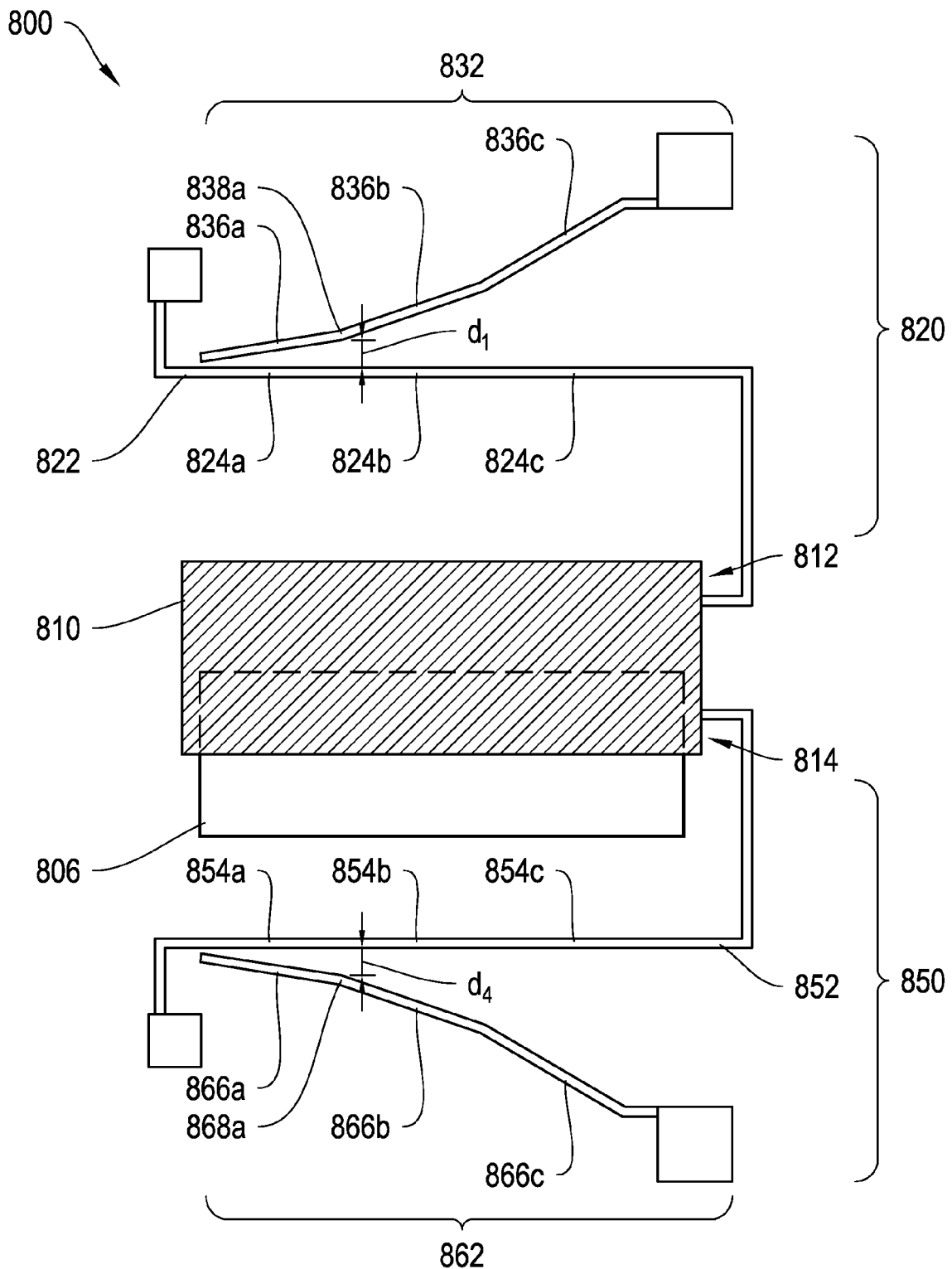
FIGS. 8A-8E show plan views of another example multi-state shutter assembly.
Figure 8B:
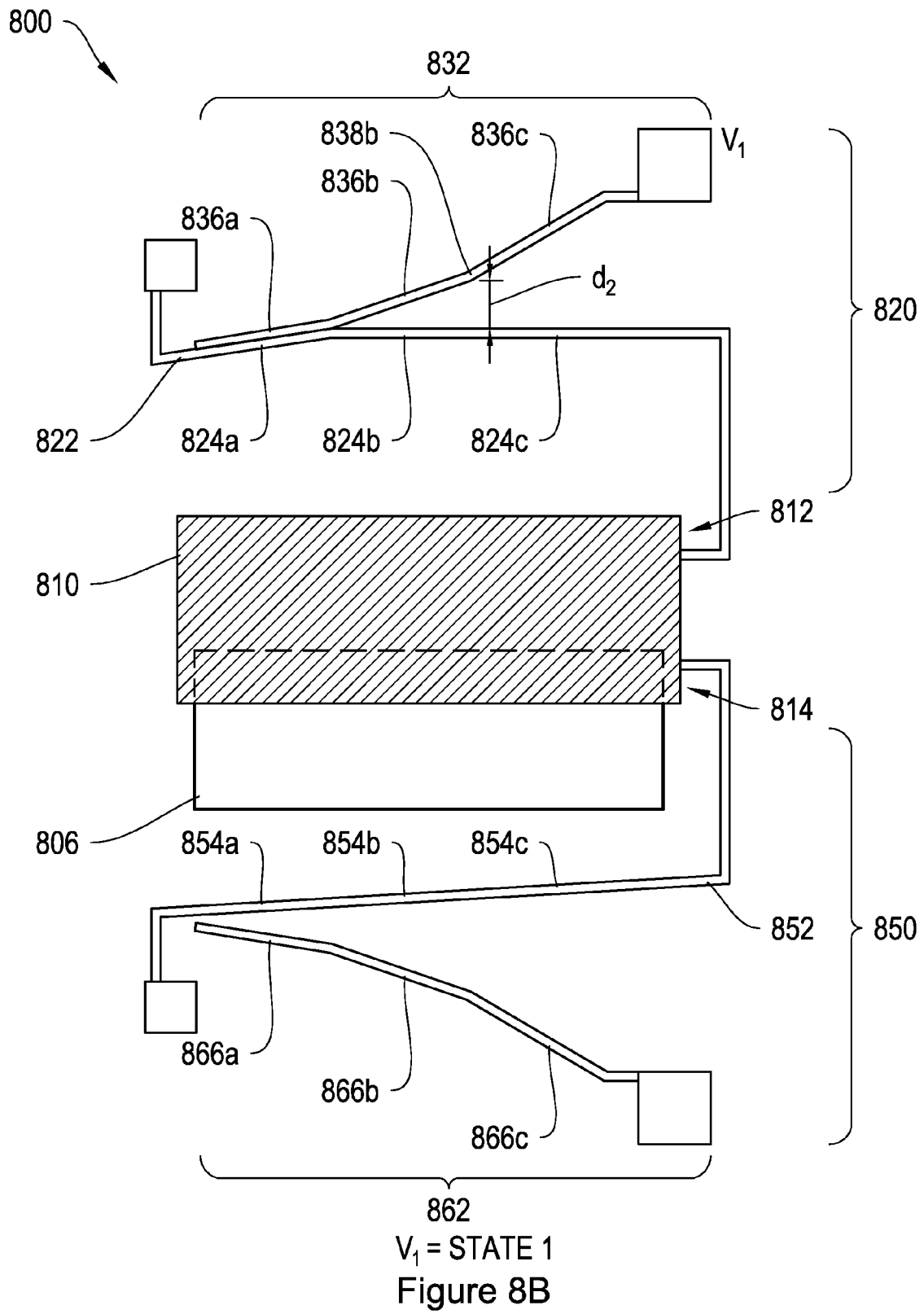
Figure 8C:
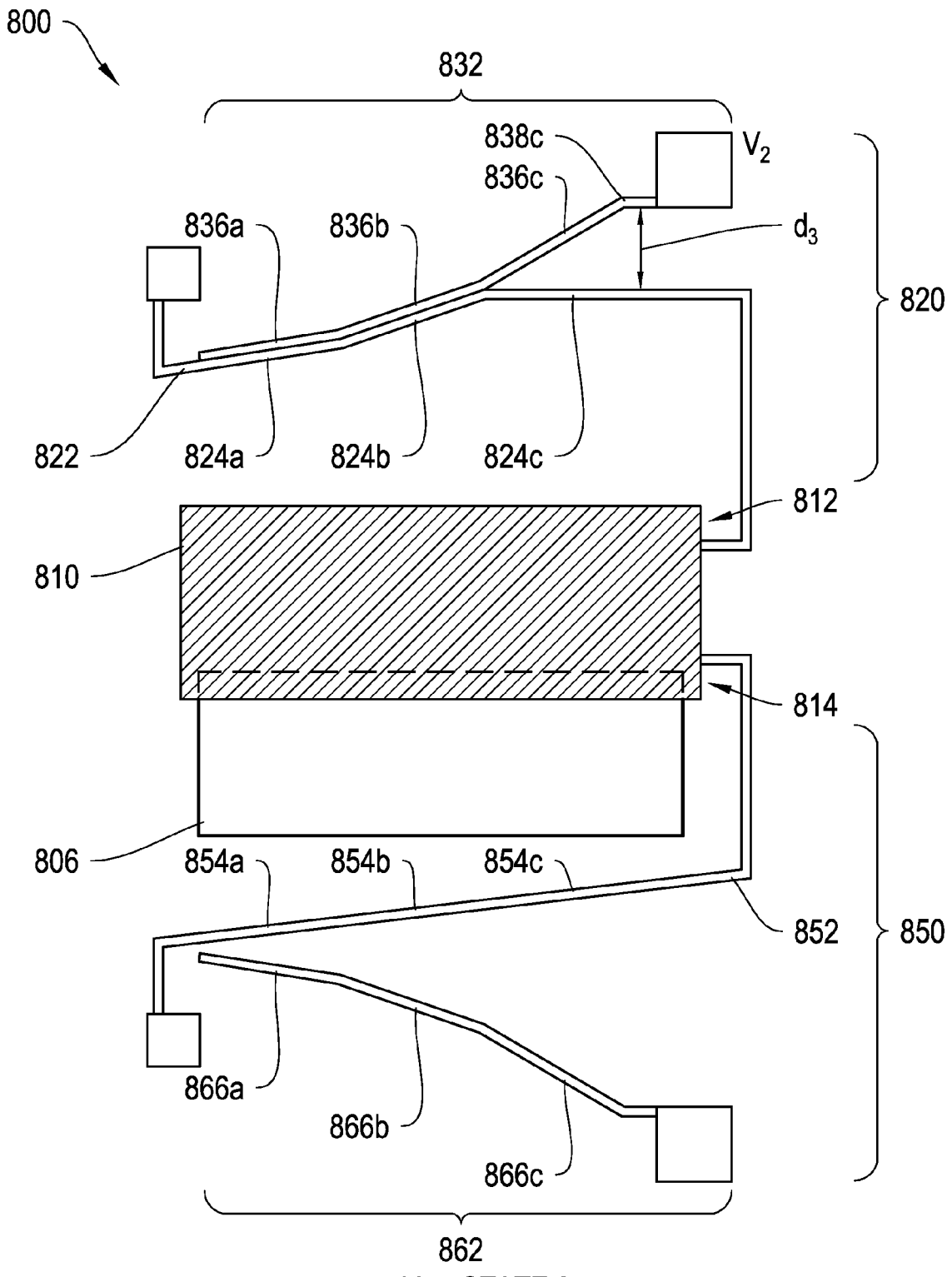
Figure 8D:
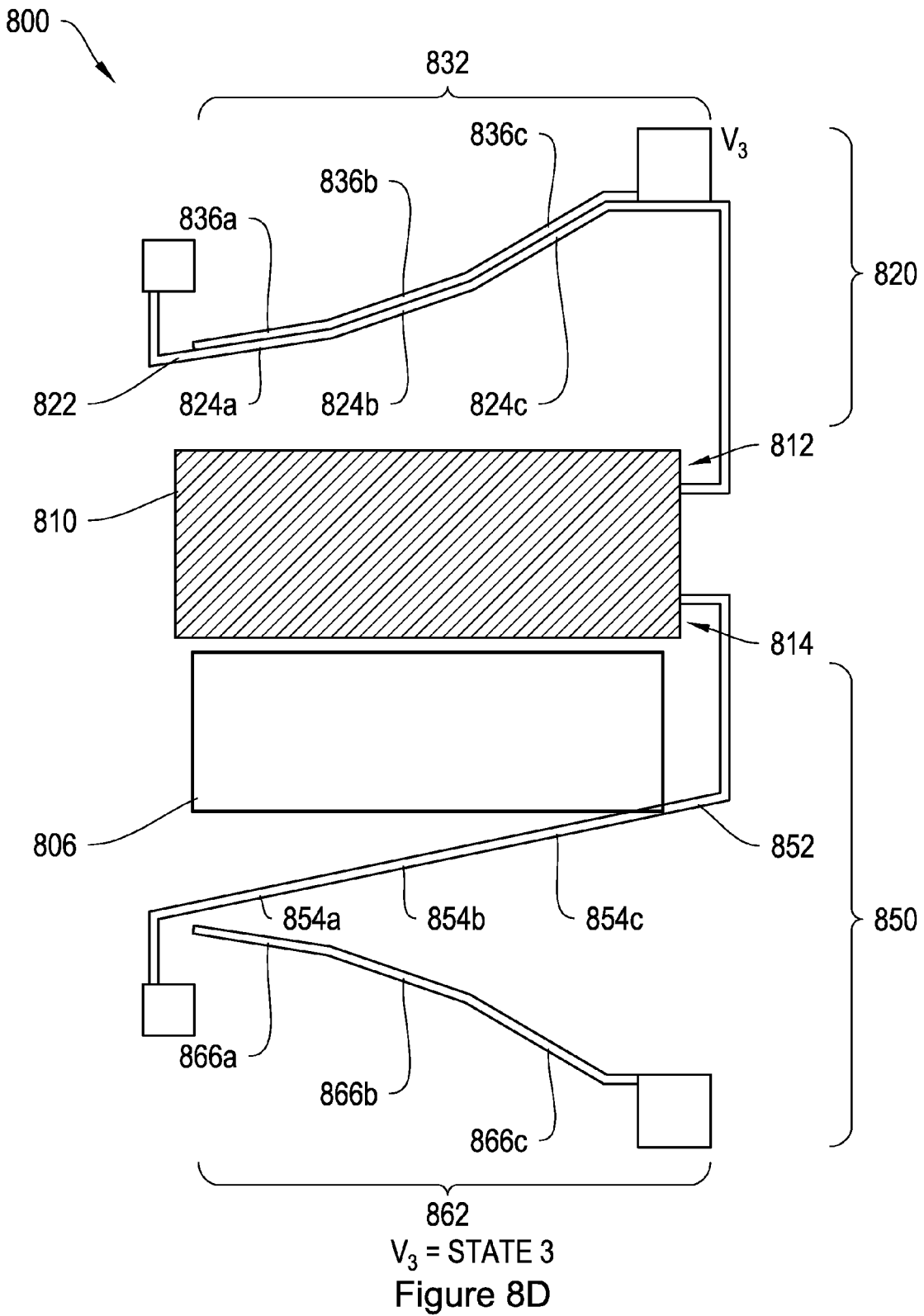
Figure 8E:
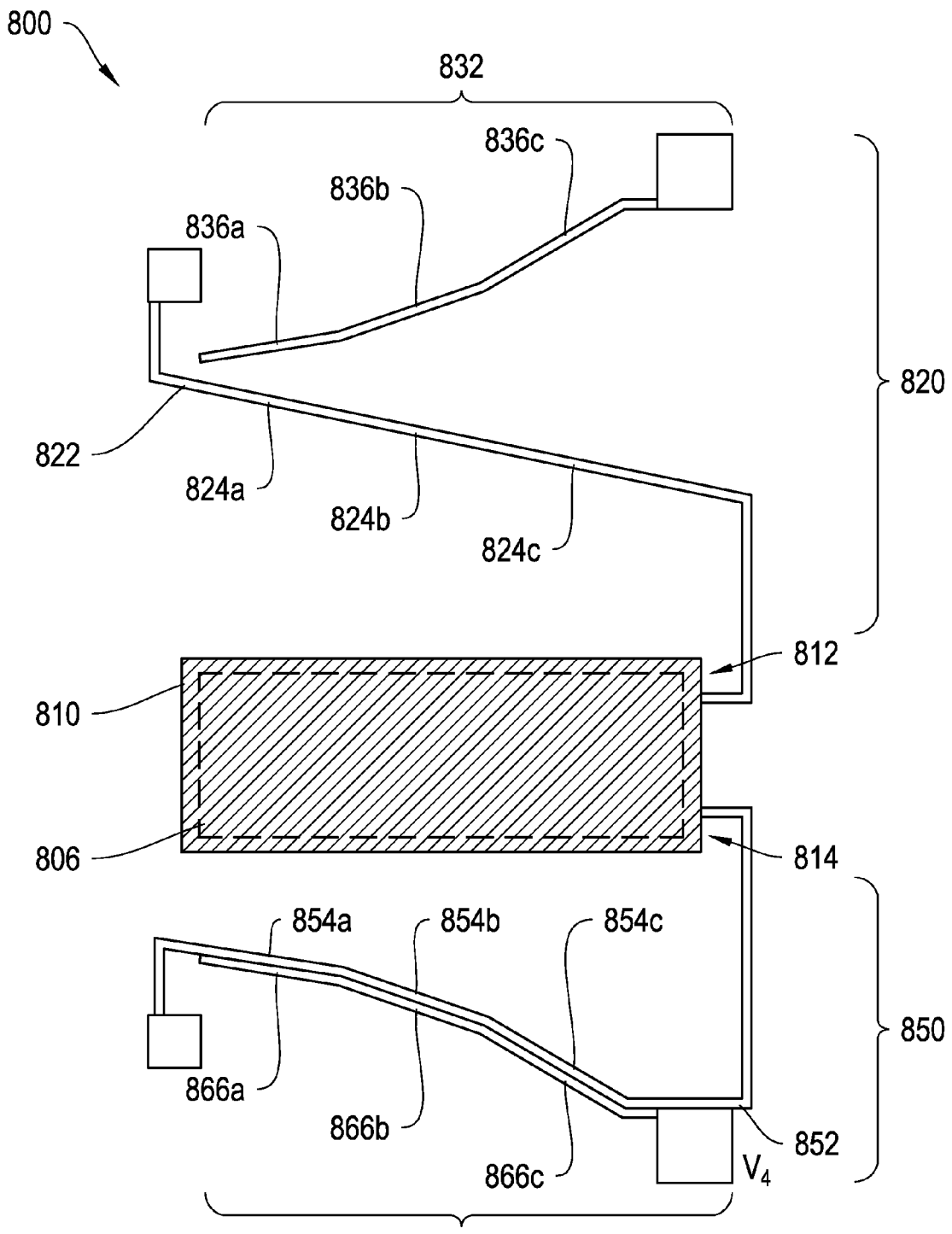

FIGS. 8A-8E show plan views of another example multi-state shutter assembly 800. The shutter assembly 800, which can be implemented similarly to the shutter assembly 700 shown in FIGS. 7A-7E, can achieve multiple light modulator states to implement an area division gray scale scheme. FIG. 8A shows the shutter assembly 800 in a relaxed state. FIG. 8B shows the shutter assembly 800 in a first partially transmissive state. FIG. 8C shows the shutter assembly 800 in a second partially light transmissive state. FIG. 8D shows the shutter assembly 800 in a fully light transmissive state. FIG. 8E shows the shutter assembly 800 in a non-light transmissive state.

Referring to FIGS. 8A-8E, the shutter assembly 800 includes a shutter 810 that is driven along an axis by two electrostatic actuators, a shutter open actuator 820 and a shutter close actuator 850. The shutter 810 is supported by a pair of load electrodes 822 and 852 that form components of the respective shutter open and shutter close actuators 820 and 850. The shutter open actuator 820 also includes a first drive electrode set 832 positioned proximate the load electrode 822. The first drive electrode set 832 includes a plurality of discrete drive electrode segments 836a-836c (generally "segments 836"), each of which forms a discrete portion of the first drive electrode set 832.

The shutter close actuator 850 includes a second load electrode 852 that is coupled to a second half 814 of the shutter 810 opposite the first half 812. The shutter close actuator 850 includes a second drive electrode set 862 positioned proximate the load electrode 852. The second drive electrode set 862 includes a plurality of discrete drive electrode segments 866a-866c (generally "segments 866"), each of which forms a discrete portion of the second drive electrode set 862. Similar to the shutter assembly 700 shown in FIGS. 7A-7E, the shutter assembly 800 has a relaxed state as shown in FIG. 8A and also can be readily driven into 6 distinct light modulator states, of which only 4 are shown in FIGS. 8B-8E. In some implementations, the first drive electrode set 832 may include two, four or more than four drive electrode segments 836. In some implementations, the second drive electrode set 862 may include two, four or more than four drive electrode segments 866. In some implementations, the number of drive electrode segments 836 included in the first drive electrode set 832 may be different from the number of drive electrode segments 866 included in the second drive electrode set 862. In some implementations, the number of drive electrode segments 836 and 866 may depend on various design criteria. In some such implementations, the total number of light modulator states that the shutter assembly can reliably achieve can be equal to the total number of drive electrode segments used to form the shutter assembly. In some implementations, such shutter assemblies also can achieve one additional neutral or relaxed state. As such, to drive the shutter assembly into a greater number of light modulator states, the shutter assembly can be designed to include a greater number of drive electrode segments 836 and 866.

In contrast to the drive electrodes 736a-736c shown in FIGS. 7A-7E, the segments 836a-836c are mechanically and electrically connected, and form a single continuous electrode positioned proximate the first load electrode 822. Thus, the segments 836a-836c that form the first drive electrode set 832 can be simultaneously actuated using a single actuation voltage. In some implementations, a first segment 836a is positioned opposing a first region 824a of the load electrode 822, a second segment 836b is positioned opposing a second region 824b of the load electrode 822 and a third segment 836c is positioned opposing a third region 824c of the load electrode 822.

In some implementations, the first drive electrode set 832 is shaped such that the curvature of the first drive electrode set 832 gets steeper or increases along the length of the first drive electrode set 832 at each transition between electrode segments. Thus, three discrete portions of the first drive electrode set 832 are defined by their corresponding curvatures of their corresponding segments. The first segment 836a has a first curvature. The second segment 836b has a steeper curvature than the first segment 836a. Similarly, the third segment 836c has a steeper curvature than both the second segment 836b and the first segment 836a. In some implementations, each of the segments 836 can be designed to have no curvature or the same curvature. In some such implementations, the segments 836 can be arranged such that the first segment 836a is positioned along a plane that forms a first angle relative to a plane parallel to the first load electrode 822 when the first load electrode is in the relaxed state, the second segment 836b is positioned along a plane that forms a second angle relative to the same plane of the first load electrode 822 and the third segment 836c is positioned along a plane that forms a third angle relative to the same plane of the first load electrode 822. The third angle is greater than the second angle, which is greater than the first angle. Stated in another way, each of the segments 836 has a different tilt, such that the third segment 836c is tilted away from the plane of the load electrode 822 more than the second segment 836b and the second segment 836b is tilted away from the plane of the first load electrode 822 more than the first segment 836a.

Similar to the segments 836a-836c, the segments 866a-866c that are a part of the second drive electrode set 862 are mechanically and electrically connected and form a single continuous electrode positioned opposing the second load electrode 852. Thus, the segments 866a-866c that form the second drive electrode set 862 also can be simultaneously actuated using a single actuation voltage. In some implementations, the segments 866a-866c that form the second drive electrode set 862 can be simultaneously actuated using a separate single actuation voltage. In some implementations, a first segment 866a is positioned opposing a first region 854a of the second load electrode 852, a second segment 866b is positioned opposing a second region 854b of the second load electrode 852 and a third segment 866c is positioned opposing a third region 854c of the second load electrode 852.

Similar to the first drive electrode set 832, the second drive electrode set 862 is shaped such that the curvature of the second drive electrode set 862 gets steeper or increases along the length of the second drive electrode set 862. Thus, three discrete portions of the second drive electrode set 862 are defined by their corresponding curvatures of their corresponding segments. The first segment 866a has a first curvature. The second segment 866b has a steeper curvature than the first segment 866a. Similarly, the third segment 866c has a steeper curvature than both the second segment 866b and the first segment 866a. In some implementations, the curvatures of the three segments 866a-866c can be represented mathematically with different second order functions. In some implementations, each of the segments 866 can be designed to have no curvature or the same curvature. In some such implementations, the segments 866 can be arranged such that the first segment 866a is positioned along a plane that forms a first angle relative to a plane parallel to the second load electrode 852 when the second load electrode 852 is in the relaxed state, the second segment 866b is positioned along a plane that forms a second angle relative to the same plane of the second load electrode 852 and the third segment 866c is positioned along a plane that forms a third angle relative to the same plane of the second load electrode 852. The third angle is greater than the second angle, which is greater than the first angle. Stated in another way, each of the segments 866 has a different tilt, such that the third segment 866c is tilted away from the plane of the second load electrode 852 more than the second segment 866b and the second segment 866b is tilted away from the plane of the load electrode 852 more than the first segment 866a.

The segments 836 and 866 can be configured to move the shutter 810 to a plurality of light modulator states that are defined by a degree of actuation of the first drive electrode set 832 and the second drive electrode set 862. In the shutter assembly 800, the degree of actuation relies on the magnitude of the actuation voltage being applied to the first drive electrode set 832 and the magnitude of the actuation voltage being applied to the second drive electrode set 862.

The degree to which the first load electrode 822 deforms corresponds to the actuation voltage applied to the first drive electrode set 832. As the first load electrode 822 deforms towards the first drive electrode set 832, the first load electrode 822 causes the shutter 810 to move towards the first drive electrode set 832 and away from the second drive electrode set 862 and the corresponding aperture 806 through which light can be transmitted. When the first drive electrode set 832 is fully actuated, that is, the actuation voltage is large enough that all three regions 824 of the first load electrode 822 are in contact with the three segments 836 of the first drive electrode set 832, the shutter 810 moves to a fully light transmissive state in which the shutter 810 does not overlap any portion of the corresponding aperture 806. FIG. 8D shows the shutter assembly 800 in such a state.

The interaction between the second load electrode 852 and the second drive electrode set 862 is similar to that of the first load electrode 822 and the first drive electrode set 832. As such, the degree to which the second load electrode 852 deforms corresponds to the actuation voltage applied to the second drive electrode set 862. As the second load electrode 852 deforms towards the second drive electrode set 862, the second load electrode 852 causes the shutter 810 to move away from the first drive electrode set 832 and towards the second drive electrode set 862 and the corresponding aperture 806 through which light can be transmitted. When the second drive electrode set 862 is fully actuated, that is, the actuation voltage is large enough that all three regions 854 of the second load electrode 852 are in contact with the three segments 866 of the second drive electrode set 862, the shutter 810 moves to a non-light transmissive state in which the shutter 810 completely overlaps the corresponding aperture 806. FIG. 8E shows the shutter assembly 800 in such a state.

Similar to the shutter assembly 700 shown in FIGS. 7A-7E, the number of light modulator states the shutter assembly 800 can achieve depends on the total number of segments 836 and 866 that are included in the shutter open actuator 820 and the shutter close actuator 850. In some implementations, the total number of light modulator states that the shutter assembly 800 can reliably achieve can be equal to the total number of segments 836 and 866. For example, the shutter assembly 800 can readily achieve six distinct light modulator states. In addition, the shutter assembly 800 also can assume a seventh state, which is the relaxed state.

FIG. 8A shows the shutter assembly 800 in the relaxed state. In this state, neither the shutter open actuator 820 nor the shutter close actuator 850 is actuated. As such, there is no electrostatic force between the segments 836 of the first drive electrode set 832 and the first load electrode 822 or the segments 866 of the second drive electrode set 862 and the second load electrode 852. The shutter assembly 800 can be designed such that when it is in the relaxed state, the shutter 810 partially overlaps the corresponding aperture 806. In some such implementations, the shutter 810 can overlap about half of the corresponding aperture 806.

When the shutter 810 is in the relaxed state, an end point 838a of the first segment 836a and a corresponding point on the load electrode 822 are separated by a distance $d_1$, due to the curvature of the first segment. The distance $d_1$ is sized such that when the shutter assembly 800 is in the relaxed state and a first actuation voltage $V_1$ is applied to the drive electrode set 832, the first segment 836a electrostatically engages with first region 824a, causing the shutter assembly 800 to assume the first partially light transmissive state, as shown in FIG. 8B. Similarly, the first region 854a of the second load electrode 852 is also separated from a first end 868a of the first segment 866a of the second drive electrode set 862 by a distance $d_4$. In some implementations, the distance $d_4$ can be substantially equal to the distance $d_1$. In some other implementations, the distance $d_4$ can be greater than or shorter than the distance $d_1$. The distance $d_4$ can be sized such that when the shutter assembly 800 is in the relaxed state and the first actuation voltage $V_1$ is applied to the drive electrode set 862, the first segment 866a electrostatically engages with first region 854a, causing the shutter assembly 800 to assume the fourth partially light transmissive state.

FIG. 8B shows the shutter assembly 800 in the first partially light transmissive state. In this state, the first segment 836a of the first drive electrode set 832 is electrostatically engaged with the first region 824a of the first load electrode 822. By applying the first actuation voltage $V_1$ to the first drive electrode set 832, an electrostatic force between the first drive electrode set 832 and the first load electrode 822 is created. The magnitude of electrostatic force between a segment 836 of the first drive electrode set 832 and a corresponding region 824 of the first load electrode 822 depends on the magnitude of actuation voltage applied to the first drive electrode set 832 and the distance between the segment 836 and the corresponding region 824. The first actuation voltage $V_1$ is sufficiently large enough to cause the electrostatic force between the first segment 836a and the first region 824a to attract the first region 824a towards the first segment 836a such that the first segment 836a is electrostatically engaged with the first region 824a. The first actuation voltage $V_1$, however, is not large enough to cause the second segment 836b to electrostatically engage with the second region 824b, which is separated by a distance $d_2$ that is larger than the distance $d_1$. As the first region 824a is attracted to the first segment 836a, the first load electrode 822 is caused to deform towards the first drive electrode set 832. The deformation of the first load electrode 822 causes the shutter 810, which is coupled to the first load electrode 822 to move towards the first drive electrode set 832 such that the shutter 810 overlaps a smaller portion of the corresponding aperture 806 relative to when the shutter 810 is in the relaxed state. As such, less of the light passing through the aperture 806 is blocked by the shutter 810 as compared to the relaxed state depicted in FIG. 8A. The first segment 836a serves as a mechanical stop for the load electrode 822 thereby limiting the motion of the shutter 810 to a position corresponding to the first partially light-transmissive state.

When the shutter assembly 800 is in the first partially light transmissive state, an end point 838b of the second segment 836b and a corresponding point on the load electrode 822 are separated by a distance $d_2$, due to the curvature of the second segment 836b. Assuming the first segment 836a and the second segment 836b are equal lengths, the distance $d_2$ should be greater than the distance $d_1$ since the second segment 836b has a greater curvature than the first segment 836a. The distance $d_2$ is sized such that when the shutter assembly 800 is in the first partially light transmissive state and a second actuation voltage $V_2$ that is larger than the first actuation voltage $V_1$ is applied to the drive electrode set 832, the second segment 836b electrostatically engages with the second region 824b, causing the shutter assembly 800 to assume the second partially light transmissive state, as shown in FIG. 8C. The second actuation voltage $V_2$, however, is not large enough to cause the third segment 836c to electrostatically engage with the third region 824c, which is separated by a distance $d_3$ that is larger than the distance $d_2$.

FIG. 8C shows the shutter assembly 800 in the second partially light transmissive state. In this state, the first segment 836a is electrostatically engaged with the first region 824a and the second segment 836b is electrostatically engaged with the second region 824b. By increasing the actuation voltage being applied to the first drive electrode set 832 from $V_1$ to $V_2$, while the shutter assembly 800 is in the first partially light transmissive state as shown in FIG. 8B, an even greater electrostatic force between the first drive electrode set 832 and the load electrode 822 is created. The increased electrostatic force between the first drive electrode set 832 and the first load electrode 822 is sufficiently large enough to attract the second region 824b towards the second segment 836b such that the second segment 836b is electrostatically engaged with the second region 824b. This causes the first load electrode 822 to further deform towards the first drive electrode set 832. The deformation of the load electrode 822 causes the shutter 810 to move closer to the first drive electrode set 832 such that the shutter 810 is further offset from the corresponding aperture 806 and overlaps an even smaller portion of the corresponding aperture 806 relative to when the shutter 810 is in the first partially light transmissive state. As such, less of the light passing through the aperture 806 is blocked by the shutter 810 as compared to the first light-transmissive state depicted in FIG. 8B. Similar to the first segment 836a, the second segment 836b also serves as a mechanical stop for the load electrode 822 thereby limiting the motion of the shutter 810 to a position corresponding to the second partially light-transmissive state.

When the shutter assembly 800 is in the second partially light transmissive state, an end point 838c of the third segment 836c and a corresponding point on the load electrode 822 are separated by a distance $d_3$, due to the curvature of the third segment 836c. Assuming the third segment 836c and the second segment 836b are equal lengths, the distance $d_3$ should be greater than the distance $d_2$ since the third segment 836c has a greater curvature than the second segment 836b. The distance $d_3$ is sized such that when the shutter assembly 800 is in the second partially light transmissive state and a third actuation voltage $V_3$ that is larger than the second actuation voltage $V_2$ is applied to the first drive electrode set 832, the third segment 836c electrostatically engages with the third region 824c, causing the shutter assembly 800 to assume the fully light transmissive state, as shown in FIG. 8D.

FIG. 8D shows the shutter assembly 800 in the fully light transmissive state. In this state, the first segment 836a is electrostatically engaged with the first region 824a, the second segment 836b is electrostatically engaged with the second region 824b and the third segment 836c is electrostatically engaged with the third region 824c. By increasing the actuation voltage being applied to the first drive electrode set 832 from $V_2$ to $V_3$, while the shutter assembly 800 is in the second partially light transmissive state as shown in FIG. 8C, an even greater electrostatic force between the first drive electrode set 832 and the load electrode 822 is created. This increased electrostatic force between the first drive electrode set 832 and the first load electrode 822 is sufficiently large enough to attract the third region 824c towards the third segment 836c such that the third segment 836c is electrostatically engaged with the third region 824c. This causes the first load electrode 822 to further deform towards the first drive electrode set 832. The deformation of the load electrode 822 causes the shutter 810 to move closer to the first drive electrode set 832 such that the shutter 810 is even further offset from the corresponding aperture 806 and no longer overlaps any portion of the corresponding aperture 806. As such, none of the light passing through the aperture 806 is blocked by the shutter 810. Similar to the first and second segments 836a and 836b, the third segment 836c also serves as a mechanical stop for the first load electrode 822, thereby defining one end of the range of travel of the shutter 810.

It should be noted that the electrostatic force required to electrostatically engage a segment and a corresponding region of the load electrode may increase as the deformation of the first load electrode 822 increases. This is because the first load electrode 822 may experience a linear spring force that opposes the deformation resulting from the deformation of the first load electrode 822. In addition to the spring force experienced by the compliant first load electrode 822, the second load electrode 852 also can experience similar opposing spring forces as the shutter 810 moves towards the first drive electrode set 832. As a result, the increased actuation voltages $V_2$ and $V_3$ applied at the second segment 836b and the third segment 836c may increase non-linearly to compensate for the increased opposing spring forces experienced by the compliant load electrodes 822 and 852.

It should be noted that the relative curvatures and corresponding distances $d_1$, $d_2$ and $d_3$ are pertinent to ensure that the shutter 810 can assume three distinct light transmissive states. The distance $d_2$ is designed to be larger than the distance $d_1$ such that the electrostatic force between the second segment 836b and the first load electrode 822 that is generated by the first actuation voltage $V_1$ is not large enough to cause the first load electrode 822 to deform towards the second segment 836b. Similarly, the distance $d_3$ is designed to be larger than the distance $d_2$ such that the electrostatic force between the third segment 836c and the first load electrode 822 that is generated by the second actuation voltage $V_2$ is not large enough to cause the load electrode 822 to deform towards the third segment 836c. As such, the drive electrode set 832 is subject to a step function voltage having voltage steps corresponding to the actuation voltages $V_1$, $V_2$ and $V_3$, respectively.

Upon removing the actuation voltage applied to the first drive electrode set 832, the potential across the load electrode 822 and the first drive electrode set 832 is removed. The opposing spring forces acting on the first load electrode 822 and the second load electrode 852 cause the first load electrode 822 and the second load electrode 852 to return to their original state, thereby bringing the shutter assembly 800 back to the relaxed state, as shown in FIG. 8A. Accordingly, the shutter 810 returns to about the same original position it was in prior to actuating the shutter open actuator 820.

By actuating the shutter open actuator 820, the shutter assembly 800 can be driven to the fully light transmissive state as described above with respect to FIGS. 8B-8D. Conversely, by actuating the shutter close actuator 850, the shutter assembly 800 can be driven to the non-light transmissive state.

FIG. 8E shows the shutter assembly 800 in the non-light transmissive state. In this state, the first segment 866a is electrostatically engaged with the first region 854a, the second segment 866b is electrostatically engaged with the second region 854b and the third segment 866c is electrostatically engaged with the third region 854c causing the second load electrode 852 to deform towards the second drive electrode set 862 such that all three regions 854 are in contact with the second drive electrode set 862. The deformation of the second load electrode 852 causes the shutter 810 to be drawn closer to the second drive electrode set 862 such that the shutter 810 is no longer offset from the corresponding aperture 806 and completely overlaps the corresponding aperture 806. In this way, all of the light passing through the aperture 806 is blocked by the shutter 810.

In addition, each of the first, second segments and third segments 836a-836c of the first drive electrode set 832 and the first, second segments and third segments 866a-866c of the second drive electrode set 862 can serve as mechanical stops. The segments 836a, 836b, 866a and 866b can be positioned such that the shutter 810 can be drawn to various intermediary positions relative to the corresponding aperture 806 such that it covers, for example, about 12.5%, about 25%, about 33%, about 37.5%, about 50%, about 62.5%, about 66%, about 75%, about 87.5% of the aperture 806 or any other percentage, allowing a corresponding amount of light, for example, about 87.5%, about 75%, about 67%, about 62.5%, about 50%, about 37.5%, about 33%, about 25%, about 12.5% or any other percentage, to pass through the aperture 806.

As described above, the shutter assembly 800 depicted in FIGS. 8A-8E is driven by the first and second drive electrode sets 832 and 862 that have three electrically connected segments 836 and 866, respectively. In some such implementations, the degree of actuation of the shutter assembly 800 depends on the magnitude of the actuation voltage being applied to the first drive electrode set 832 and the second drive electrode set 862. In some implementations, the shutter assembly 800 is configured such that a single electrical interconnect can supply the actuation voltage to each of the drive electrode sets 832 and 862. In some implementations, the electrical interconnect can carry an actuation voltage that corresponds to one or more of the first, second and third actuation voltages $V_1$, $V_2$, and $V_3$. In some implementations, the electrical interconnect can be configured to carry an actuation voltage that is substantially equal to or greater than the third actuation voltage $V_3$. In some such implementations, switches connecting the electrical interconnect to the drive electrode sets 832 and 862 can be used to selectively limit the magnitude of the actuation voltage being supplied to each of the drive electrode sets 832 and 862. In some such implementations, switches can limit the actuation voltage to the first actuation voltage $V_1$, the second actuation voltage $V_2$ or the third actuation voltage $V_3$ supplied to the drive electrode sets 832 and 862. In some implementations, one or more data lines can provide data voltages to the switches that can limit the actuation voltage provided to each of the drive electrode sets 832 and 862. By doing this, only a single electrical interconnect is needed to provide an actuation voltage to each shutter assembly 800.

Persons having ordinary skill in the art will readily understand that one or more of the first drive electrode set 832 and the second drive electrode set 862 may include two, four or more than four drive electrode segments. In some implementations, the number of drive electrode segments 836 included in the first drive electrode set 832 may be different from the number of drive electrode segments 866 included in the second drive electrode set 862.

As described above, the shutter assemblies of FIGS. 7A-7E and 8A-8E include shutter open actuators and shutter close actuators that include two separate load electrodes. However, in some other implementations, multi-state shutter assemblies can have shutter open actuators and shutter close actuators that both include the same load electrode. An example of one such multi-state shutter assembly is shown in FIGS. 9A-9C.

Figure 9A:
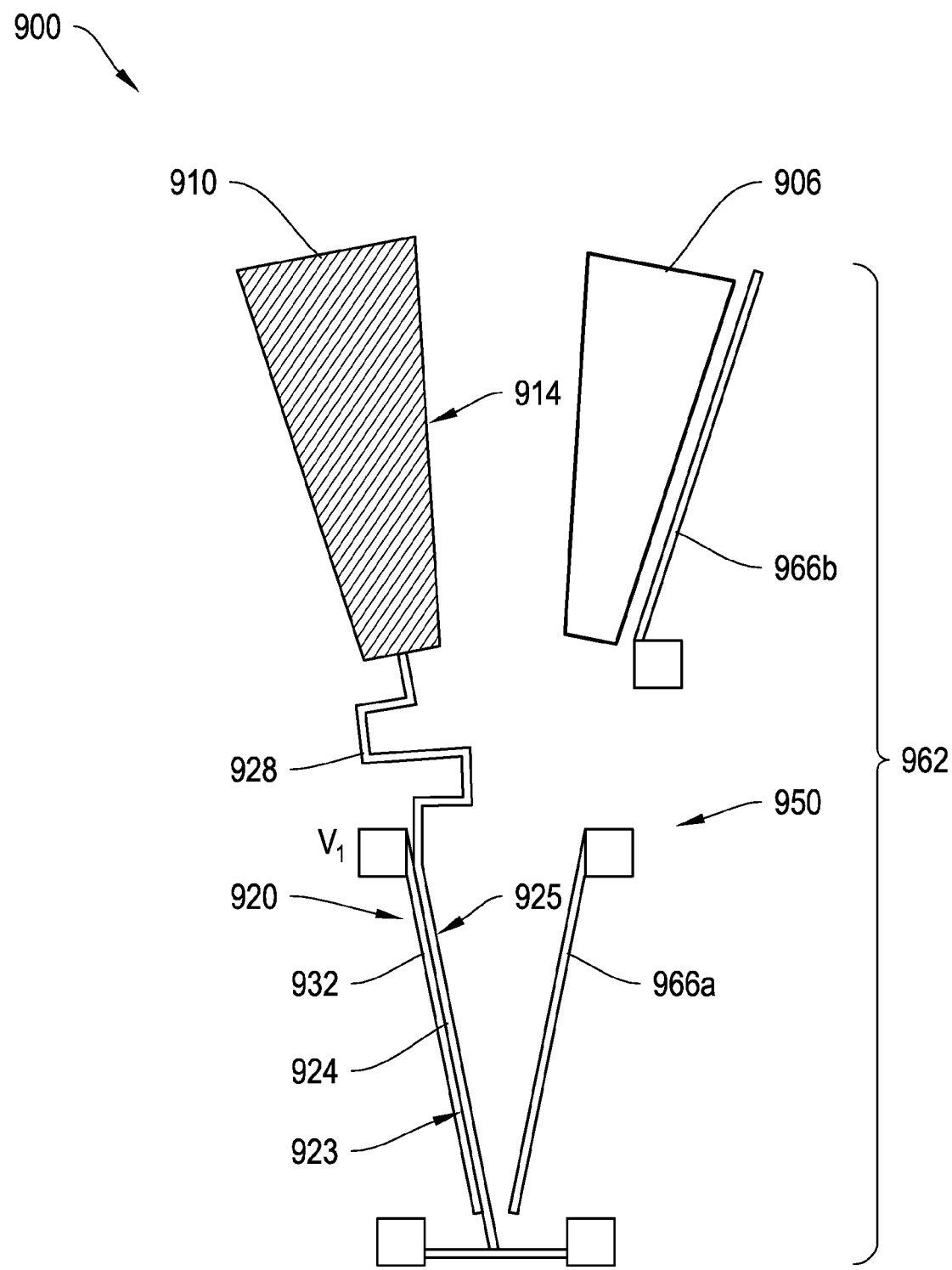
FIGS. 9A-9C show plan views of another example multi-state shutter assembly.
Figure 9B:
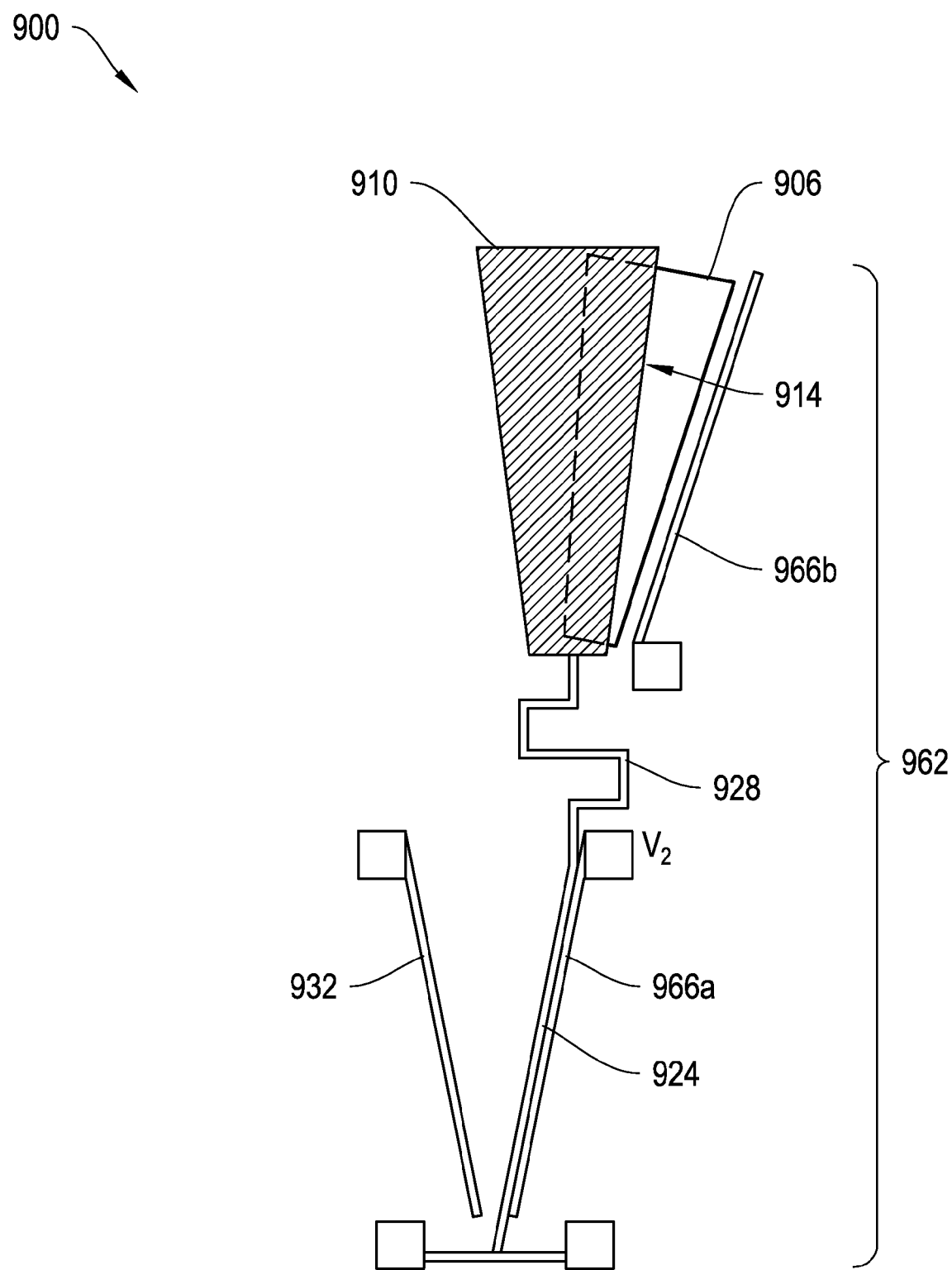
Figure 9C:
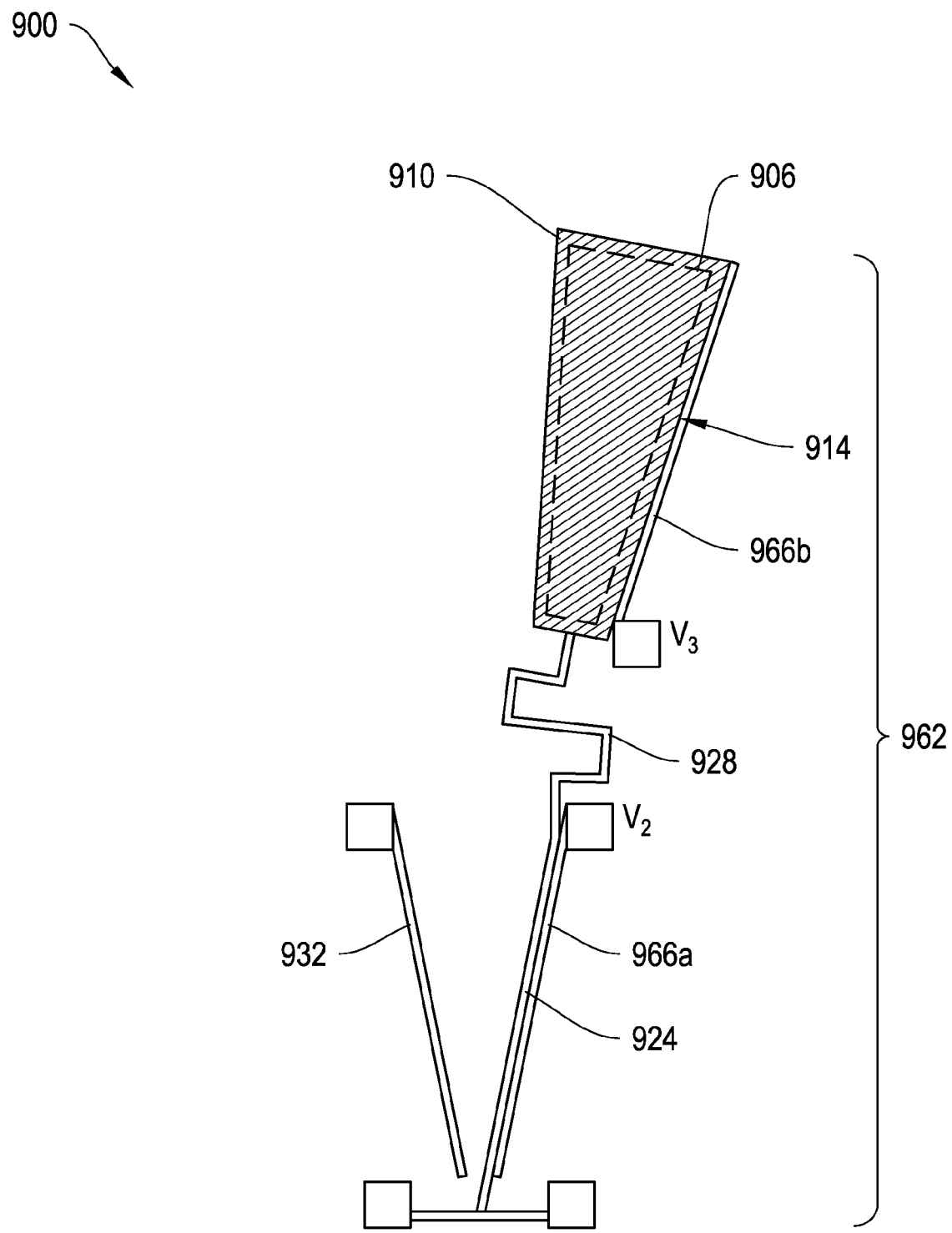

FIGS. 9A-9C show plan views of an example multi-state shutter assembly 900. The shutter assembly 900, which can be implemented similarly to the shutter assemblies 700 and 800 shown in FIGS. 7A-7E and 8A-8E, respectively, can achieve multiple light modulator states to implement an area division gray scale scheme. FIG. 9A shows the shutter assembly 900 in a fully light transmissive state. FIG. 9B shows the shutter assembly 900 in a first partially transmissive state. FIG. 9C shows the shutter assembly 900 in a non-light transmissive state.

Referring to FIGS. 9A-9C, the shutter assembly 900 includes a shutter 910 that is driven about an axis by two electrostatic actuators, a shutter open actuator 920 and a shutter close actuator 950. The shutter 910 is supported over a corresponding aperture 906 by a load electrode 924. The load electrode 924 includes a compliant segment 928, which can be designed to include one or more folds, curves or bends, or be serpentine, adjacent to where the load electrode 924 couples to the shutter 910. The segment 928 provides additional compliance at the end of the load electrode 924 as discussed further below.

The shutter open actuator 920 is configured to move the shutter 910 towards a completely light transmissive state in which the shutter 910 does not overlap the corresponding aperture 906. The shutter open actuator 920 includes the load electrode 924 and a shutter open drive electrode 932 positioned opposing a first actuation surface 923 of the load electrode 924.

The shutter close actuator 950 is configured to move the shutter 910 towards the non-light transmissive state in which the shutter 910 completely overlaps the corresponding aperture 906. The shutter close actuator 950 can cause the shutter 910 to move to the partially light transmissive state in which the shutter 910 partially overlaps the aperture 906 and to the non-light transmissive state. The shutter close actuator 950 includes the load electrode set, which includes both the load electrode 924 and the shutter 910 and a drive electrode set 962. The drive electrode set 962 includes a plurality of electrically and mechanically isolated drive electrodes 966a and 966b (generally "drive electrodes 966"), each of which forms a discrete portion of the drive electrode set 962. The primary drive electrode 966a is positioned opposing the load electrode 924 such that the primary drive electrode 966a faces a second actuation surface 925 of the load electrode 924 that is on the opposite face of the load electrode 924 than the first actuation surface 923. The secondary drive electrode 966b is positioned adjacent the aperture 906 such that when the shutter 910 is in contact with the secondary drive electrode 966b, the shutter 910 overlaps the aperture 906.

The shutter assembly 900 can readily achieve a total of three light modulator states, namely the fully light transmissive state, the partially light transmissive state and the non-light transmissive state. In addition, the shutter assembly 900 has a relaxed state in which neither the shutter open actuator 920 nor the shutter close actuator 950 is actuated. In some implementations, when the shutter assembly 900 is in the relaxed state, the shutter 910 can partially over the aperture 906 to a different degree than when it is in the partially light transmissive state. In such implementations, the relaxed state can serve as a second partially light transmissive state. In some implementations, when the shutter assembly 900 is in the relaxed state, the load electrode 924 is positioned somewhere, for example, halfway, between the shutter open drive electrode 932 and the primary drive electrode 966a.

FIG. 9A shows the shutter assembly 900 in the fully light transmissive state. The shutter assembly 900 can be readily driven to this state by actuating the shutter open actuator 920. To actuate the shutter open actuator 920, a first actuation voltage $V_1$ is applied to the shutter open drive electrode 932. Depending on the magnitude of the first actuation voltage $V_1$, a sufficiently large electrostatic force between the shutter open drive electrode 932 and the load electrode 924 is created causing the load electrode 924 to move into contact with the shutter open drive electrode 932. The shutter open drive electrode 932 serves as a mechanical stop for the load electrode 924. As such, the shutter open drive electrode 932 is positioned such that when the load electrode 924 is in contact with the shutter open drive electrode 932, the shutter 910 does not overlap any portion of the corresponding aperture 906. In this way, none of the light passing through the aperture 906 is blocked by the shutter 910.

When the first actuation voltage $V_1$ applied to the shutter open drive electrode 932 is removed, the shutter assembly 900 returns to the relaxed state. The shutter assembly 900 also can be driven to the partially light transmissive state or the non-light transmissive state. To drive the shutter assembly 900 to the partially light transmissive state, a second actuation voltage $V_2$ is applied to the primary drive electrode 966a of the drive electrode set 962.

FIG. 9B shows the shutter assembly 900 in the partially light transmissive state. In this state, the shutter 910 overlaps a portion of the aperture 906 such that the shutter 910 blocks some of the light passing through the aperture 906.

In some implementations, the primary drive electrode 966a of the drive electrode set 962 may be positioned such that when a second actuation voltage $V_2$ is applied to the primary drive electrode 966a, the load electrode 924 is attracted towards the primary drive electrode 966a. In some implementations, the primary drive electrode 966a can be positioned such that when the second actuation voltage $V_2$ substantially equal to the first actuation voltage $V_1$ is applied to the primary drive electrode 966a, the load electrode 924 moves towards the primary drive electrode 966a. In addition, the primary drive electrode 966a can serve as a mechanical stop. The primary drive electrode 966a can be positioned such that the shutter 910 can be drawn to an intermediary position relative to the corresponding aperture 906 such that it covers, for example, about 12.5%, about 25%, about 33%, about 37.5%, about 50%, about 62.5%, about 66%, about 75%, about 87.5% or any other percentage of the aperture 906, allowing a corresponding amount of light, for example, about 87.5%, about 75%, about 67%, about 62.5%, about 50%, about 37.5%, about 33%, about 25%, about 12.5% or any other percentage, to pass through the aperture 906.

To move the shutter 910 to the non-light transmissive state, a third actuation voltage $V_3$ is applied to the secondary drive electrode 966b while the second actuation voltage $V_2$ is simultaneously applied to the primary drive electrode 966a of the drive electrode set 962. FIG. 9C shows the shutter assembly 900 in the non-light transmissive state, or closed state. In this state, the shutter 910 overlaps the aperture 906 completely such that all of the light passing through the aperture 906 is blocked.

When the shutter assembly 900 is in the partially light transmissive state, the shutter 910 partially overlaps the corresponding aperture 906. The secondary drive electrode 966b is positioned such that when the third actuation voltage $V_3$ is applied, a sufficiently large electrostatic force between the secondary drive electrode 966b and a surface 914 of the shutter 910 facing the secondary drive electrode 966b is created to cause the shutter 910 to move towards the secondary drive electrode 966b and come into contact with it. In addition, the secondary drive electrode 966b should be positioned such that when the shutter 910 comes into contact with the secondary drive electrode 966b, the shutter 910 completely overlaps the corresponding aperture 906 such that no light passing through the aperture 906 is transmitted through the shutter assembly 900.

The actuation voltages can be provided to each of the shutter open drive electrode 932 and the primary and secondary drive electrodes 966 of the drive electrode set 962 by a single electrical interconnect. In some such implementations, switches can be used to control the application of the actuation voltage to either the shutter open drive electrode, the primary drive electrode 966a or the primary and secondary drive electrodes 966a and 966b. Separate data lines can be used to provide data voltages to control the switches. In some implementations, the first, second and third actuation voltages may be different. In some implementations, the electrical interconnect is configured to carry an actuation voltage that is sufficiently large that when provided to any of the drive electrodes 932, 966a and 966b, the corresponding load electrode or shutter is attracted to the actuated drive electrode.

As described above, the shutter assemblies of FIGS. 7A-7E and 8A-8E were configured such that, upon actuation of a corresponding shutter open or shutter close actuator, adjacent regions of the load electrodes came into contact with adjacent portions of the drive electrode sets. However, in some other implementations, multi-state shutter assemblies can have shutter open actuators and shutter close actuators in which the portions of the drive electrode sets that interact with corresponding regions are not adjacent to one another and the regions of the load electrodes that interact with such portions of the drive electrode sets are also not adjacent to one another. An example of one such multi-state shutter assembly is shown in FIGS. 10A-10E.

Figure 10A:
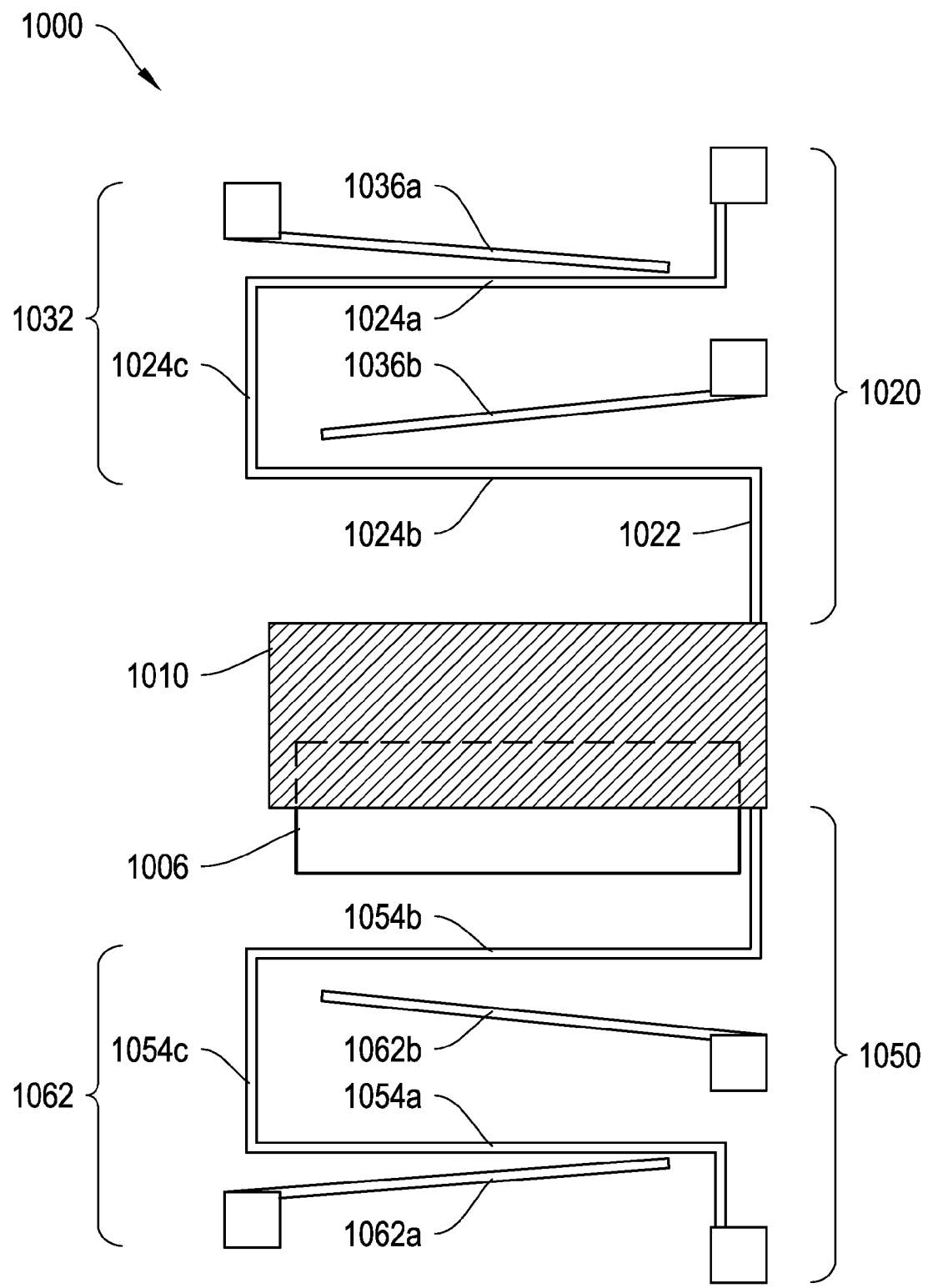
FIG. 10A-10E show plan views of another example multi-state shutter assembly.
Figure 10B:
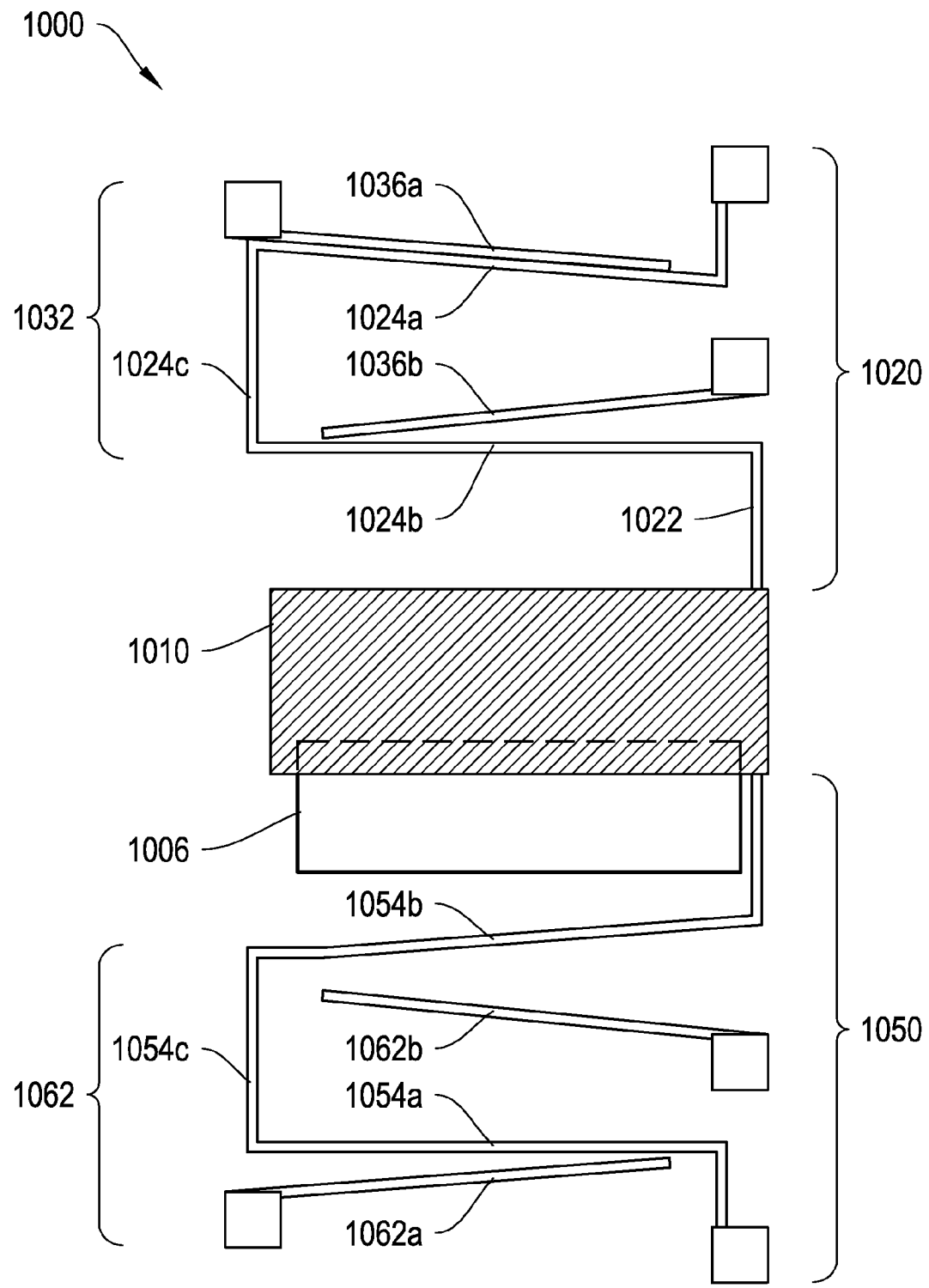
Figure 10C:
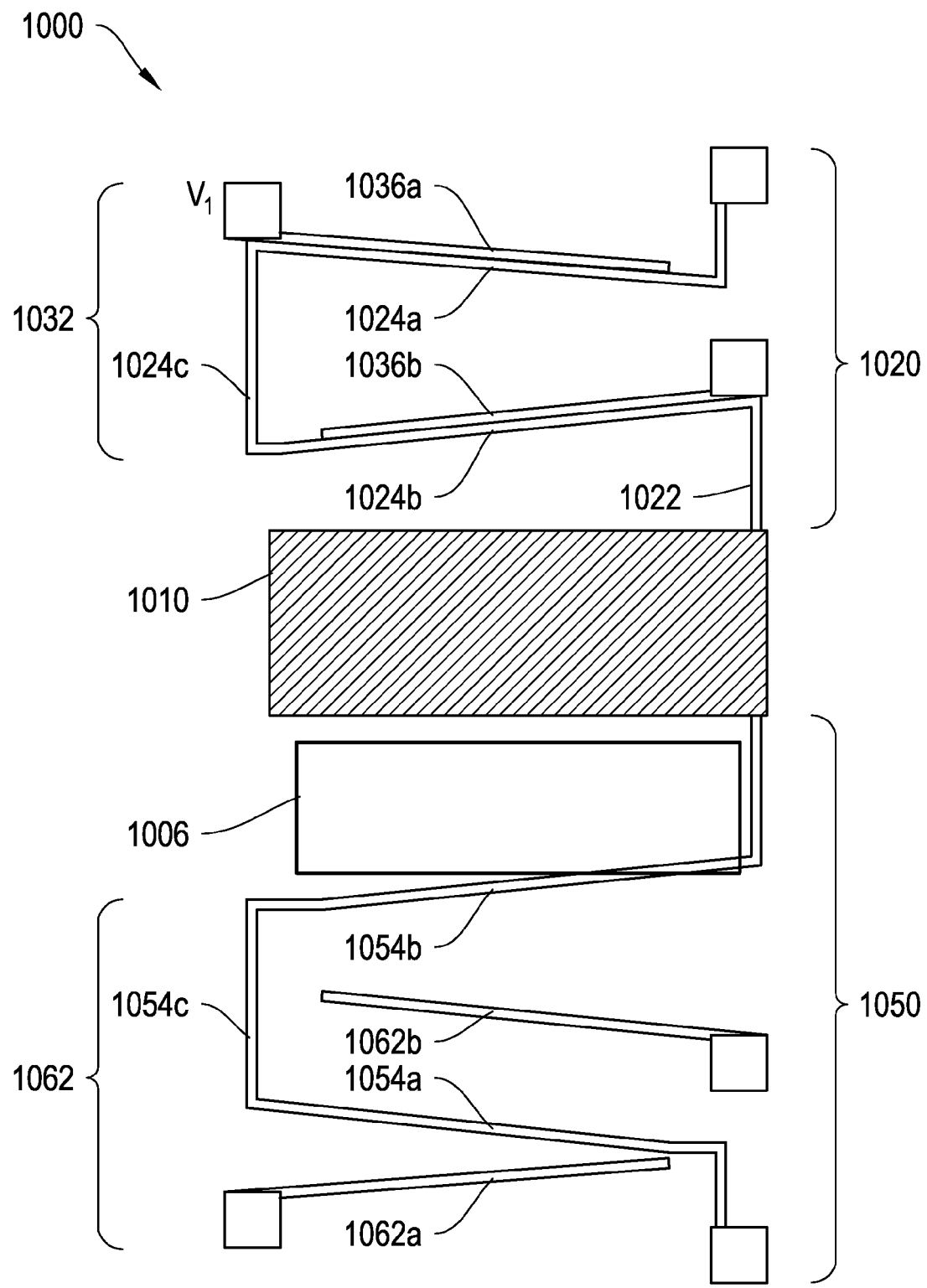
Figure 10D:
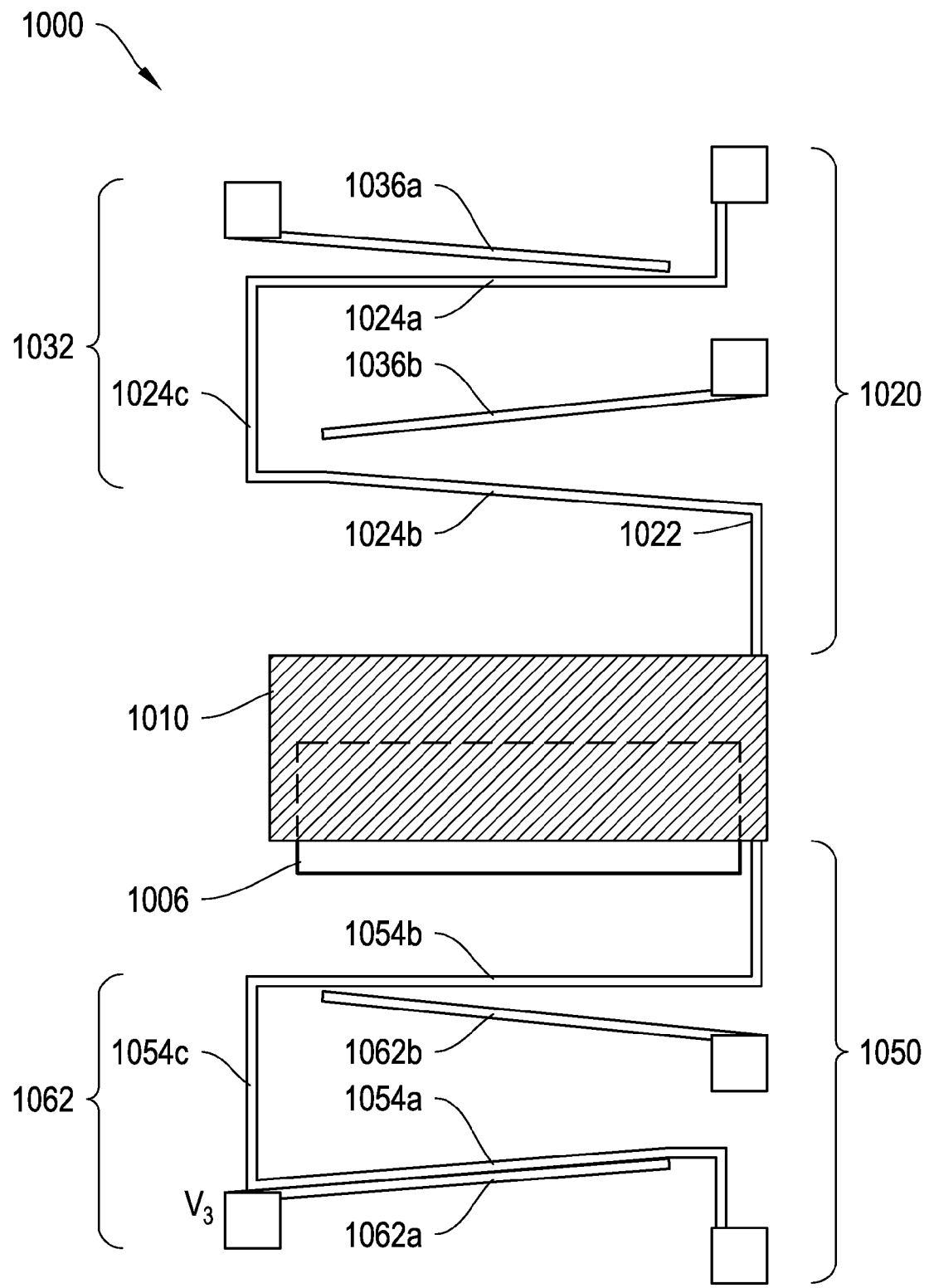
Figure 10E:
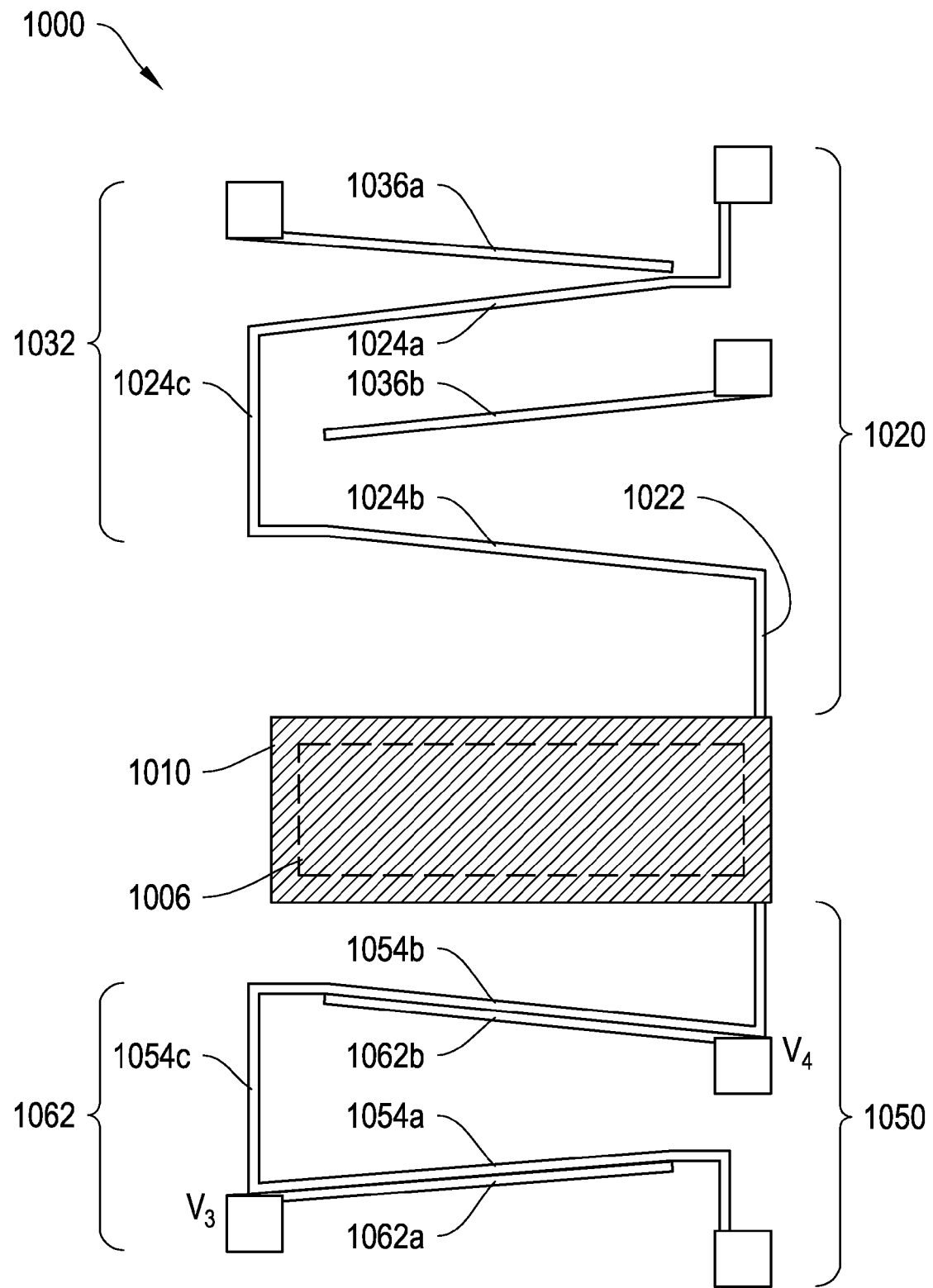

FIGS. 10A-10E show plan views of an example multi-state shutter assembly 1000. The shutter assembly 1000, also can achieve multiple light modulator states to implement an area division gray scale scheme. FIG. 10A shows the shutter assembly 1000 in a relaxed state. FIG. 10B shows the shutter assembly 1000 in a first partially transmissive state. FIG. 10C shows the shutter assembly in a fully light transmissive state. FIG. 10D shows the shutter assembly 1000 in a second partially transmissive state. FIG. 10E shows the shutter assembly 1000 in a non-light transmissive state.

Referring to FIGS. 10A-10E, the shutter assembly 1000 includes a shutter 1010 that is driven along an axis by two electrostatic actuators, a shutter open actuator 1020 and a shutter close actuator 1050. The shutter 1010 is supported over a corresponding aperture 1006 by a pair of load electrodes 1022 and 1052 that form a component of the respective shutter open and shutter close actuators 1020 and 1050.

The shutter open actuator 1020 also includes a first drive electrode set 1032 positioned opposing the first load electrode 1022. The first drive electrode set 1032 includes a first drive electrode 1036a and a second drive electrode 1036b (generally "drive electrodes 1036"), each of which form a discrete portion of the first drive electrode set 1032. The shutter close actuator 1050 includes a second load electrode 1052 and a second drive electrode set 1062 positioned proximate the second load electrode 1052. The second drive electrode set 1062 includes a first drive electrode 1066a and a second drive electrode 1066b (generally "drive electrodes 1066"), each of which form a discrete portion of the second drive electrode set 1062.

In some implementations, the first load electrode 1022 is substantially compliant and has a serpentine shape that includes a first region 1024a and a second region 1024b that are separated by an intermediate region 1024c. The first region 1024a is positioned proximate the first drive electrode 1036a and the second region 1024b is positioned proximate the second drive electrode 1036b. In some implementations, the first region 1024a is positioned between the first drive electrode 1036a and the second drive electrode 1036b.

The first drive electrode set 1032 is positioned such that the first drive electrode 1036a can electrostatically attract the first region 1024a when a first actuation voltage is applied to the first drive electrode 1036a. When the first actuation voltage is applied to the first drive electrode 1036a, the first load electrode 1022 deforms such that the first region 1024a of the load electrode 1022 comes into contact with the first drive electrode 1036a. In addition, the deformation of the load electrode 1022 also causes the second region 1024b to move closer towards the second drive electrode 1036b. Meanwhile, the movement of the load electrode 1022 causes the shutter 1010 to move towards the first drive electrode set 1032 such that the shutter 1010 overlaps a smaller portion of the corresponding aperture 1006. The second drive electrode 1036b is positioned such that when the first load electrode 1022 is electrostatically coupled to the first drive electrode 1036a, the second drive electrode 1036b can electrostatically attract the first load electrode 1022 such that the shutter assembly 1000 moves towards the fully light transmissive state.

The second load electrode 1052 also is substantially compliant and has a serpentine shape that includes a first region 1054a and a second region 1054b that are separated by an intermediate region 1054c. The first region 1054a is positioned proximate the first drive electrode 1066a and the second region 1054b is positioned proximate the second drive electrode 1066b. In some implementations, the first region 1054a is positioned between the first drive electrode 1066a and the second drive electrode 1066b. The shutter close actuator 1050 operates in a manner substantially similar to the shutter open actuator 1020. As such, the second drive electrode set 1062 is positioned relative to the second load electrode 1052 similar to how the first drive electrode set 1032 is positioned relative to the first load electrode 1022.

The drive electrodes 1036 and 1066 are configured to move the shutter 1010 to a plurality of light modulator states that are defined by a degree of actuation of the first drive electrode set 1032 and the second drive electrode set 1062. In the shutter assembly 1000, the degree of actuation relies on the number of drive electrodes of either the first or second drive electrode sets 1032 and 1062 that are actuated. In some implementations, the total number of light modulator states that the shutter assembly 1000 can reliably achieve can be equal to the total number of drive electrodes 1036 and 1066 used to form the shutter assembly. In some implementations, such shutter assemblies also can achieve one additional neutral or relaxed state. For example, the shutter assembly 1000 can readily achieve four distinct light modulator states. In addition, the shutter assembly 1000 also can, in some implementations, assume a fifth state, which is the relaxed state. As such, to drive the shutter assembly into a greater number of light modulator states, the shutter assembly can be designed to include a greater number of drive electrode segments.

FIG. 10A shows the shutter assembly 1000 in the relaxed state. In this state, neither the shutter open actuator 1020 nor the shutter close actuator 1050 is actuated. As such, there is no electrostatic force between the drive electrodes 1036a and 1036b and the first load electrode 1022 or the drive electrodes 1066a and 1066b and the second load electrode 1052. The shutter assembly 1000 can be designed such that when it is in the relaxed state, the shutter 1010 partially overlaps the corresponding aperture 1006. In some such implementations, the shutter 1010 can overlap about half of the corresponding aperture 1006.

FIG. 10B shows the shutter assembly 1000 in the first partially light transmissive state. In this state, the first drive electrode 1036a of the first drive electrode set 1032 is electrostatically engaged with the first region 1024a of the first load electrode 1022. By applying a first actuation voltage $V_1$ to the first drive electrode 1036a, an electrostatic force between the first drive electrode 1036a and the first region 1024a is created. The electrostatic force attracts the first region 1024a towards the first drive electrode 1036a causing the first load electrode 1022 to deform towards the first drive electrode set 1032. The deformation of the first load electrode 1022 causes the shutter 1010, which is coupled to the first load electrode 1022 to move towards the first drive electrode set 1032 such that the shutter 1010 overlaps a smaller portion of the corresponding aperture 1006 relative to when the shutter 1010 is in the relaxed state. As such, the shutter assembly 1000 allows more light to pass through in the first partially light transmissive state relative to the relaxed state. The first drive electrode 1036a serves as a mechanical stop for the load electrode 1022 thereby limiting the motion of the shutter 1010 to a position corresponding to the first partially light-transmissive state. As shown, when the shutter assembly 1000 in this state, the first drive electrode 1036a is in contact with the first region 1024a and the distance between the second drive electrode 1036b and the second region 1024b is smaller than the distance between the two when the shutter assembly 1000 was in the relaxed state.

FIG. 10C shows the shutter assembly 1000 in the fully light transmissive state. In this state, the first and second drive electrodes 1036a and 1036b are electrostatically engaged with the first and second regions 1024a and 1024b. To move the shutter assembly 1000 to this state from the first partially light transmissive state, a second actuation voltage $V_2$ is applied to the second drive electrode 1036b. In some implementations, the magnitude of the first actuation voltage $V_1$ and the second actuation voltage $V_2$ can be the same. In some other implementations, the first actuation voltage $V_1$ can be greater than or less than the second actuation voltage $V_2$. By applying the second actuation voltage $V_2$ to the second drive electrode 1036b, an electrostatic force between the second drive electrode 1036b and the second region 1024b is created that is sufficiently large enough to cause the second region 1024b to move towards the second drive electrode 1036b. This, in turn, causes the shutter 1010 to move even closer to the first drive electrode set 1032. The first and second drive electrodes 1036 of the first drive electrode set 1032 are positioned such that when the first and second regions 1024 of the first load electrode 1022 are in contact with the drive electrodes 1036, the shutter 1010 no longer overlaps any portion of the corresponding aperture 1006. As such, the shutter assembly 1000 allows all the light passing through the aperture 1006 to pass through the shutter assembly.

If the shutter close actuator 1050 is actuated, the shutter assembly 1000 can deform towards the shutter close actuator 1050. When the first drive electrode 1066a is actuated, the shutter assembly 1000 can move towards the second partially light transmissive state.

FIG. 10D shows the shutter assembly 1000 in the second partially light transmissive state. In this state, the first drive electrode 1066a of the second drive electrode set 1062 is electrostatically engaged with the first region 1054a of the second load electrode 1052 causing the second load electrode 1052 to deform towards the second drive electrode set 1062. The deformation of the second load electrode 1052 causes the shutter 1010 to move towards the second drive electrode set 1062 such that the shutter 1010 overlaps a larger portion of the corresponding aperture 1006 relative to when the shutter 1010 is in the relaxed state. As such, the shutter assembly 1000 allows less light to pass through in the second partially light transmissive state relative to the relaxed state. The first drive electrode 1066a serves as a mechanical stop for the second load electrode 1052 thereby limiting the motion of the shutter 1010 to a position corresponding to the second partially light-transmissive state. As shown, when the shutter assembly 1000 is in this state, the first drive electrode 1066a is in contact with the first region 1054a and the distance between the second drive electrode 1066b and the second region 1054b is smaller than the distance between the two when the shutter assembly 1000 was in the relaxed state.

FIG. 10E shows the shutter assembly 1000 in the non-light transmissive state, or closed state. In this state, the first and second drive electrodes 1066a and 1066b are electrostatically engaged with the first and second regions 1054a and 1054b. To move the shutter assembly 1000 to this state from the second partially light transmissive state, a second actuation voltage is applied to the second drive electrode 1066b. This creates an electrostatic force between the first drive electrode 1066a and the first region 1024a that is sufficiently large enough to cause the second region 1024b to move towards the second drive electrode 1066b. This, in turn, causes the shutter 1010 to move even closer to the second drive electrode set 1062. The first and second drive electrodes 1066 of the second drive electrode set 1062 are positioned such that when the first and second regions 1054 of the load electrode 1052 are in contact with the drive electrodes 1066, the shutter 1010 completely overlaps the corresponding aperture 1006. As such, the shutter assembly 1000 blocks all the light passing through the aperture 1006.

Similar to the drive electrode sets described above with respect to FIGS. 7A-7E and 8A-8E, each of the first and second drive electrodes 1036a and 1036b of the first drive electrode set 1032 and the first and second drive electrodes 1066a and 1066b of the second drive electrode set 1062 can serve as mechanical stops. The drive electrodes 1036a, 1036b, 1066a and 1066b can be positioned such that the shutter 1010 can be drawn to various intermediary positions relative to the corresponding aperture 1006 such that it covers about, for example, 12.5%, about 25%, about 33%, about 37.5%, about 50%, about 62.5%, about 66%, about 75%, about 87.5% or any other percentage of the aperture 806, allowing a corresponding amount of light, for example, about 87.5%, about 75%, about 67%, about 62.5%, about 50%, about 37.5%, about 33%, about 25%, about 12.5% or any other percentage, to pass through the aperture 1006.

Each of the drive electrodes that make up the drive electrode sets 1032 and 1062 can be designed, positioned or configured such that the drive electrodes can electrostatically attract a corresponding region of the load electrode 1022 or 1052 when the same actuation voltage is applied. That is, the shutter assembly 1000 is configured such that the actuation voltages $V_1$ and $V_2$ are both substantially equal. In this way, a single electrical interconnect can supply the actuation voltage to each of the drive electrodes 1036 and 1066 of the corresponding drive electrode sets 1032 and 1062. Switches can be used to control the application of the actuation voltage to each of the drive electrodes 1036 and 1066. In some implementations, multiple data lines per pixel carry data voltages to switches controlling the application of the actuation voltages to each respective drive electrode 1036 and 1066. By doing this, only a single electrical interconnect is needed to provide an actuation voltage to each shutter assembly 1000.

It should be noted that the arrangement of the first drive electrode and the second drive electrode in each of the first and second drive electrode sets can allow for greater shutter travel distance between the different light modulator states as compared to the arrangement of the drive electrodes shown in FIGS. 7A-7E and the segments shown in FIG. 8A-8E. As a result, this arrangement can allow for larger apertures, thereby increasing the aperture ratio of the display, which is desirable.

In some implementations, the first drive electrode 1036a and the second drive electrode 1036b of the first drive electrode set 1032 can be positioned such that the shutter 1010 can be driven from a relaxed state to a completely light transmissive state, or open state, when an actuation voltage is concurrently applied to both the first drive electrode 1036a and the second drive electrode 1036b of the first drive electrode set 1032. Conversely, the first drive electrode 1066a and the second drive electrode 1066b of the second drive electrode set 1062 can be positioned such that the shutter 1010 can be driven from a relaxed state to a non-light transmissive state, or closed state, when an actuation voltage is concurrently applied to both the first drive electrode 1066a and the second drive electrode 1066b of the second drive electrode set 1062. In some such implementations, the shutter 1010 can travel between the relaxed state to the open state or closed state in a shorter amount of time than if the drive electrodes were not actuated concurrently. In some implementations, the actuation voltage applied to the first drive electrode can be different from the actuation voltage applied to the second drive electrode.

In some implementations, each of the drive electrode sets 1032 and 1066 can include more than two drive electrodes. In some such implementations, the number of light modulator states the shutter assembly 1000 can reliably achieve can be equal to the total number of drive electrodes included in the drive electrode sets 1032 and 1066 that form the shutter assembly. As such, to drive the shutter assembly into a greater number of light modulator states, the shutter assembly can be designed to include a greater number of drive electrode segments.

Figure 11A:
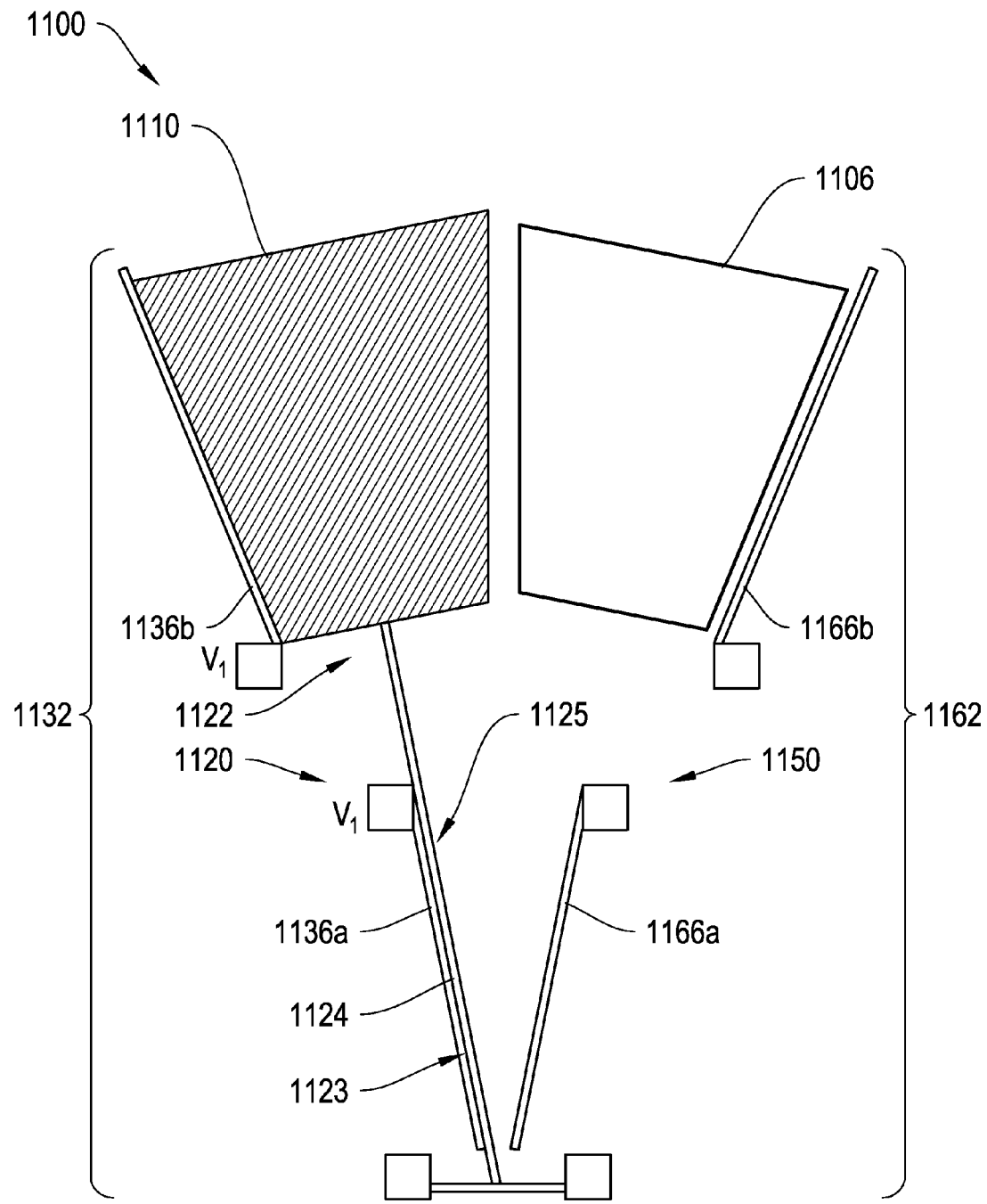
FIGS. 11A and 11B show plan views of another example multi-state shutter assembly.
Figure 11B:
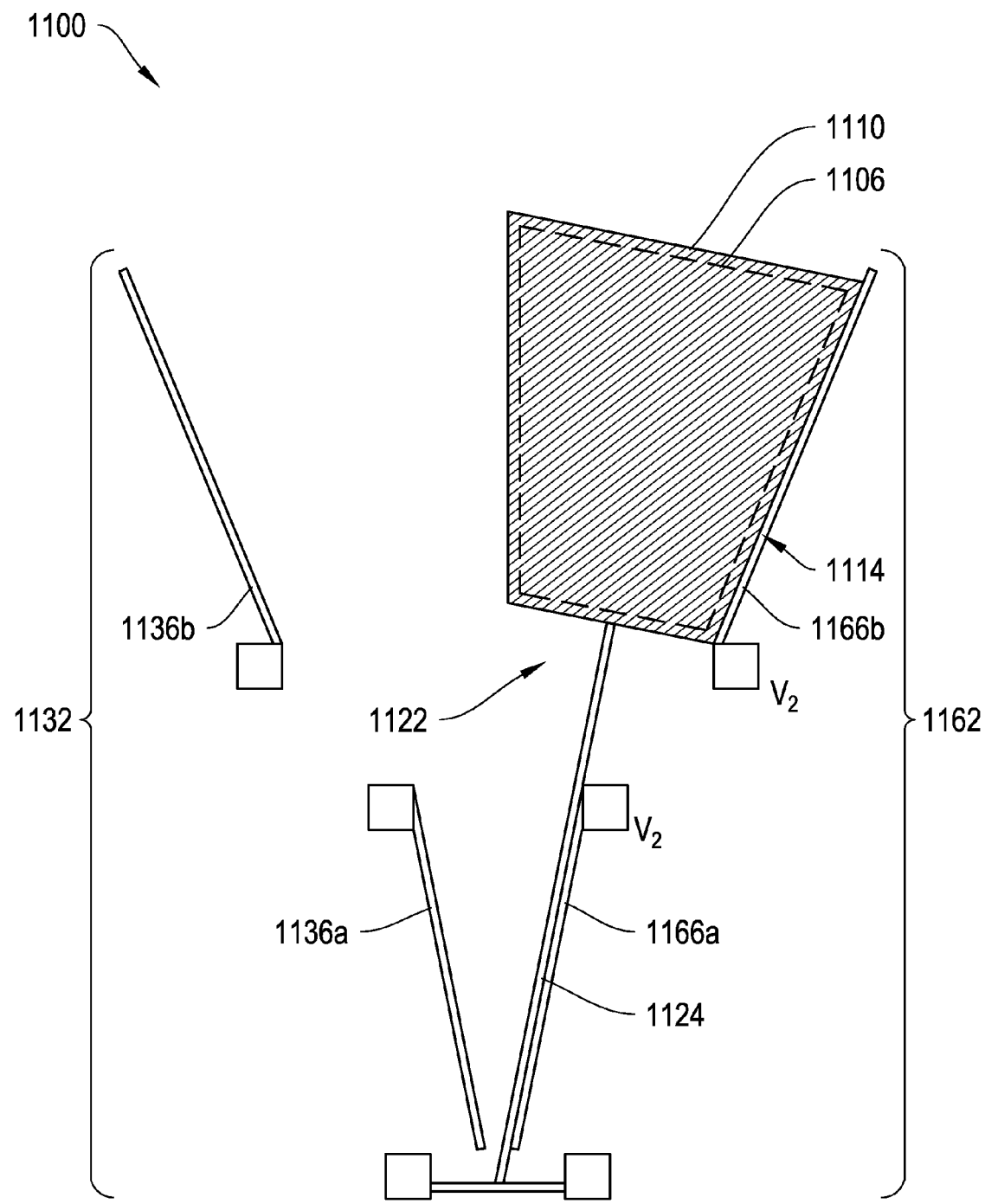

FIGS. 11A and 11B show plan views of an example multi-state shutter assembly 1100. The shutter assembly 1100, similar to the shutter assembly 900 shown in FIGS. 9A-9C includes a shutter open actuator and a shutter close actuator that both include the same load electrode. FIG. 11A shows the shutter assembly 1100 in a fully light transmissive state. FIG. 11B shows the shutter assembly 1100 in a non-light transmissive state.

Referring to FIGS. 11A and 11B, the shutter assembly 1100 includes a shutter 1110 that is driven about an axis by two electrostatic actuators, a shutter open actuator 1120 and a shutter close actuator 1150. The shutter 1110 is supported over a corresponding aperture 1106 by a load electrode 1124.

The shutter open actuator 1120 is configured to move the shutter 1110 towards a completely light transmissive state in which the shutter 1110 does not overlap the corresponding aperture 1106. The shutter open actuator 1120 includes a load electrode set 1122, which includes both the load electrode 1124 and the shutter 1110, and a shutter open drive electrode set 1132. The shutter open drive electrode set 1132 includes two mechanically isolated drive electrodes, specifically, a primary drive electrode 1136a and a secondary drive electrode 1136b (generally "drive electrodes 1136"). The primary drive electrode 1136a and the secondary drive electrode 1136b each forms a discrete portion of the shutter open drive electrode set 1132. The primary drive electrode 1136a is positioned opposing the load electrode 1124 such that the primary drive electrode 1136a faces a first actuation surface 1123 of the load electrode 1124. The secondary drive electrode 1136b is positioned away from the aperture 1106 such that when the shutter 1110 is in contact with the secondary drive electrode 1166b, the shutter 1110 does not overlap any portion of the aperture 1106.

The shutter close actuator 1150 is configured to move the shutter 1110 towards the non-light transmissive state in which the shutter 1110 completely overlaps the corresponding aperture 1106. The shutter close actuator 1150 includes the load electrode set 1122, which includes both the load electrode 1124 and the shutter 1110 and a shutter close drive electrode set 1162. The shutter close drive electrode set 1162 includes two mechanically isolated drive electrodes, specifically, a primary drive electrode 1166a and a secondary drive electrode 1166b (generally "drive electrodes 1166"). The primary drive electrode 1166a and the secondary drive electrode 1166b each forms a discrete portion of the shutter close drive electrode set 1162. The primary drive electrode 1166a is positioned opposing the load electrode 1124 such that the primary drive electrode 1166a faces a second actuation surface 1125 of the load electrode 1124 that is on the opposite face of the load electrode 1124 than the first actuation surface 1123. The secondary drive electrode 1166b is positioned adjacent the aperture 1106 such that when the shutter 1110 is in contact with the secondary drive electrode 1166b, the shutter 1110 completely overlaps the aperture 1106.

By utilizing drive electrode sets that include both a primary drive electrode and a secondary drive electrode, the shutter 1110 can move between a light transmissive state and a non-light transmissive state faster than implementations that only include primary drive electrodes that electrostatically engage with the load electrode 1124. This is because the primary drive electrode and the secondary drive electrode can impart a greater force on the load electrode set 1122 due to the increased surface area between the drive electrodes 1136 and the load electrode set 1122. Moreover, the secondary drive electrodes 1136b and 1166b can control the movement of the shutter 1110 more precisely relative to the primary drive electrodes 1136a and 1166a, which can control the movement of the shutter 1110 by moving the load electrode 1124 to which the shutter 1110 is connected.

The shutter assembly 1100 can readily achieve a total of at least two light modulator states, namely the fully light transmissive state and the non-light transmissive state. In addition, the shutter assembly 1100 has a relaxed state in which neither the shutter open actuator 1120 nor the shutter close actuator 1150 is actuated. In some implementations, when the shutter assembly 1100 is in the relaxed state, the shutter 1110 can partially overlap the aperture 1106. In some implementations, when the shutter assembly 1100 is in the relaxed state, the load electrode 1124 is positioned somewhere, for example, halfway, between the primary drive electrode 1136a and the primary drive electrode 1166a.

FIG. 11A shows the shutter assembly 1100 in the fully light transmissive state. The shutter assembly 1100 can be readily driven to this state by actuating the shutter open actuator 1120. To actuate the shutter open actuator 1120, a first actuation voltage $V_1$ is applied to the primary drive electrode 1136a and the secondary drive electrode 1136b. A sufficiently large electrostatic force between the primary drive electrode 1136a and the load electrode 1124 and the secondary drive electrode 1136b and the shutter 1110 is created causing the load electrode 1124 to move into contact with the primary drive electrode 1136a and the shutter 1110 to move into contact with the secondary drive electrode 1136b. The primary drive electrode 1136a serves as a mechanical stop for the load electrode 1124, while the secondary drive electrode 1136b serves as a mechanical stop for the shutter 1110. As such, the primary drive electrode 1136a is positioned such that when the load electrode 1124 is in contact with the primary drive electrode 1136a and the secondary drive electrode 1136b is in contact with the shutter 1110, the shutter 1110 does not overlap any portion of the corresponding aperture 1106. In this way, none of the light passing through the aperture 1106 is blocked by the shutter 1110.

When the first actuation voltage $V_1$ applied to the drive electrodes 1136 is removed, the shutter assembly 1100 returns to the relaxed state. The shutter assembly 1100 also can be driven to the non-light transmissive state. To drive the shutter assembly 1100 to the non-light transmissive state, a second actuation voltage $V_2$ is applied to the primary drive electrode 1166a and the secondary drive electrode 1166b. FIG. 11B shows the shutter assembly 1100 in the non-light transmissive state. In this state, the shutter 1110 overlaps the aperture 1106 completely such that all of the light passing through the aperture 1106 is blocked.

The actuation voltages can be provided to each of the primary and secondary drive electrodes 1136 of the shutter open drive electrode set 1132 and the primary and secondary drive electrodes 1166 of the shutter close drive electrode set 1162 by a single electrical interconnect. In some such implementations, switches can be used to control the application of the actuation voltage to either the shutter open drive electrode set 1132 or the shutter close drive electrode set 1162. In some implementations, the first and second actuation voltages may be different.

As described above with respect to FIGS. 11A and 11B, the shutter assembly 1100 discloses a two state shutter assembly. In some other implementations, the shutter assembly 1100 may be configured such that the shutter assembly can achieve multiple light modulator states to implement an area division gray scale scheme. In some implementations, the shutter assembly 1100 can be configured such that the primary and secondary drive electrodes 1136 of the shutter open drive electrode set 1132 can be electrically isolated and configured to receive separate actuation voltages. Similarly, the primary and secondary drive electrodes 1166 of the shutter close drive electrode set 1162 also can be electrically isolated and configured to receive separate actuation voltages. In addition, the positions of each of the drive electrodes 1136 and the drive electrodes 1166 can be positioned such that the shutter assembly 1100 can achieve a non-light transmissive state, a fully light transmissive state, and two distinct partially light transmissive states.

Specifically, the drive electrodes 1136 of the shutter open drive electrode set 1132 can be positioned such that when a sufficiently large actuation voltage is applied to both the drive electrodes 1136, the shutter 1110 does not overlap any portion of the aperture 1106. In this state, the shutter assembly 1100 is in the fully light transmissive state. Similarly, the drive electrodes 1166 of the shutter close drive electrode set 1162 can be positioned such that when a sufficiently large actuation voltage is applied to both the drive electrodes 1166, the shutter 1110 completely overlaps the aperture 1106. In this state, the shutter assembly 1100 is in the non-light transmissive state. Further, if a sufficiently large actuation voltage is applied to only the primary drive electrode 1136a of the shutter open drive electrode set 1132, the load electrode 1124 moves towards the primary drive electrode 1136a, while the shutter 1110 overlaps a portion of the aperture 1106. In this state, the shutter assembly 1100 is in a first partially light transmissive state. Conversely, if a sufficiently large actuation voltage is applied to only the primary drive electrode 1166a of the shutter close drive electrode set 1162, the shutter 1110 overlaps a greater portion of the aperture 1106 than when the shutter assembly 1100 is in a first partially light transmissive state. In this state, the shutter assembly 1100 is in a second partially light transmissive state. In this state, the shutter 1110 can block more of the light passing through the aperture 1106 in comparison to the amount of light blocked by the shutter 1110 when the shutter assembly 1100 is in the first partially light transmissive state.

In some such implementations, the actuation voltages can be provided to each of the primary and secondary drive electrodes 1136 of the shutter open drive electrode set 1132 and the primary and secondary drive electrodes 1166 of the shutter close drive electrode set 1162 by a single electrical interconnect. In some such implementations, switches can be used to control the application of the actuation voltage to either the shutter open drive electrode set or the shutter close drive electrode set.

In some implementations, the primary and the secondary drive electrodes 1136 of the shutter-open drive electrode set 1132 can be electrically isolated from one another such that they can be independently controlled. Similarly, the primary and the secondary drive electrodes 1166 of the shutter-close drive electrode set 1162 also can be electrically isolated from one another such that they also can be independently controlled. In some such implementations, the shutter assembly 1100 can readily achieve a total of at least four distinct light modulator states, namely the fully light transmissive state or open state, a first partially light transmissive state, a second partially light transmissive state and the non-light transmissive state or closed state.

To achieve the fully light transmissive state, both the primary and secondary drive electrodes 1136 of the shutter-open drive electrode set 1132 are electrostatically engaged with the load electrode 1124 such that the shutter 1110 does not overlap the underlying aperture 1106. To achieve the first partially light transmissive state, only the primary drive electrode 1136a of the shutter-open drive electrode set 1132 is electrostatically engaged with the load electrode 1124 causing the shutter 1110 to overlap a portion of the underlying aperture 1106. To achieve the second partially light transmissive state, only the primary drive electrode 1166a of the shutter-close drive electrode set 1162 is electrostatically engaged with the load electrode 1124 causing the shutter 1110 to overlap a larger portion of the underlying aperture 1106 compared to when the shutter assembly is in the first partially light transmissive state. To achieve the non-light transmissive state, both the primary and secondary drive electrodes 1136 of the shutter-open drive electrode set 1132 can be electrostatically engaged with the load electrode 1124 causing the shutter 1110 to completely overlap the underlying aperture 1106.

It should be noted that the shutter assemblies described in FIGS. 7A-7E, 8A-8E, 9A-9C, 10A-10E, 11A and 11B are described as dual-actuated shutter assemblies. That is, the shutters include a first electrostatic actuator to move the shutter assembly towards a completely light transmissive state or open state and a second electrostatic actuator to move the shutter assembly towards a fully light blocking state or closed state. In some implementations, the shutter assembly may include only one of the first and second electrostatic actuator, while a spring replaces the other of the first and second electrostatic actuator. Moreover, in some implementations, the first electrostatic actuator may be configured to move the shutter assembly towards the fully light blocking state or closed state while the second electrostatic actuator may be configured to move the shutter assembly towards the completely light transmissive state or open state.

Figure 12:
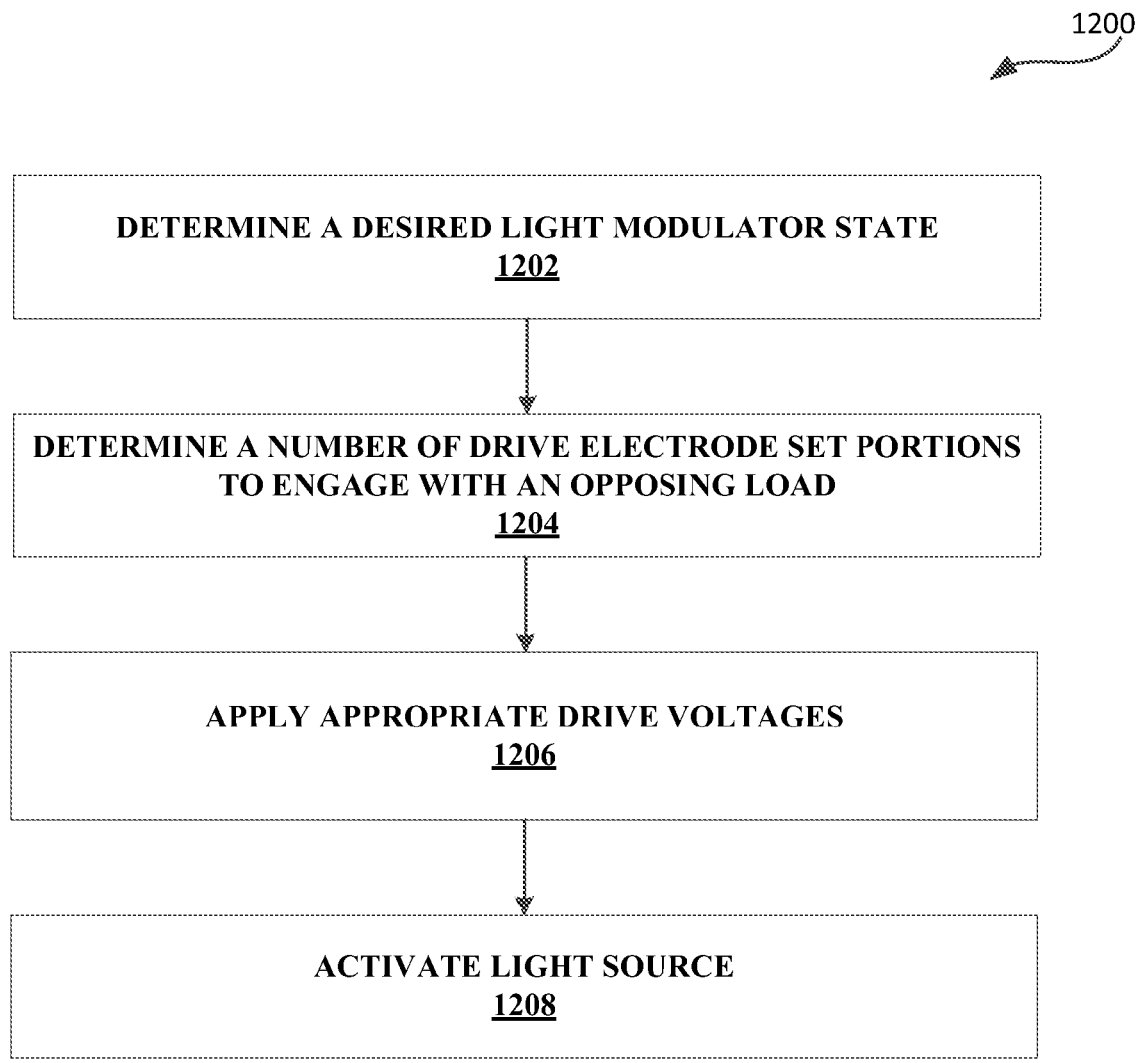
FIG. 12 is a flow diagram of an example method for actuating a multi-state shutter assembly.

FIG. 12 is a flow diagram of an example method for actuating a multi-state shutter assembly. The method 1200 may be employed, for example, to actuate the shutter assemblies 700, 800, 900, 1000 and 1100 depicted in FIGS. 7A-11B. In the method 1200, a desired light modulator state is determined (block 1202). Based on the desired state, a number of drive electrode set portions to engage with an opposing load beam is determined (block 1204). Appropriate drive voltages are then applied to the light modulator to cause the determined number of drive electrode set portions to engage with the opposing load beam (block 1206). A light source is then activated (block 1208).

A controller, such as the controller 134 shown in FIG. 1B is suitable for controlling the shutter assemblies 700, 800, 900, 1000 and 1100 depicted in FIGS. 7A-11B. Based on the level of light to be output from a display pixel, a desired light modulator state is determined (block 1202). For example, the light modulator may be able to achieve a closed state obstructing the passage of substantially all light, an open state allowing the passage of substantially all incident light, as well as several intermediate states that allow varying amounts of light to pass. Based on the desired state, a number of drive electrode set portions to engage with an opposing load beam is determined (block 1204). In some implementations, the controller can determine the number of drive electrode set portions to engage with an opposing load beam. For example, using the shutter assembly 700 shown in FIGS. 7A-7E as an example, the controller can determine that all three drive electrode set portions 736a-736c of the first drive electrode set 732 need to engage with the opposing load beam 752 to achieve the fully light transmissive state, while two drive electrode set portions 736a and 736b of the first drive electrode set 732 need to engage with the opposing load beam 752 to achieve a second partially light transmissive state. When determining the number of drive electrode set portions, the controller also can determine the drive electrode set of which the number of drive electrode set portions are a part. For example, to achieve the fully light transmissive state, the controller determines that the drive electrode set portions of the first drive electrode set 732 are to be electrostatically engaged with the load electrode, while to achieve the non-light transmissive state or closed state, the controller determines that the drive electrode set portions of the second drive electrode set 762 are electrostatically engaged with the load electrode. In this way, the controller determines the specific drive electrode portions that are to engage an opposing load beam.

Once the number of drive electrode set portions to engage with an opposing load beam is determined (block 1204), the controller can cause appropriate drive voltages to be applied to the light modulator to cause the determined number of drive electrode set portions to engage with the opposing load beam (block 1206). In some implementations, for example, in the shutter assemblies 700 shown in FIGS. 7A-7E and the shutter assemblies 900, 1000 and 1100 shown in FIGS. 9A-11B, a drive voltage can be independently applied to each of the drive electrode set portions that have been determined to engage with the opposing load beam. In some other implementations, for example, the shutter assembly 800 shown in FIGS. 8A-8E, a drive voltage sufficiently large to cause the determined number of drive electrode set portions to engage with the opposing load beam can be applied to the drive electrode set 832 or 862. Upon applying the appropriate drive voltages to the light modulator, the light modulator can achieve the desired light modulator state. Once the light modulator achieves the particular light modulator state, a light source, such as the lamp 518 depicted in FIG. 5 is activated (block 1208).

Figure 13A:
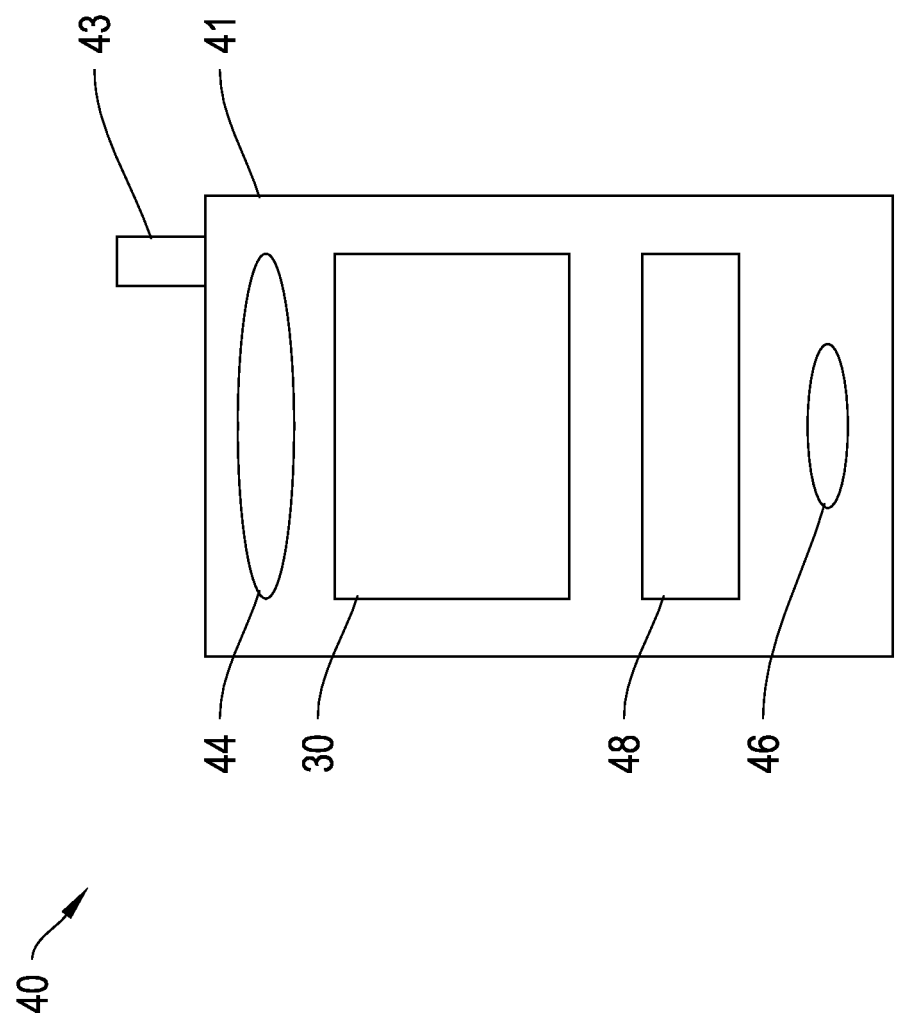
FIGS. 13A and 13B show system block diagrams of an example display device that includes a plurality of display elements.
Figure 13B:
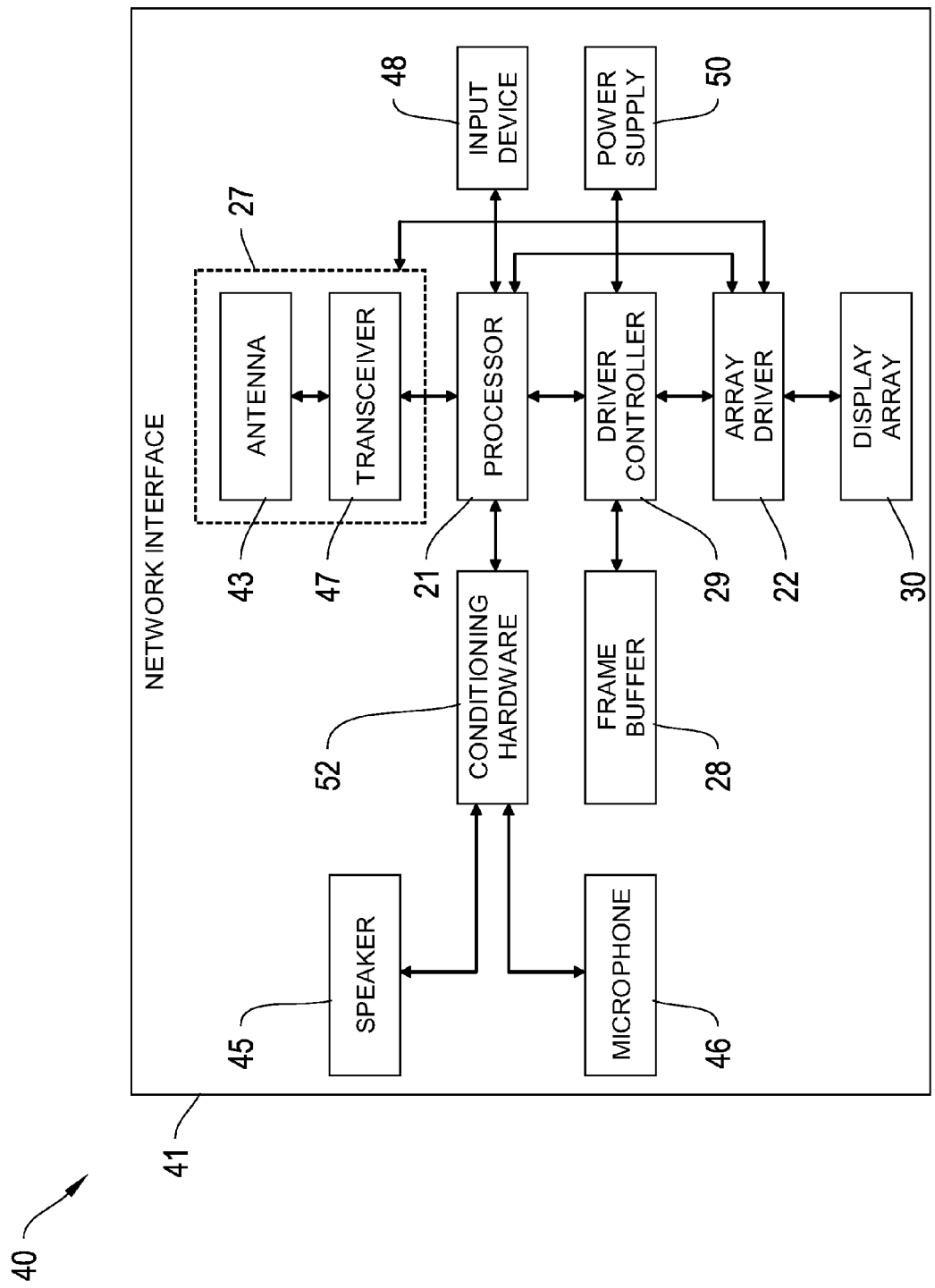

FIGS. 13A and 13B show system block diagrams of an example display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 13A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 13A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can preprocess the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a standalone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:
1. An apparatus, comprising:
a light modulator;
a first electrostatic actuator configured to move the light modulator in a first direction, comprising:
  a load electrode coupled to the light modulator; and
  a drive electrode set positioned proximate to the load electrode, the drive electrode set including a plurality of discrete portions with a first portion opposing a first region of the load electrode and a second portion positioned opposing a second region of the load electrode, each portion electrically coupled to a separately controlled switch for controlling the application of an actuation voltage, wherein the first electrostatic actuator is configured to move the light modulator to a plurality of distinct light modulator states that are defined by a degree of actuation of the first electrostatic actuator, the plurality of distinct light modulator states including an open state, a closed state, and at least one intermediate state, each of the plurality of distinct light modulator states corresponding to a different number of portions to which the actuation voltage is applied; and a second electrostatic actuator configured to move the light modulator in a second direction opposite the first direction.

2. The apparatus of claim 1, wherein the load electrode is compliant and configured to deform towards the drive electrode set.

3. The apparatus of claim 1, wherein the first region of the load electrode is electrically coupled to a second region of the load electrode via a serpentine member.

4. The apparatus of claim 1, wherein a portion of the light modulator forms the second region of the load electrode.

5. The apparatus of claim 4, wherein the first region of the load electrode is positioned between a first portion of the first drive electrode set and a first portion of the second drive electrode set; and wherein the second region of the load electrode is positioned between a second portion of the first drive electrode set and a second portion of the second drive electrode set.

6. The apparatus of claim 5, wherein the portions are arranged in a step-wise manner.

7. The apparatus of claim 1, wherein each of the discrete portions of the drive electrode set has an actuation surface configured to electrostatically engage with a corresponding region of the load electrode.

8. The apparatus of claim 7, wherein the portions are positioned such that the load electrode is positioned between the first portion and the second portion.

9. The apparatus of claim 1, wherein the portions are arranged such that a distance separating the first portion and the load electrode is smaller than a distance separating the second portion and the load electrode.

10. The apparatus of claim 1, wherein the first electrostatic actuator is configured such that:

when the first discrete portion is not electrostatically engaged with the first region, a first end point of the first discrete portion is separated from the first region of the load electrode by a first distance, when the first discrete portion is electrostatically engaged with the first region of the load electrode, a second end point of the second discrete portion is separated from the second region of the load electrode by a second distance, and the first distance is smaller than the second distance.

11. The apparatus of claim 1, further comprising:
a substrate having an aperture formed therein;
wherein the light modulator is supported over the aperture; and
wherein the light modulator is configured to move to a partially light transmissive state when the first discrete portion is electrostatically engaged with the first region of the load electrode and configured to move to a completely light transmissive state when the second discrete portion is electrostatically engaged with the second region of the load electrode.

12. The apparatus of claim 1, wherein the light modulator, the first electrostatic actuator, and the second electrostatic actuator form a display element, the apparatus further including:
a display including an array of display elements;
a processor that is configured to communicate with the display, the processor being configured to process image data; and
a memory device that is configured to communicate with the processor.

13. The apparatus of claim 12, further comprising:
a driver circuit configured to send at least one signal to the display; and wherein
the controller further configured to send at least a region of the image data to the driver circuit.

14. The apparatus of claim 12, further comprising:
an image source module configured to send the image data to the processor, wherein the image source module comprises at least one of a receiver, transceiver, and transmitter.

15. The apparatus of claim 12, further comprising:
an input device configured to receive input data and to communicate the input data to the processor.

16. An apparatus, comprising:
a light modulator;
a first electrostatic actuator configured to move the light modulator in a first direction, comprising:
a compliant load electrode coupled to the light modulator; and
a drive electrode set positioned opposing the load electrode, the drive electrode set including a plurality of electrically coupled discrete portions, each portion comprising a drive beam coupled at one end to a different drive beam anchor, with a first portion opposing a first region of the load electrode and a second portion positioned opposing a second region of the load electrode, the portions arranged in a stepwise manner such that a distance between the first portion and the first region of the load electrode is smaller than a distance between a the second portion and the second region of the load electrode when the first electrostatic actuator is in a relaxed state, wherein the first electrostatic actuator is configured to drive the light modulator to a plurality of distinct light modulator states, the plurality of distinct light modulator states including an open state, a closed state, and at least one intermediate state and each of the plurality of distinct light modulator states corresponding to a magnitude of an actuation voltage applied; and
a second electrostatic actuator configured to move the light modulator in a second direction opposite the first direction.

17. The apparatus of claim 16, wherein the first portion is configured to electrostatically engage the first region of the load electrode and the second portion is configured to electrostatically engage the second region of the load electrode.

18. The apparatus of claim 16, wherein a first region of the load electrode is electrically coupled to a second region of the load electrode via a serpentine member.

19. The apparatus of claim 16, wherein a portion of the light modulator comprises the second region of the load electrode.

20. The apparatus of claim 19, wherein the first region of the load electrode is positioned between a first portion of the first drive electrode set and a first portion of the second drive electrode set; and wherein the second region of the load electrode is positioned between a second portion of the first drive electrode set and a second portion of the second drive electrode set.

21. The apparatus of claim 16, wherein the first electrostatic actuator is configured such that:

when the first discrete portion is not electrostatically engaged with the first region, a first end point of the first discrete portion is separated from the first region of the load electrode by a first distance, when the first discrete portion is electrostatically engaged with the first region of the load electrode, a second end point of the second discrete portion is separated from the second region of the load electrode by a second distance, and the first distance is smaller than the second distance.

22. The apparatus of claim 16, further comprising:
a substrate having an aperture formed therein;
wherein the light modulator is supported over the aperture; and
wherein the light modulator is configured to move to a partially light transmissive state when the first discrete portion is electrostatically engaged with the first region of the load electrode and configured to move to a completely light transmissive state when the second discrete portion is electrostatically engaged with the second region of the load electrode.

23. An apparatus, comprising:
a light modulator; and
an electrostatic actuator comprising:
    a load electrode coupled to the light modulator; and
    a plurality of drive electrodes, each comprising a drive beam coupled at one end to a different drive beam anchor and electrically coupled to a separately controlled switch for controlling the application of an actuation voltage, positioned proximate to the load electrode such that a first drive electrode is positioned opposing a first region of the load electrode and a second drive electrode is positioned opposing a second region of the load electrode, the plurality of drive electrodes configured to move the light modulator to a plurality of distinct light modulator states that are defined by a degree of actuation of the electrostatic actuator, the plurality of distinct light modulator states including an open state, a closed state, and at least one intermediate state, and each of the plurality of distinct light modulator states corresponding to a number of drive electrodes to which the actuation voltage is applied.

24. The apparatus of claim 23, wherein the portions are arranged such that a distance separating the first portion and the load electrode is smaller than a distance separating the second portion and the load electrode.

25. An apparatus, comprising:
a light modulator; and
an electrostatic actuator comprising:
    a load electrode coupled to the light modulator; and
    a drive electrode comprising a drive beam coupled at one end to a drive beam anchor, the drive beam including a plurality of discrete drive beam segments connected to form a single continuous electrode such that the curvature of the single continuous electrode increases along its length at each transition between drive electrode segments, the drive electrode configured to receive a single actuation voltage and to move the light modulator to a plurality of corresponding distinct light modulator states that are defined by a degree of actuation of the electrostatic actuator, the plurality of corresponding distinct light modulator states including an open state, a closed state, and at least one intermediate state,
    wherein a first portion of the drive beam is positioned opposing a first region of the load electrode and a second portion of the drive beam is positioned opposing a second region of the load electrode, and
    wherein the first portion is configured to electrostatically engage the first region of the load electrode at a first actuation voltage, and the second portion is configured to electrostatically engage the second region of the load electrode at a second actuation voltage greater than the first actuation voltage.

26. The apparatus of claim 25, wherein the portions are arranged such that a distance separating the first portion and the load electrode is smaller than a distance separating the second portion and the load electrode.

27. The apparatus of claim 25, wherein the electrostatic actuator is configured such that:
when the first discrete portion is not electrostatically engaged with the first region, a first end point of the first discrete portion is separated from the first region of the load electrode by a first distance, when the first discrete portion is electrostatically engaged with the first region of the load electrode, a second end point of the second discrete portion is separated from the second region of the load electrode by a second distance, and the first distance is smaller than the second distance.

28. The apparatus of claim 25, wherein the electrostatic actuator is configured such that a degree of deformation of the load electrode corresponds to a magnitude of an actuation voltage applied to the drive electrode set, and wherein the portions have different corresponding curvatures.

* * * * *